(12) United States Patent
Sakemi et al.

(10) Patent No.: US 9,489,501 B2
(45) Date of Patent: Nov. 8, 2016

(54) AUTHENTICATION METHOD, AUTHENTICATION DEVICE, AND SYSTEM

(71) Applicant: FUJITSU LIMITED, Kawasaki-shi, Kanagawa (JP)

(72) Inventors: Yumi Sakemi, Kawasaki (JP); Tetsuya Izu, London (GB)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/482,235

(22) Filed: Sep. 10, 2014

(65) Prior Publication Data
US 2015/0082405 A1    Mar. 19, 2015

(30) Foreign Application Priority Data

Sep. 19, 2013 (JP) ................. 2013-194182
Mar. 24, 2014 (JP) ................. 2014-059880

(51) Int. Cl.
*G06F 21/00* (2013.01)
*G06F 21/31* (2013.01)
*G06F 21/32* (2013.01)
*H04L 29/06* (2006.01)

(52) U.S. Cl.
CPC ............. *G06F 21/31* (2013.01); *G06F 21/316* (2013.01); *G06F 21/32* (2013.01); *H04L 63/0861* (2013.01)

(58) Field of Classification Search
CPC ........ G06F 21/30; G06F 21/31; G06F 21/32; G06F 21/45; G06F 21/316
See application file for complete search history.

(56) References Cited

U.S. PATENT DOCUMENTS

| | | | |
|---|---|---|---|
| 2009/0141944 A1* | 6/2009 | Abe | G06K 9/00 382/115 |
| 2010/0214811 A1 | 8/2010 | Franceschini et al. | |
| 2011/0128882 A1 | 6/2011 | Shimizu et al. | |

FOREIGN PATENT DOCUMENTS

| | | |
|---|---|---|
| JP | 2002-297549 | 10/2002 |
| JP | 2007-52698 | 3/2007 |
| JP | 2008-521025 | 6/2008 |
| JP | 2010-62651 | 3/2010 |
| JP | 2011-211593 | 10/2011 |
| JP | 2012-518860 | 8/2012 |
| WO | WO 2006/054208 A1 | 5/2006 |

* cited by examiner

*Primary Examiner* — Edward Zee
(74) *Attorney, Agent, or Firm* — Staas & Halsey LLP

(57) ABSTRACT

An authentication method executed by a computer includes: receiving input data which is a target of authentication; specifying registration data, from among a plurality of registration data stored in a storage device, having a second feature value within a threshold value relative to a first feature value of the input data, the first feature value representing a distance between the input data and a reference, the second feature value representing another distance between the registration data and the reference, and the threshold value being used when a determination as to whether the authentication has been successfully performed; and executing a process of comparing the registration data with the input data.

15 Claims, 40 Drawing Sheets

FIG. 4

| USER ID | HAMMING WEIGHT | REGISTRATION DATA |
|---|---|---|
| 1 | 5 | 11000111 |
| 2 | 6 | 10111110 |
| 3 | 2 | 10100000 |
| 4 | 3 | 10110000 |
| 5 | 4 | 10000111 |
| 6 | 2 | 01000100 |
| 7 | 2 | 10000001 |
| 8 | 4 | 11011000 |
| 9 | 5 | 11111000 |
| 10 | 3 | 01000011 |
| ... | ... | ... |

FIG. 5

| USER ID | HAMMING WEIGHT | REGISTRATION DATA |
|---------|----------------|-------------------|
| ... | ... | ... |
| 7 | 2 | 10000001 |
| 3 | 2 | 10100000 |
| 6 | 2 | 01000100 |
| 4 | 3 | 10110000 |
| 10 | 3 | 01000011 |
| 5 | 4 | 10000111 |
| 8 | 4 | 11011000 |
| 1 | 5 | 11000111 |
| 9 | 5 | 11111000 |
| 2 | 6 | 10111110 |
| ... | ... | ... |

REGISTRATION DATA

| USER ID | HAMMING WEIGHT | REGISTRATION DATA |
|---|---|---|
| ... | ... | ... |
| 7 | 2 | 10000001 |
| 3 | 2 | 10100000 |
| 6 | 2 | 01000100 |
| 4 | 3 | 10110000 |
| 10 | 3 | 01000011 |
| 5 | 4 | 10000111 |
| 8 | 4 | 11011000 |
| 1 | 5 | 11000111 |
| 9 | 5 | 11111000 |
| 2 | 6 | 10111110 |
| ... | ... | ... |

FIG. 23

| RECORD NUMBER | USER ID | ENCRYPTION AUTHENTICATION INFORMATION |
|---|---|---|
| 1 | A | $E_K(mA)$ |
| 2 | B | $E_K(mB)$ |
| ... | ... | ... |

FIG. 39

| RECORD NUMBER | USER ID | MASK VALUE | CHARACTERISTIC OF MASK VALUE |
|---|---|---|---|
| 1 | A | 11001100 | 4 |
| 2 | B | 10111101 | 6 |
| ... | ... | ... | ... |
| Nj | X | 00000011 | 2 |

AUTHENTICATION METHOD, AUTHENTICATION DEVICE, AND SYSTEM

CROSS-REFERENCE TO RELATED APPLICATIONS

This application is based upon and claims the benefits of priorities from the prior Japanese Patent Application No. 2013-194182 filed on Sep. 19, 2013, and the prior Japanese Patent Application No. 2014-059880 filed on Mar. 24, 2014, the entire contents of which are incorporated herein by reference.

FIELD

The embodiments discussed herein are related to a technique of authenticating users.

BACKGROUND

Authentication techniques for authenticating users through a network have been used. Registration information, such as password information and biometric information, to be checked when authentication is performed is registered in advance in an authentication apparatus which performs the authentication, and the registration information is compared with input information at a time of the authentication. In accordance with a result of the comparison, a determination as to whether the authentication is successfully performed or fails is made. Such an authentication technique is employed, for example, in authentication functions of bank systems and authentication functions of e-commerce and electronic payment.

Furthermore, techniques of authenticating devices instead of persons have also been used. For example, apparatus authentication using a function of outputting values unique to apparatuses utilizing a so-called physical unclonable function (PUF) which is a physical characteristic in which generation of clones of the apparatus is difficult has been used.

Mainly, two types of authentication technique, that is, a technique referred to as one-to-one authentication and a technique referred to as one-to-N authentication (which is also referred to as ID-less authentication), have been used. In the one-to-one authentication, a user ID which identifies a corresponding user is received at a time of authentication, for example, so that certain registration information associated with the user ID is specified from among registration information registered in advance. Then, input information is compared with the certain registration information, and it is determined whether authentication has been successfully performed in accordance with a result of the comparison.

On the other hand, in the one-to-N authentication, user IDs are not received. Therefore, at a time of the authentication, input information is compared with a plurality of registration information. In the one-to-N authentication, input information is compared with all registration information and a determination as to whether authentication has been successfully performed is made in accordance with one of the registration information which is the most similar to the input information.

An authentication system which performs the one-to-N authentication is taken as an example (refer to Japanese Laid-open Patent Publication No. 2002-297549, for example). The authentication system executes personal authentication using a fingerprint. When fingerprint minutia data is to be registered, the authentication system assigns classification information to the fingerprint minutia data to be registered in accordance with similarity between reference data and the fingerprint minutia data. On the other hand, when the input fingerprint minutia data is to be compared, classification information of the input fingerprint minutia data is generated and fingerprint minutia data which is a target of the comparison is limited or priority levels are assigned to the fingerprint minutia data in accordance with the classification information of the input fingerprint minutia data.

SUMMARY

According to an aspect of the invention, an authentication method executed by a computer includes: receiving input data which is a target of authentication; specifying registration data, from among a plurality of registration data stored in a storage device, having a second feature value within a threshold value relative to a first feature value of the input data, the first feature value representing a distance between the input data and a reference, the second feature value representing another distance between the registration data and the reference, and the threshold value being used when a determination as to whether the authentication has been successfully performed; and executing a process of comparing the registration data with the input data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a data configuration of a registration data table stored in a storage unit.

FIG. 5 is a diagram illustrating a process of limiting comparison targets.

FIG. 9 is a diagram illustrating a data configuration of a registration data table according to a second embodiment.

FIG. 23 is a diagram illustrating a data configuration of an encryption authentication information management table.

FIG. 39 is a diagram illustrating a data configuration of a mask value management table.

DESCRIPTION OF EMBODIMENTS

In the authentication system described above, fingerprint minutia data which is a target of the comparison may be limited, for example, but it is not necessarily the case that fingerprint minutia data which is likely to match the input fingerprint minutia data is included in the limited fingerprint minutia data. That is, a target range for comparison is not limited provided that fingerprint minutia data which is likely to match the input fingerprint minutia data is included in the limited fingerprint minutia data.

Furthermore, in the authentication system described above, the priority levels may be assigned and comparison with the registered fingerprint minutia data may be repeatedly performed until authentication is successfully performed (search and comparison), for example. However, when fingerprint minutia data which does not match the registered fingerprint minutia data is input, consequently, a determination that authentication has failed is made only after all the registered fingerprint minutia data is compared with the input fingerprint minutia data.

Here, the techniques disclosed in the embodiments are provided to perform a process of comparing input data only with registration data which is possibly match the input data in the one-to-N authentication.

The embodiments of the present disclosure will be described in detail hereinafter. Note that the embodiments described hereinafter may be combined with one another as long as content of processes does not conflict. The embodiments will be described hereinafter with reference to the accompanying drawings.

First Embodiment

Figure 1:
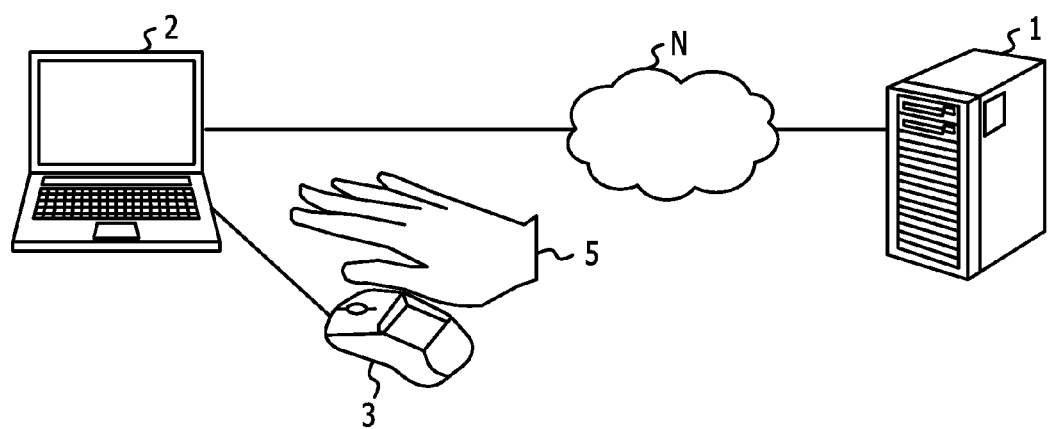
FIG. 1 is a diagram illustrating an authentication system according to a first embodiment.

FIG. 1 is a diagram illustrating an authentication system according to a first embodiment. First, the authentication system of this embodiment will be described. The authentication system includes an authentication device 1 and a terminal device 2. The authentication device 1 and the terminal device 2 are connected to each other through a network N. The network N represents the Internet, for example. For communication through the network N, an encryption communication technique, such as secure socket layer (SSL), may be used.

The authentication device 1 is a computer which executes authentication in response to a request supplied from the terminal device 2. In this embodiment, the authentication device 1 performs one-to-N authentication. Specifically, when receiving input data which is a target of the authentication from the terminal device 2, the authentication device 1 executes the authentication by comparing the input data with a plurality of registration data. The registration data is registered in the authentication device 1 in advance and is user-unique information.

The input data and the registration data have a binary format, for example. Furthermore, in this embodiment, since the authentication device 1 performs biometric authentication, the registration data and the input data are binary data representing biometric information. Note that the technique disclosed in this embodiment is applicable to not only the biometric authentication but also other authentication methods. The technique disclosed in this embodiment is applied to device authentication using a value unique to a device performed using a physical unclonable function (PUF), for example.

The terminal device 2 is a computer which requests the authentication device 1 to perform authentication. In this embodiment, the terminal device 2 is connected to a reading device 3 which reads biometric information. The reading device 3 obtains an image of a vein or a fingerprint of a user 5 and generates biometric information from the image, for example. As an algorithm for generating the biometric information from the image, various general methods may be used. For example, information such as the number of branches or positions of veins is extracted by image analysis, and biometric information is generated in accordance with the extracted information.

Then the terminal device 2 obtains the biometric information from the reading device 3. The biometric information is converted into information of a binary format. This conversion may be performed by the reading device 3 or the terminal device 2.

When registering biometric information to the authentication device 1 as a preparation before authentication is performed, the terminal device 2 transmits a registration request including binary data of the biometric information obtained from the reading device 3 to the authentication device 1. Then the authentication device 1 stores the received binary data in a storage device of itself as registration data.

Meanwhile the terminal device 2 transmits an authentication request including the binary data of the biometric information obtained from the reading device 3 to the authentication device 1. The authentication device 1 compares the received binary data with a plurality of registration data and performs authentication in accordance with results of the comparison. Note that the comparison process is executed after registration data to be compared is limited. The detailed description thereof will be made hereinafter.

Figure 2:
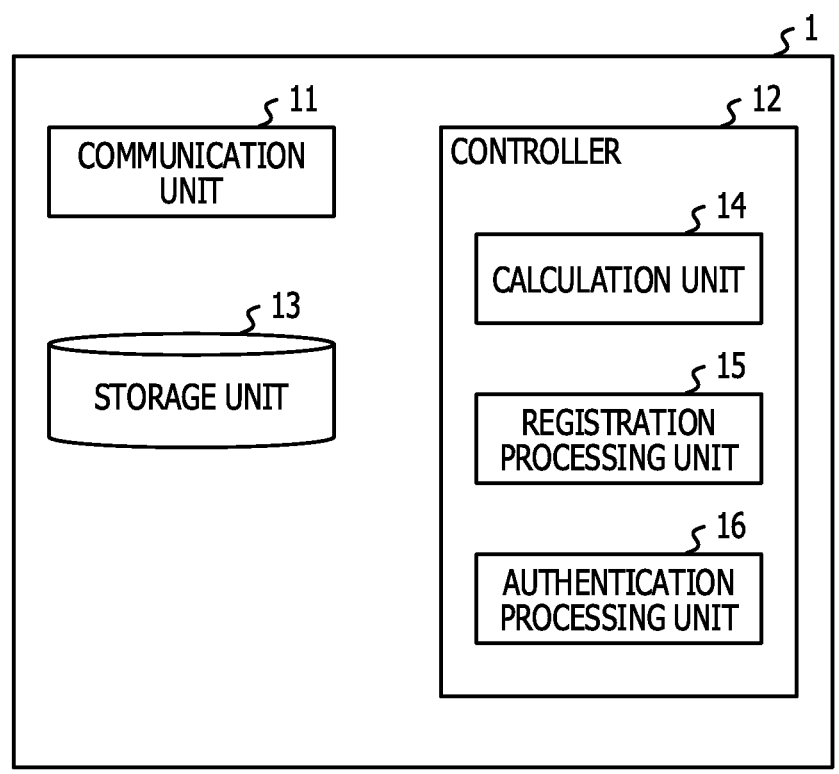
FIG. 2 is a diagram illustrating functional blocks of an authentication device.

Next, a functional configuration of the authentication device 1 will be described. FIG. 2 is a diagram illustrating functional blocks of the authentication device 1. The authentication device 1 includes a communication unit 11, a controller 12, and a storage unit 13. The communication unit 11 performs a process of performing communication with other devices, such as the terminal device 2. The controller 12 is a processing unit which controls various processes performed by the authentication device 1, such as a registration process and an authentication process. The storage unit 13 stores information used to perform various processes, such as registration data.

The controller 12 includes a calculation unit 14, a registration processing unit 15, and an authentication processing unit 16. The calculation unit 14 receives the binary data of the biometric information from the terminal device 2 and calculates a feature value of the binary data. For example, the number of 1 or 0 in the binary data represents the feature value. A case where a Hamming weight representing the number of 1 in the binary data is used as the feature value will be described hereinafter in this embodiment.

When the communication unit 11 receives the registration request, for example, the calculation unit 14 calculates a Hamming weight of the binary data of the biometric information included in the registration request. The calculation unit 14 outputs a result of the calculation to the registration processing unit 15. On the other hand, when the communication unit 11 receives the authentication request, the calculation unit 14 calculates a Hamming weight of the binary data of the biometric information included in the authentication request. The calculation unit 14 outputs a result of the calculation to the authentication processing unit 16.

Next, when receiving the registration request from the terminal device 2, the registration processing unit 15 executes a registration process. Specifically, the registration processing unit 15 associates the binary data included in the registration request and the feature value calculated by the calculation unit 14 with each other and registers the binary data and the feature value in the storage unit 13. Furthermore, the registration processing unit 15 may store a user ID generated by the terminal device 2 after the user ID is associated with the registration data. Note that the user ID is identification information used to identify a user. Furthermore, the registration processing unit 15 may generate the user ID. The user ID is generated as a character string which is different from character strings used as user IDs before.

The authentication processing unit 16 executes an authentication process when receiving the authentication request from the terminal device 2. Specifically, the authentication processing unit 16 executes authentication by comparing the binary data included in the authentication request with the plurality of registration data stored in the storage unit 13. Note that the binary data included in the authentication request is an example of input data. For example, it is determined that the authentication is successfully performed when a difference between the input data and the registration data is equal to or smaller than a threshold value. A result of the determination is supplied to the terminal device 2 through the communication unit 11.

The difference between the input data and the registration data represents a Hamming distance between the binary data of the input data and the binary data of the registration data. The Hamming distance corresponds to the number of different characters between a character string of the input data and a character string of the registration data in corresponding positions and represents similarity of the binary data of the input data and the binary data of the registration data. Specifically, the Hamming distance between the two binary data represents the number of different bits between the input data and the registration data in corresponding positions, and the number of 1 obtained as a result of calculation of exclusive OR in individual digits of the two binary data, for example. In this embodiment, the authentication processing unit 16 determines that the registration data corresponding to the input data has been registered in advance when the Hamming distance is equal to or smaller than the threshold value.

Furthermore, in this embodiment, the authentication processing unit 16 limits registration data to be compared with the input data. Specifically, the authentication processing unit 16 limits targets of the comparison in accordance with the feature value of the input data calculated by the calculation unit 14 and the threshold value. Although described in detail hereinafter, registration data in which a difference between the input data and the registration data apparently becomes equal to or larger than the threshold value is excepted from the targets of the comparison.

Figure 3:
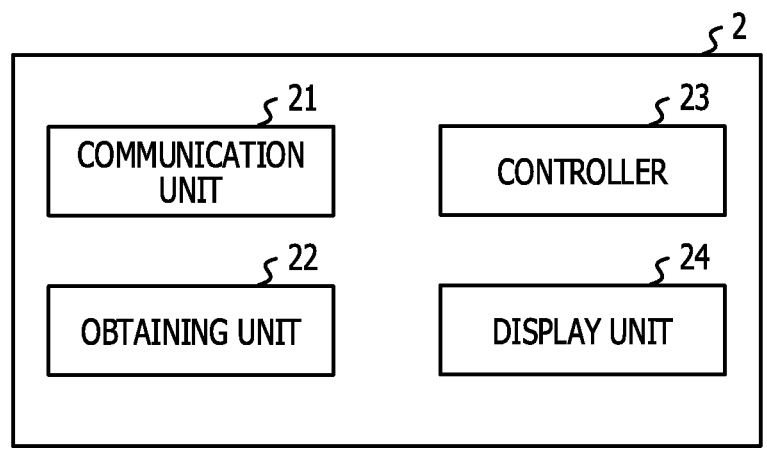
FIG. 3 is a diagram illustrating functional blocks of a terminal device.

Next, a functional configuration of the terminal device 2 will be described. FIG. 3 is a diagram illustrating functional blocks of the terminal device 2. The terminal device 2 includes a communication unit 21, an obtaining unit 22, a controller 23, and a display unit 24. The communication unit 21 is a processing unit which performs communication with other devices, such as the authentication device 1. The obtaining unit 22 is a processing unit which obtains information on a target of registration or authentication, such as biometric information from the reading device 3.

The controller 23 is a processing unit which controls an entire process of the terminal device 2, and generates a registration request and an authentication request, for example. The display unit 24 is a processing unit which displays various information, such as a result of authentication supplied from the authentication device 1. The terminal device 2 may further include a storage unit which stores various information.

Next, registration data stored in the storage unit 13 of the authentication device 1 will be described. FIG. 4 is a diagram illustrating a data configuration of a registration data table stored in the storage unit 13. The registration data table is used to manage registration data.

The registration data table stores a user ID, a Hamming weight, and registration data which are associated with one another. The user ID is information for identifying a user corresponding to the registration data. The Hamming weight is an example of a feature value of the registration data and represents the number of 1 or 0 of the registration data. The registration data is binary data included in the registration request and represents information unique to a user.

Next, a process of limiting registration data to be compared with the input data will be described. FIG. 5 is a diagram illustrating the process of limiting comparison targets. In the first embodiment, the authentication processing unit 16 of the authentication device 1 also executes the limiting process in the authentication process. Other embodiments will be described hereinafter.

In the registration data table illustrated in FIG. 5, registration data is aligned in ascending order of feature value instead of ascending order of ID as illustrated in FIG. 4. In the registration data table, registration data may be registered in ascending order of feature value. Registration in ascending order of feature value will be described in detail as a second embodiment.

In FIG. 5, the input data is denoted by "M" and a Hamming weight of the input data is denoted by "HW(M')". Furthermore, the registration data is denoted by "Mi" and a Hamming weight of the registration data is denoted by "HW(Mi)". Furthermore, a Hamming distance between the input data and the registration data is denoted by HD(M', Mi). Here, "i" corresponds to a record number of the registration data table.

When it is determined that the authentication is successfully performed in the authentication process, the Hamming distance HD (M', Mi) is equal to or smaller than a threshold value d. Accordingly, the comparison process may be performed only on registration data Mi which satisfies Condition 1 below and which has possibility that the authentication is successfully performed.

$$HW(M')-d<HW(Mi)<HW(M')+d \quad \text{(Condition 1)}$$

In other words, registration data Mi which satisfies Condition 2 below is excepted from comparison targets. Since the registration data Mi in which it is apparent that authentication is not successfully performed is excepted from comparison targets, the number of times the comparison process is performed may be reduced and a period of time and a calculation cost for the authentication process may be reduced.

$$HW(M')+d \leq HW(Mi) \text{ OR } HW(M')-d \geq HW(Mi) \quad \text{(Condition 2)}$$

Note that Condition 1 and Condition 2 are obtained in accordance with the following logic. First, Expression 1 is a condition for successfully performing the authentication. Here, the Hamming distance HD(M', Mi) is at least equal to or larger than an absolute value of a difference between the Hamming weight HW(M') of the input data and the Hamming weight HW(Mi) of the registration data. This is because, when an exclusive OR operation is performed on bits representing "1" in the input data having the Hamming weight HW(M') and the registration data having the Hamming weight HW(Mi) for individual bits, the number of bits which output "0" corresponds to the Hamming weight HW(Mi) of the registration data at most.

Specifically, the number of bits of "1" obtained as a result of the exclusive OR operation (that is, the Hamming distance HD(M', Mi)) is equal to or larger than an absolute value of a result obtained by subtracting the Hamming weight HW(Mi) from the Hamming weight HW(M'). Accordingly, Expression 2 is established. Subsequently, Condition 1 is obtained by developing a relational expression between the absolute value obtained as the result of the subtraction of the Hamming weight HW(Mi) from the Hamming weight HW(M') and the threshold value in Expression 2.

$$HD(M',Mi)<d \quad \text{(Expression 1)}$$

$$|HW(M')-HW(Mi)| \leq HD(M',Mi)<d \quad \text{(Expression 2)}$$

For example, as illustrated in FIG. 5, assuming that the input data M' is "10000111", the Hamming weight HW(M') is "4". Furthermore, assuming that the threshold value d is "2", registration data having the Hamming weight HW(Mi) of 2 or more and 6 or less is a target of the comparison process. That is, a registration data group denoted by a rectangle of FIG. 5 is the comparison target.

In the example of FIG. 5, registration data having a user ID of "5" completely matches the input data. However, in general, even in a case of the same person, it is unlikely that the input data and the registration data completely match with each other in the biometric authentication. This is because an error occurs when an image of a vein or a fingerprint is captured using the reading device 3, for example, due to a position or inclination of a hand. Therefore, registration data having a Hamming weight different from that of the input data may be more likely to be similar to the input data when compared with registration data having a Hamming weight the same as that of the input data.

Accordingly, in this embodiment, registration data having a Hamming weight smaller than a threshold value is set as a comparison target while the Hamming weight of the input data is used as a reference, and in this way, all registration data which has possibility that authentication is successfully performed may be set as comparison targets.

Figure 6:
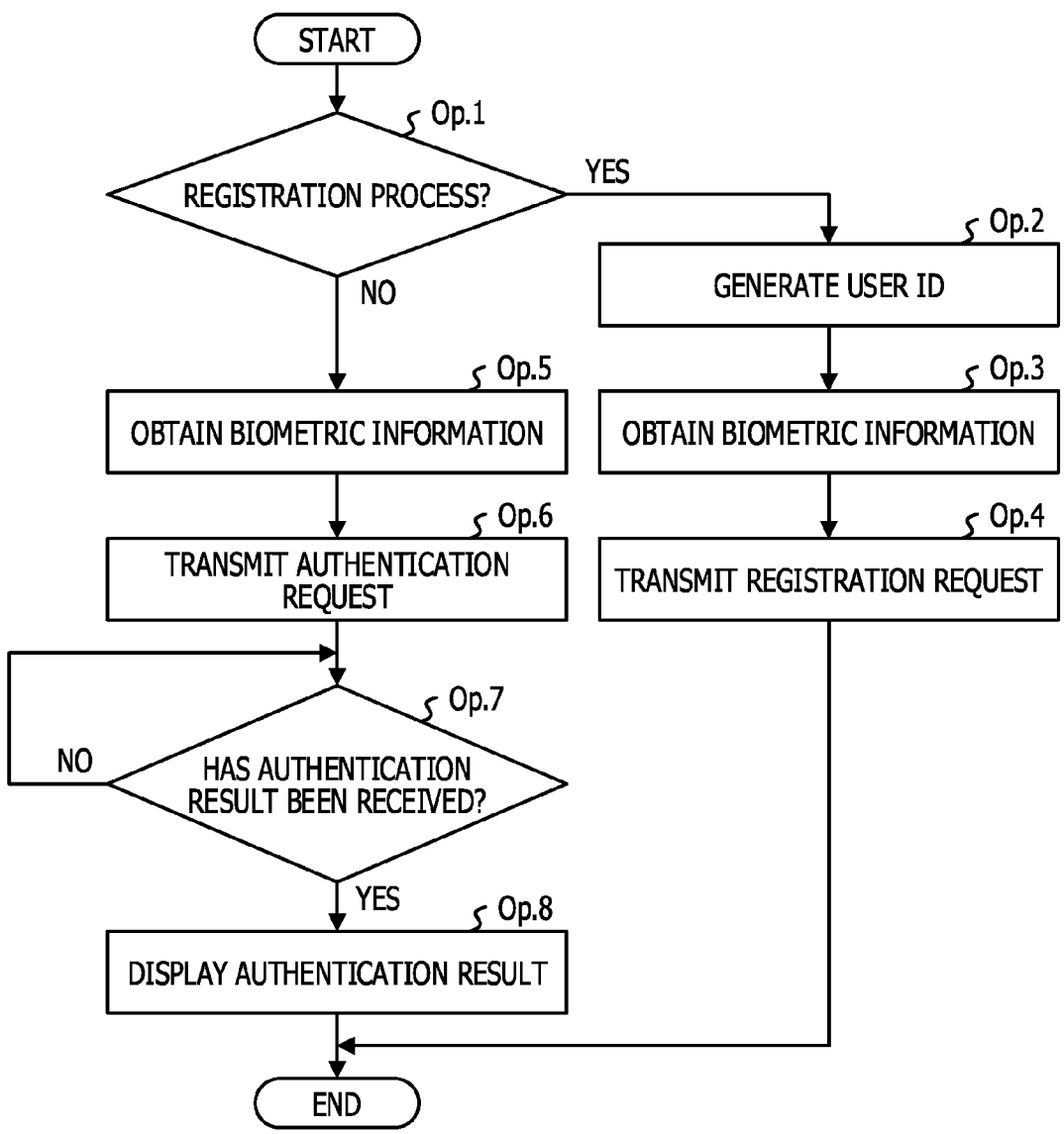
FIG. 6 is a flowchart illustrating a process of the terminal device according to the first embodiment.

Next, a process of the terminal device 2 according to the first embodiment will be described. FIG. 6 is a flowchart illustrating a process of the terminal device 2 according to the first embodiment. The controller 23 determines whether a registration process is to be executed (Op. 1). For example, when a user performs an input representing start of a registration process, a positive determination is performed.

When a registration process is to be executed (Op. 1 Yes), the controller 23 generates a user ID (Op. 2). Although the terminal device 2 generates a user ID in this embodiment, the controller 23 may request the authentication device 1 to generate a user ID. When the terminal device 2 does not generate a user ID, the authentication device 1 may generate a user ID in response to a registration request described below.

Furthermore, the obtaining unit 22 obtains biometric information from the reading device 3 (Op. 3). Then the controller 23 converts the biometric information into data having a binary format and generates a registration request including the binary data obtained through the conversion and the user ID. Thereafter, the controller 23 controls the communication unit 21 so as to transmit the registration request to the authentication device 1 (Op. 4).

On the other hand, when the registration process is not to be performed (Op. 1 No), the obtaining unit 22 obtains biometric information from the reading device 3 (Op. 5). Thereafter, the controller 23 generates an authentication request and controls the communication unit 21 to transmit the authentication request to the authentication device 1 (Op. 6). Here, the controller 23 converts the biometric information into binary data and generates an authentication request including the binary data. Note that, since the one-to-N authentication is executed in this embodiment, the user does not input a user ID. Therefore, the authentication request does not include a user ID.

Next, the controller 23 determines whether a result of authentication performed in response to the authentication request has been received (Op. 7). The controller 23 waits until the authentication result is supplied (Op. 7 No), and when the communication unit 21 has received the authentication result (Op. 7 Yes), the display unit 24 displays the authentication result under control of the controller 23. For example, the display unit 24 displays a screen for displaying a notification representing that the authentication has been successfully performed or the authentication has failed for the user.

Figure 7:
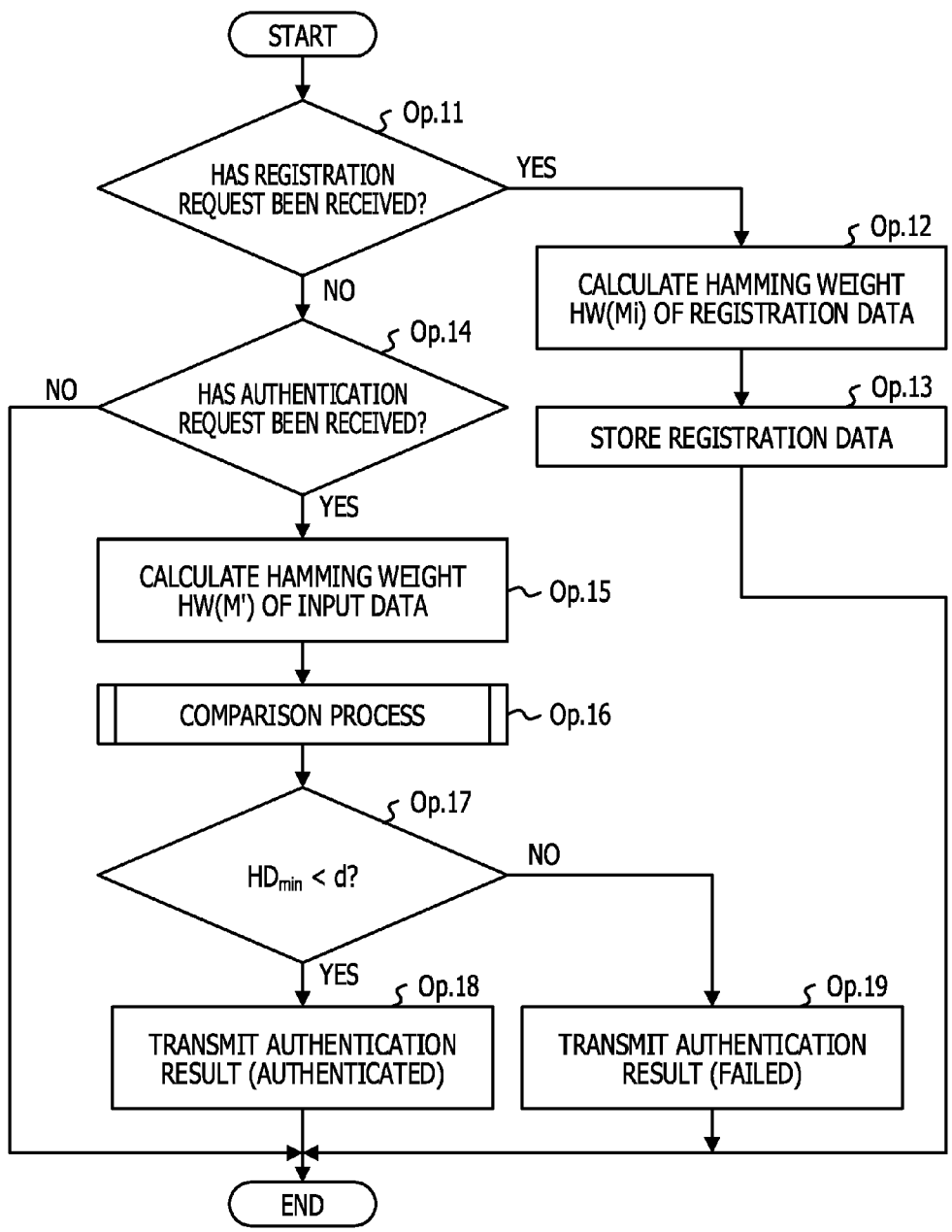
FIG. 7 is a flowchart illustrating a process of the authentication device according to the first embodiment.

Next, a process of the authentication device 1 according to the first embodiment will be described. FIG. 7 is a flowchart illustrating a process of the authentication device 1 according to the first embodiment. The controller 12 determines whether the communication unit 11 has received a registration request (OP. 11).

When the registration request has been received (Op. 11 Yes), the controller 12 executes a registration process. First, the calculation unit 14 sets the binary data included in the registration request as registration data and calculates a Hamming weight HW(Mi) of the registration data (Op. 12). The Hamming weight is an example of a feature value of the registration data. The calculation unit 14 outputs the registration data, the Hamming weight HW(Mi), and the user ID to the registration processing unit 15.

The registration processing unit 15 stores the registration data, the Hamming weight HW(Mi), and the user ID in a registration data table of the storage unit 13 (Op. 13). The controller 12 terminates the series of registration processes.

On the other hand, when the registration request has not been received (Op. 11 No), the controller 12 determines whether an authentication request has been received by the communication unit 11 (Op. 14). When an authentication request has not been received (OP. 14 No), the controller 12 terminates the series of processes.

Furthermore, when an authentication request has been received (Op. 14 Yes), the calculation unit 14 calculates a Hamming weight HW(M') of input data while binary data included in the authentication request is set as the input data (Op. 15). Next, the authentication processing unit 16 executes a comparison process (Op. 16). Here, it is determined whether each of a plurality of registration data is subjected to a comparison process, and the comparison process in this embodiment is performed only on registration data determined to be subjected to the comparison process.

Figure 8:
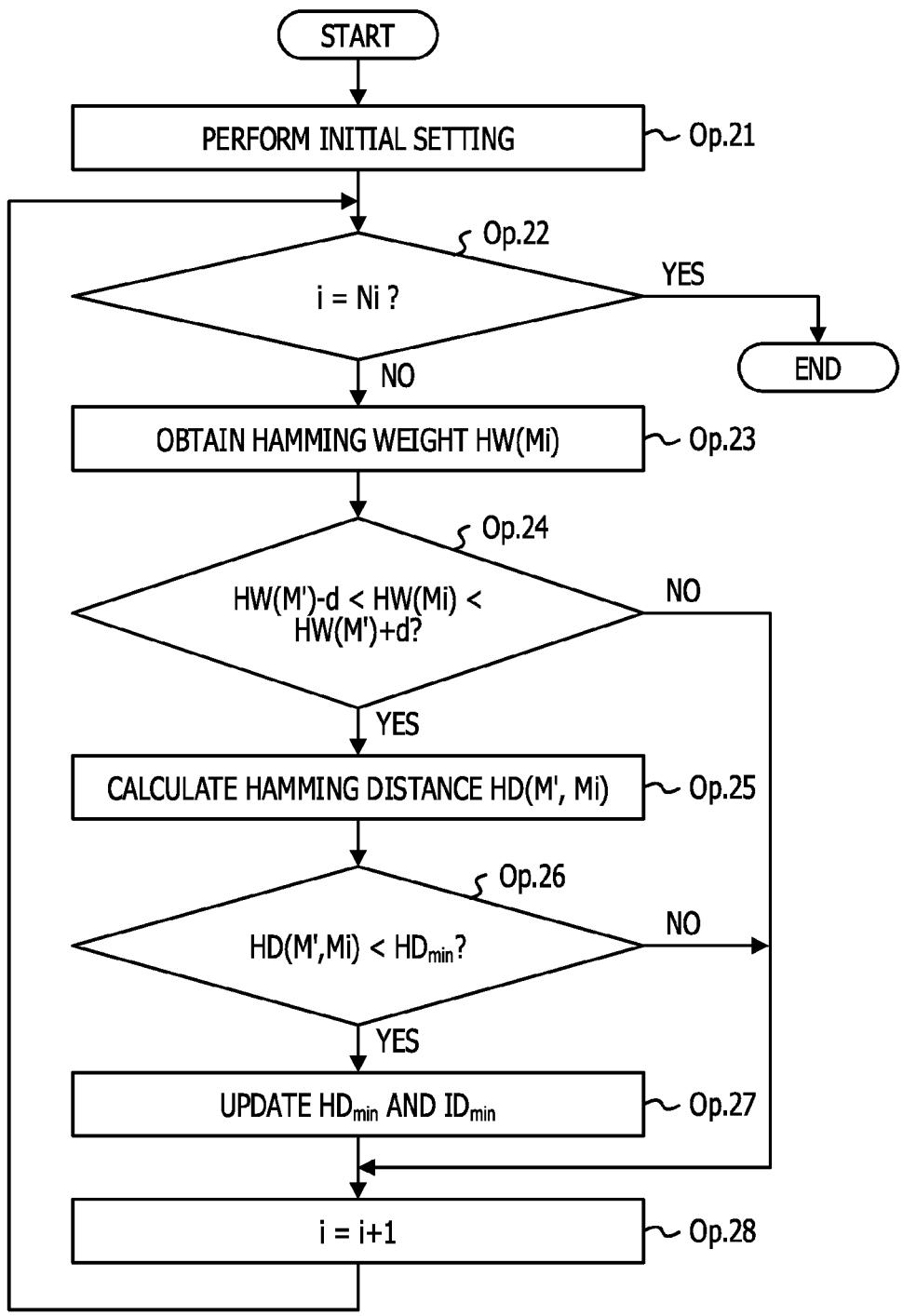
FIG. 8 is a flowchart illustrating a comparison process according to the first embodiment.

FIG. 8 is a flowchart illustrating the comparison process of the first embodiment. First, the authentication processing unit 16 performs an initial setting (Op. 21). A minimum Hamming distance variable HDmin is set as the number of bits of the registration data (8 in a case of FIG. 4). The minimum Hamming distance variable HDmin represents the smallest one of Hamming distances between the input data and the registration data, and is updated by executing the comparison process described hereafter. Furthermore, "−1" is set to a minimum ID variable IDmin. The minimum ID variable IDmin represents an ID of the registration data having the smallest Hamming distance to the input data, and is updated by executing the comparison process described hereafter.

Furthermore, the authentication processing unit 16 assigns "1" to a counter variable i in the initial setting. The counter variable corresponds to a record number of the registration data table. Moreover, the authentication processing unit 16 assigns the number of records included in the registration data table to a maximum counter value Ni.

After the initial setting is terminated, the authentication processing unit 16 determines whether the counter variable i matches the maximum counter value Ni (Op. 22). When mismatch is detected (Op. 22 No), the authentication processing unit 16 refers to a record corresponding to the counter variable i and obtains a Hamming weight HW(Mi) of registration data (Op. 23). The authentication processing unit 16 determines whether the Hamming weight HW(Mi) of the registration data satisfies Condition 1 in accordance with the Hamming weight HW(M') of data to be compared and the threshold value d (Op. 24).

When Condition 1 is satisfied (Op. 24 Yes), the authentication processing unit 16 obtains the registration data of the record corresponding to the counter variable i and calculates a Hamming distance HD (M', Mi) between the input data and the registration data (Op. 25). Then the authentication processing unit 16 determines whether the Hamming distance HD(M', Mi) is smaller than the minimum Hamming distance variable HDmin (Op. 26).

When the Hamming distance HD(M', Mi) is smaller than the minimum Hamming distance variable HDmin (Op. 26 Yes), the authentication processing unit 16 updates the minimum Hamming distance variable HDmin to the Hamming distance HD(M', Mi) calculated in Op. 25 and updates the minimum ID variable IDmin to a user ID of the record corresponding to the counter variable i (Op. 27).

When the process in Op. 27 is terminated, when Condition 1 is not satisfied (Op. 24 No), or when the Hamming distance HD(M', Mi) is equal to or larger than the minimum Hamming distance variable HDmin (Op. 26 No), the authentication processing unit 16 increments the counter variable i (Op. 28). Then the process returns to Op. 22 and the process in Op. 22 onward is performed again.

Specifically, when a smaller Hamming distance HD(M', Mi) is detected, the minimum Hamming distance HDmin is updated to the smaller Hamming distance HD(M', Mi). Furthermore, the minimum ID variable IDmin is also updated to a user ID corresponding to the updated minimum Hamming distance HDmin.

When the counter variable i matches the maximum counter value Ni (Op. 22 Yes), the process has been performed on all records. Accordingly, the authentication processing unit 16 terminates the comparison process.

Next, referring back to FIG. 7, after the comparison process (Op. 16) is terminated, the authentication processing unit 16 determines whether the minimum Hamming distance HDmin is smaller than the threshold value d (Op. 17). Then the minimum Hamming distance HDmin is smaller than the threshold value d (Op. 17 Yes), the authentication processing unit 16 determines that the authentication has been successfully performed and generates a result of the authentication representing that the authentication has been successfully performed. The result of the authentication also includes the user ID set to the minimum ID variable IDmin. The communication unit 11 transmits the authentication result representing that the authentication has been successfully performed to the terminal device 2 (Op. 18).

On the other hand, when the minimum Hamming distance HDmin is equal to or larger than the threshold value d (Op. 17 No), the authentication processing unit 16 determines that the authentication has failed and generates a result of the authentication representing that the authentication has failed. The communication unit 11 transmits the authentication result representing that the authentication has failed to the terminal device 2 (Op. 19). In this case, the authentication result does not include the user ID set to the minimum ID variable IDmin.

As described above, the authentication processing unit 16 does not perform the process in Op. 25 to Op. 27 on registration data which does not satisfy Condition 1. Specifically, the authentication processing unit 16 does not execute the comparison. On the other hand, the authentication processing unit 16 avoids exception of registration data which satisfies Condition 1 and which has possibility that the authentication is successfully performed from targets of the limiting as appropriate data by performing the comparison.

Accordingly, the authentication device 1 of this embodiment may limit registration data to be subjected to the comparison process among a plurality of registration data. The authentication process may be performed by the authentication device 1 in a shorter period of time when compared with a case where all the registration data is subjected to the comparison process. Furthermore, since registration data which has possibility that authentication is successfully performed is to be subjected to the comparison process, exception of appropriate data from targets of the comparison process is avoided.

An authentication system disclosed in Japanese Laid-open Patent Publication No. 2002-297549 uses different determination criteria between a case where a determination as to whether personal authentication has been successfully performed is made and a case where a range of comparison targets is limited. Since it is highly likely that registration data which satisfies the criterion for the determination as to whether the personal authentication is successfully performed satisfies the criterion for limiting the range of comparison targets, that is, since a probabilistic limiting unit is employed, the registration data which satisfies the criterion for the determination as to whether the personal authentication is successfully performed may not be included in the range of comparison targets. On the other hand, the technique disclosed in this embodiment limits registration data serving as comparison targets using a threshold value, and therefore, exception of registration data which has possibility that authentication is successfully performed from the comparison targets is avoided.

Second Embodiment

In a second embodiment, a method for registering registration data in a registration data table is different from that of the first embodiment. Furthermore, a processing flow of a comparison process is different from that of the first embodiment. Hereinafter, the second embodiment will be described mainly in points different from the first embodiment. A period of time in which registration data used for a comparison process is specified in the second embodiment is shorter than that of the first embodiment in which registration data is registered in ascending order of user ID.

An authentication device 1' of the second embodiment includes a registration processing unit 15', an authentication processing unit 16', and a storage unit 13' instead of the registration processing unit 15, the authentication processing unit 16, and the storage unit 13, respectively, of the authentication device 1 of the first embodiment illustrated in FIG. 2. A functional configuration of a terminal device is the same as that of the terminal device 2 of the first embodiment.

FIG. 9 is a diagram illustrating a data configuration of a registration data table according to the second embodiment. When receiving a registration request, the registration processing unit 15' registers registration data in the registration data table. The registration data table is stored in the storage unit 13'. As with the first embodiment, the registration data table stores a user ID, a Hamming weight, and registration data. Note that the registration data is registered in ascending order of Hamming weight. Specifically, as illustrated in FIG. 9, the registration data is stored in ascending order of Hamming weight. Registration data may be registered in ascending order of Hamming weight in practice or pointers representing locations where the registration data is stored may be stored so as to be associated with the Hamming weights so that certain registration data is referred to using the corresponding pointers.

Figure 10:
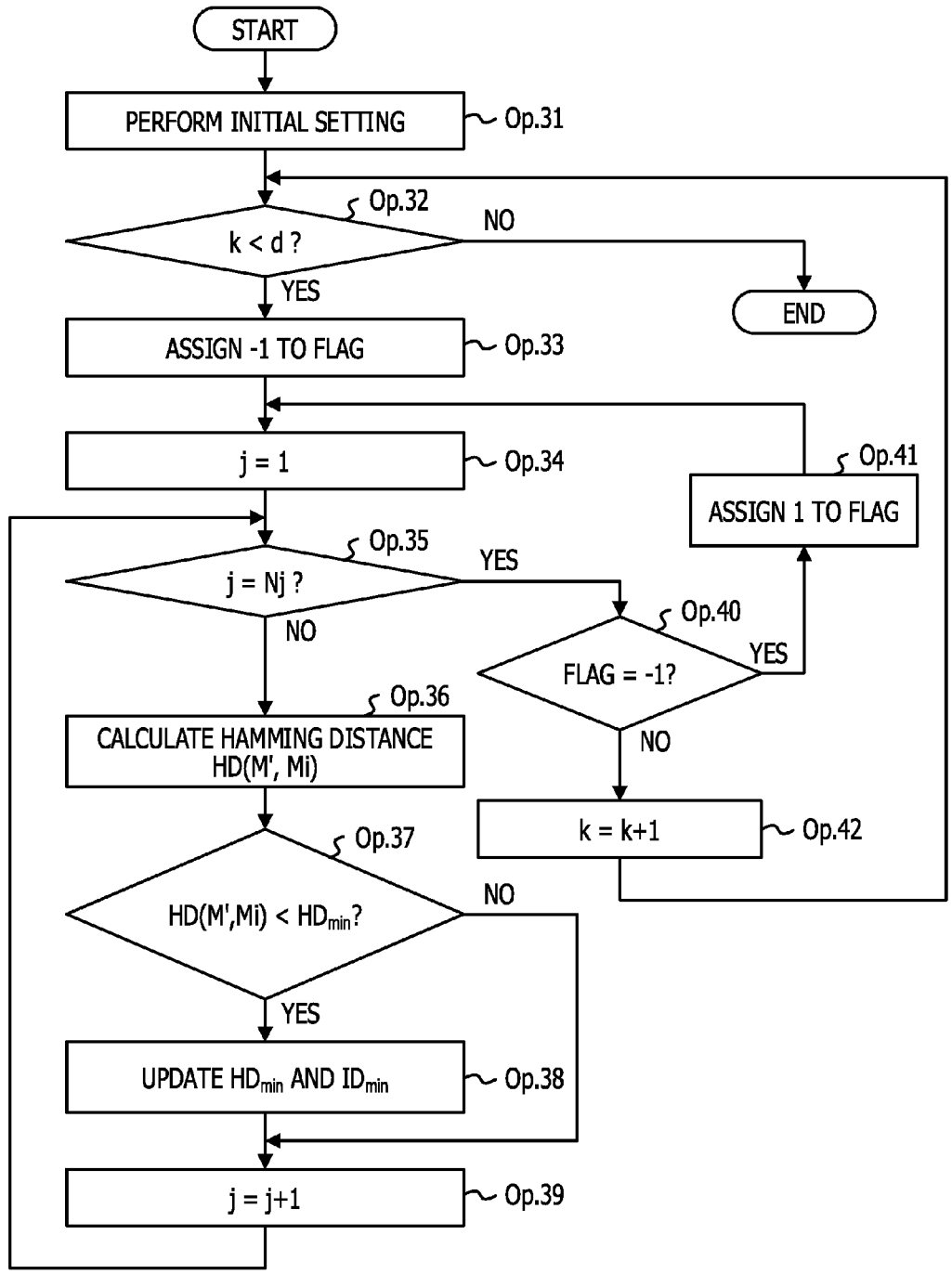
FIG. 10 is a flowchart illustrating a comparison process according to the second embodiment.

Next, a flow of a comparison process according to the second embodiment will be described. FIG. 10 is a flowchart illustrating the comparison process according to the second embodiment. In the second embodiment, the authentication process illustrated in FIG. 7 is executed. However, instead of the process in Op. 16 of FIG. 7, the comparison process illustrated in FIG. 10 is performed. That is, the first and second embodiments are the same as each other except for the comparison process.

First, the authentication processing unit 16' of the authentication device 1' performs an initial setting (Op. 31). Here, the authentication processing unit 16' assigns the number of bits of registration data to a minimum Hamming distance variable HDmin. Furthermore, the authentication processing unit 16' assigns "−1" to a minimum ID variable IDmin. Furthermore, 0 is assigned to a management variable k. The management variable k represents a difference between a Hamming weight HW(M') of input data and a Hamming weight HW(Mi) of registration data.

For example, when the management variable k is "0", registration data having a Hamming weight the same as a Hamming weight HW(M') of input data is specified as registration data to be processed. In this embodiment, the authentication processing unit 16' limits registration data serving as targets of the comparison process using the management variable k. Specifically, the authentication processing unit 16' determines registration data specified by the management variable k smaller than a threshold value as comparison targets.

After the initial setting is terminated, the authentication processing unit 16' determines whether the management variable k is smaller than a threshold value d (Op. 32). When the management variable k is smaller than the threshold value d (Op. 32 Yes), the authentication processing unit 16' assigns "−1" to a flag (Op. 33). The flag is information for defining a processing direction.

When the management variable k is "1", for example, registration data having a Hamming weight which is different from the Hamming weight HW(M') of the input data by 1 serves as a processing target. In this case, a determination as to whether registration data having a Hamming weight which is larger than the Hamming weight HW(M') of the input data by 1 or a Hamming weight which is smaller than the Hamming weight HW(M') of the input data by 1 is set as a processing target is managed by the flag. It is assumed here that a flag of "−1" is set first so that registration data having a Hamming weight smaller than the Hamming weight HW(M') of the input data by 1 is set as a target of a process below. When the management variable k is "0", a process of setting the flag may be omitted.

Next, the authentication processing unit 16' assigns "1" to a counter variable j (Op. 34). The counter variable j of this embodiment is used to manage registration data having the same Hamming weight. When three registration data have the same Hamming weight, for example, j=1, j=2, and j=3 are assigned to the respective registration data. Furthermore, the authentication processing unit 16' sets the number of registration data having the same Hamming weight as a maximum counter value Nj. According to the foregoing example, Nj is "3".

The authentication processing unit 16' determines whether the counter variable j matches the maximum counter value Nj (Op. 35). When mismatch is detected (Op. 35 No), the authentication processing unit 16' obtains registration data corresponding to the management variable k, the flag value, and the counter variable j and calculates a Hamming distance HD(M', Mi) between the input data and the registration data (Op. 36). Then the authentication processing unit 16' determines whether the Hamming distance HD (M', Mi) is smaller than the minimum Hamming distance variable HDmin (Op. 37).

When the Hamming distance HD(M', Mi) is smaller than the minimum Hamming distance variable HDmin (Op. 37 Yes), the authentication processing unit 16' updates the minimum Hamming distance variable HDmin to the Hamming distance HD(M', Mi) calculated in Op. 36 and updates the minimum ID variable IDmin to a user ID of a record corresponding to the management variable k, the flag value, and the counter variable j (Op. 38).

When the process in Op. 38 is terminated or when the Hamming distance HD(M', Mi) is equal to or larger than the minimum Hamming distance variable HDmin (Op. 37 No), the authentication processing unit 16' increments the counter variable j (Op. 39). Then the process returns to Op. 35 and the process in Op. 35 onward is performed again.

When the counter variable j matches the maximum counter value Nj (Op. 35 Yes), the authentication processing unit 16' determines whether the flag is "−1" (Op. 40). When the flag is "−1" (Op. 40 Yes), the authentication processing unit 16' assigns "1" to the flag (Op. 41). Specifically, the processing direction is reversed. After "1" is assigned to the flag, the process from Op. 34 to Op. 39 is similarly performed again. When the management variable k is 0, a negative determination may be made in Op. 40.

On the other hand, when the flag is not "−1" (Op. 40 No), the authentication processing unit 16' increments the management variable k (Op. 42). Then the process returns to Op. 32 and the process in Op. 32 onward is performed again. That is, the comparison process is performed on registration data corresponding to a difference between a Hamming weight HW(M') thereof and the Hamming weight HW(M') of the input data which is larger by one than a difference of the preceding process.

On the other hand, when the management variable k is equal to or larger than the threshold value d (Op. 32 No), the authentication processing unit 16' terminates the comparison process. Specifically, the comparison process is not performed on registration data specified by the management variable k equal to or larger than the threshold value d. This is because, as with Condition 2 described above, it is unlikely that the registration data equal to or larger than the management variable k is successfully authenticated.

As described above, also in the second embodiment, registration data to be subjected to the comparison process may be limited in all the registration data. Accordingly, the authentication process may be performed by the authentication device 1' in a shorter period of time when compared with a case where all the registration data is subjected to the comparison process. Furthermore, since registration data which has possibility that authentication is successfully performed is to be subjected to the comparison process, appropriate data is not excepted from targets of the comparison process.

Third Embodiment

In a third embodiment, registration data to be subjected to a comparison process is more strictly limited when compared with the first and second embodiments so that a period of time used for the process is reduced. An authentication device 1" according to the third embodiment includes an authentication processing unit 16" instead of the authentication processing unit 16 of the first embodiment illustrated in FIG. 2. The authentication processing unit 16" executes an authentication process different from those of the first and second embodiments. A functional configuration of a terminal device is the same as that of the terminal device 2 of the first embodiment.

Figure 11:
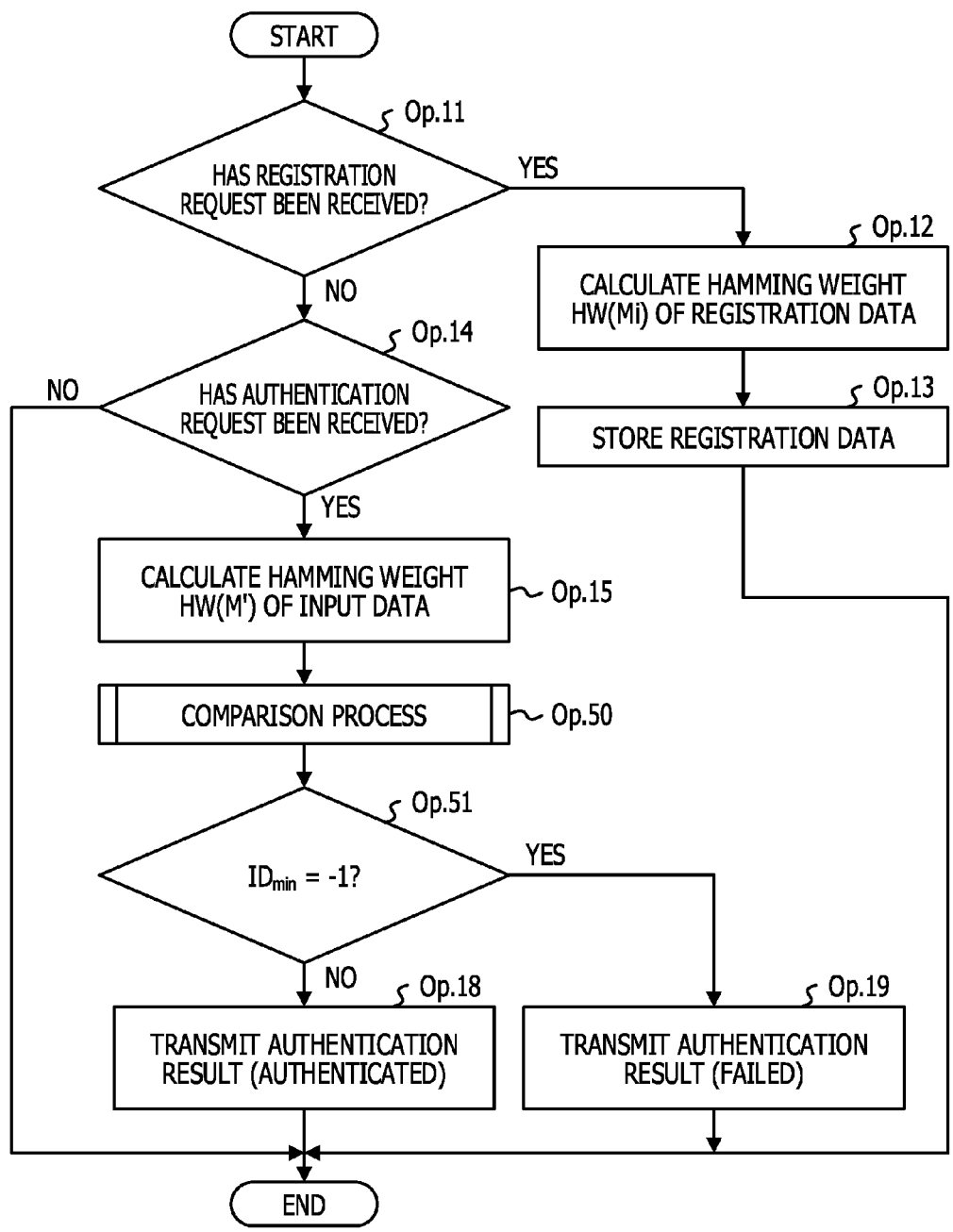
FIG. 11 is a flowchart illustrating a process of an authentication device according to a third embodiment.

FIG. 11 is a flowchart illustrating a process of the authentication device 1" according to the third embodiment. Processes the same as those of the flowchart of the process of the authentication device 1 according to the first embodiment are denoted by reference symbols the same as those of the first embodiment, and descriptions thereof are omitted. In the third embodiment, a comparison process (Op. 50) and a process of determining whether authentication has been successfully performed (Op. 51) which is executed after the comparison process are different from those of the first and second embodiments.

In FIG. 11, when a calculation unit 14 calculates a Hamming weight HW(M') of input data (Op. 15), the authentication processing unit 16" executes a comparison process (Op. 50).

Figure 12:
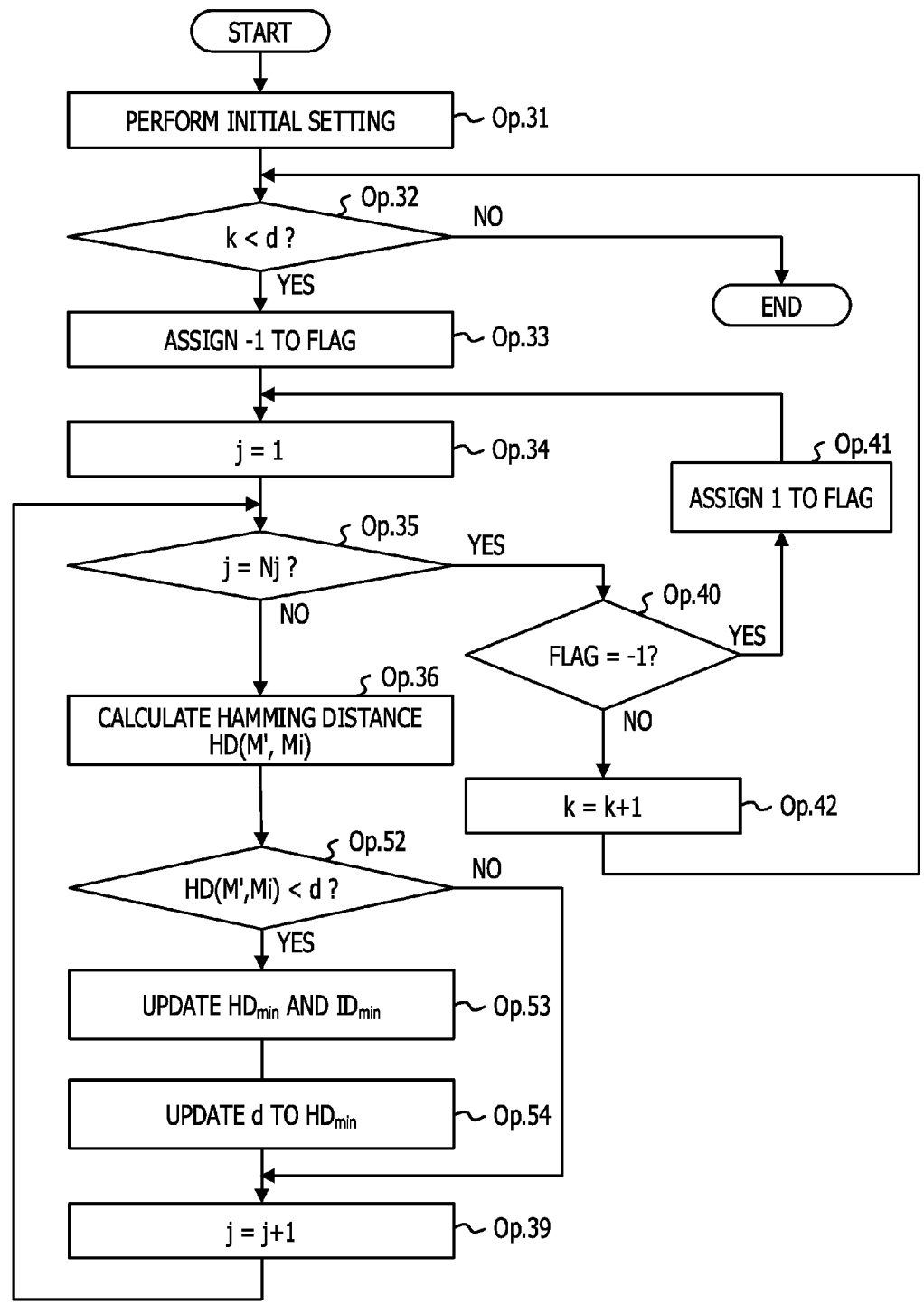
FIG. 12 is a flowchart illustrating a comparison process according to the third embodiment.

FIG. 12 is a flowchart illustrating the comparison process according to the third embodiment. Processes the same as those in the comparison process according to the second embodiment are denoted by reference symbols the same as those of the second embodiment and descriptions thereof are simply made. First, as with the second embodiment, the authentication processing unit 16" performs an initial setting. Specifically, the number of bits of registration data is assigned to a minimum Hamming distance variable HDmin. Furthermore, "−1" is assigned to a minimum ID variable IDmin. Moreover, 0 is assigned to a management variable k.

After the initial setting is terminated, the authentication processing unit 16" determines whether the management variable k is smaller than a threshold value d (Op. 32). When the management variable k is smaller than the threshold value d, "−1" is assigned to a flag (Op. 33). Next, the authentication processing unit 16" assigns "1" to a counter variable j (Op. 34). Furthermore, the authentication processing unit 16" assigns the number of registration data having the same Hamming weight to a maximum counter value Nj.

The authentication processing unit 16" determines whether the counter variable j matches the maximum counter value Nj (Op. 35). When mismatch is detected (Op. 35 No), the authentication processing unit 16" obtains registration data corresponding to the management variable k, the flag value, and the counter variable j and calculates a Hamming distance HD(M', Mi) between the input data and the registration data (Op. 36).

Then the authentication processing unit 16" determines whether the Hamming distance HD (M', Mi) is smaller than the threshold value d (Op. 52). Specifically, in the third embodiment, the authentication device 1" determines whether each of the registration data corresponds to authentication successfully performed in the comparison process.

When the Hamming distance HD(M', Mi) is smaller than the threshold value d (Op. 52 Yes), the authentication processing unit 16" updates the minimum Hamming distance variable HDmin to the Hamming distance HD(M', Mi) calculated in Op. 36 and updates the minimum ID variable IDmin to a user ID of a record corresponding to the management variable k, the flag value, and the counter variable j (Op. 53).

Furthermore, the authentication processing unit 16" updates the threshold value to the minimum Hamming distance variable HDmin (Op. 54). Specifically, in the process of Op. 32 performed after the threshold value is updated, a criterion for a determination for limiting targets to be subjected to the comparison process becomes stricter when compared with the threshold value d set before the update.

As with the second embodiment, the authentication processing unit 16" increments the counter variable j (Op. 39) and a process in Op. 35 onward is performed again. When the counter variable j matches the maximum counter value Nj (Op. 35 Yes), the authentication processing unit 16" determines whether the flag is "−1" (Op. 40). When the flag is "−1" (Op. 40 Yes), the authentication processing unit 16" assigns "1" to the flag (Op. 41). When the management variable k is 0, a negative determination may be made in Op. 40. After "1" is assigned to the flag, the process from Op. 34 to Op. 39 is performed again.

On the other hand, when the flag is not "−1" (Op. 40 No), the authentication processing unit 16" increments the management variable k (Op. 42). Then the process returns to Op. 32 and the process in Op. 32 onward is performed again. When the management variable k is equal to or larger than the threshold value d (Op. 32 No), the authentication processing unit 16" terminates the process. Specifically, the comparison process is not performed on registration data which is equal to or larger than the management variable k. When the threshold value is updated in Op. 54, the updated threshold value d is used in the determination in Op. 32.

Referring to FIG. 5, the relationship between the update of the threshold value d and the limiting of processing targets will be described. It is assumed that the threshold value before update is "2". In this case, in the first embodiment or the second embodiment, registration data included in a range denoted as comparison targets in FIG. 5 serves as processing targets.

However, in the third embodiment, the comparison process is started from registration data having a management variable k of "0", and when input data M' is "10000111", registration data "10000111" corresponding to a user ID "5" or registration data "11011000" corresponding to a user ID "8" are first compared with the input data M'.

Specifically, taking the registration data "10000111" having the user ID "5" as an example, "0" is calculated as the Hamming distance HD(M', Mi) in Op. 36. In a subsequent process, the authentication processing unit 16" determines that the Hamming distance HD (M', Mi) is smaller than the threshold value d (Op. 52 Yes). The authentication processing unit 16" updates the minimum Hamming distance variable HDmin to "0" and updates the minimum ID variable IDmin to the user ID "5" of a record corresponding to the management variable k, the flag value, and the counter variable j (Op. 53). Furthermore, the authentication processing unit 16" updates the threshold value d to "0" (Op. 54).

Accordingly, when comparison with registration data having the management variable k of "0" is terminated (Op. 35 Yes), the authentication processing unit 16" executes a process in Op. 42 through the process in Op. 40 (No).

Specifically, the authentication processing unit 16" updates the management variable k to "1". Subsequently, when the updated threshold value d of "0" and the updated management variable k of "1" are compared with each other, a negative result is obtained in the determination in Op. 32, and therefore, the comparison process is terminated. Specifically, according to this embodiment, comparison targets may be limited to two registration data from six registration data which are set as the comparison targets in FIG. 5.

Specifically, when registration data Mi which has possibility that authentication is successfully performed is found, the authentication device 1" searches for registration data which is more similar to the input data M' relative to the registration data Mi, and therefore, the threshold value d is updated to a stricter threshold value. Accordingly, the authentication device 1" of the third embodiment may further limit targets to be subjected to the comparison process.

In the example of FIG. 5, the threshold value d is updated to "0" since the registration data Mi matches the input data M'. However, even when the input data M' and the registration data Mi does not completely match each other, the threshold value d is updated to a smaller threshold value d. By this, the same effect is obtained.

Referring now back to FIG. 11, after the comparison process (Op. 50) is terminated, the authentication processing unit 16" determines whether the minimum ID variable IDmin of "−1" which was set in the initial setting has been updated (Op. 51). When the minimum Hamming distance variable HDmin is not "−1" (Op. 51 No), the authentication processing unit 16" determines that the authentication has been successfully performed and transmits a result of the authentication representing that the authentication has been successfully performed to the terminal device 2 through the communication unit 11 (Op. 18).

On the other hand, when the minimum Hamming distance variable HDmin is "−1" (Op. 51 Yes), the authentication processing unit 16" determines that the authentication has failed and transmits a result of the authentication representing that the authentication has failed to the terminal device 2 through the communication unit 11 (Op. 18).

In a case where the minimum ID variable IDmin of "−1" set in the initial setting has been updated to another value in Op. 53, registration data which has possibility that authentication is successfully performed has been retrieved in Op. 52. Accordingly, in a case where the minimum ID variable IDmin of "−1" set in the initial setting has been updated in Op. 51, it is determined that the authentication is successfully performed.

On the other hand, in a case where the minimum ID variable IDmin of "−1" set in the initial setting has not been updated to another value in Op. 53, registration data which is successfully authenticated has not been retrieved in Op. 52. Accordingly, in a case where the minimum ID variable IDmin of "−1" set in the initial setting has not been updated in Op. 51, it is determined that the authentication has failed.

By this, the authentication device 1" may execute the authentication process while comparison targets are further limited. Specifically, in a case where registration data having the Hamming distance HD(M', Mi) equal to or smaller than the threshold value d is detected, the authentication device 1" may determine whether registration data more similar to the input data M' relative to the registration data Mi exists in a succeeding process, and accordingly, registration data which is not possible to be more similar to the input data M' relative to the registration data Mi may be further excepted from comparison targets.

Fourth Embodiment

In a fourth embodiment, a plurality of processors perform comparison processes in parallel. As the fourth embodiment, a case where a plurality of comparison processing units are included in a single authentication device will be described. According to the fourth embodiment, since comparison processes are executed in parallel, a period of time used for the comparison processes and an authentication process may be reduced when compared with the first to third embodiments. A system configuration includes a terminal device 2 and an authentication device 6. A functional configuration of the terminal device 2 of the fourth embodiment is the same as that of the terminal device 2 of the first embodiment.

Figure 13:
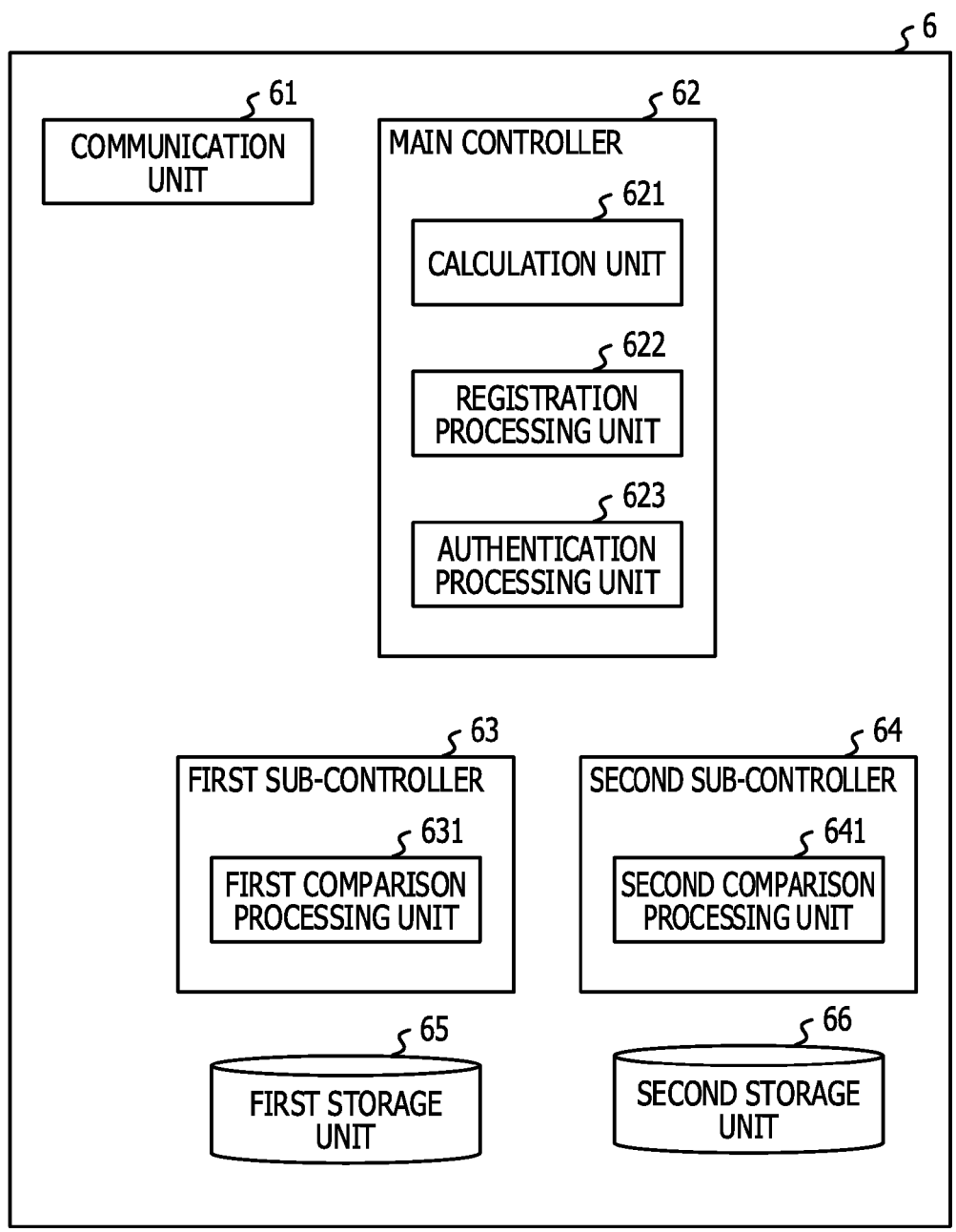
FIG. 13 is a diagram illustrating functional blocks of an authentication device according to a fourth embodiment.

FIG. 13 is a diagram illustrating functional blocks of the authentication device 6 according to the fourth embodiment. The authentication device 6 includes a communication unit 61, a main controller 62, a first sub-controller 63, a second sub-controller 64, a first storage unit 65, and a second storage unit 66. The main controller 62 includes a calculation unit 621, a registration processing unit 622, and an authentication processing unit 623. The first sub-controller 63 includes a first comparison processing unit 631, and the second sub-controller 64 includes a second comparison processing unit 641. Here, although a description is made on the assumption that the two sub-controllers perform comparison processes in parallel, three or more sub-controllers may perform comparison processes in parallel.

The communication unit 61 performs a process of performing communication with other devices, such as the terminal device 2. The main controller 62 is a processing unit which controls various processes performed by the authentication device 6, such as an authentication process. The first storage unit 65 and the second storage unit 66 store information used in the various processes, such as registration data. The first storage unit 65 and the second storage unit 66 exclusively store registration data. The registration data is managed by a registration data table having a data configuration the same as those of the first and second embodiments.

The calculation unit 621 receives binary data of biometric information from the terminal device 2 and calculates a feature value of the binary data. When the communication unit 61 receives a registration request, for example, the calculation unit 621 calculates a Hamming weight of binary data of biometric information included in the registration request. On the other hand, when the communication unit 61 receives an authentication request, the calculation unit 621 calculates a Hamming weight of binary data of biometric information included in the authentication request. The calculation unit 621 outputs a result of the calculation to the registration processing unit 622 or the authentication processing unit 623.

Next, when receiving the registration request from the terminal device 2, the registration processing unit 622 executes a registration process. Specifically, the registration processing unit 622 associates the binary data included in the registration request and the feature value calculated by the calculation unit 621 with each other and registers the binary data and the feature value in the first storage unit 65 or the storage unit 66. The registration processing unit 622 stores registration data in one of the first storage unit 65 and the second storage unit 66 which has a smaller number of registration data, for example. Furthermore, the registration processing unit 622 may determine one of the first storage unit 65 and the second storage unit 66 which serves as a registration destination of the registration data such that the numbers of registration data having the same Hamming weight between the first storage unit 65 and the second storage unit 66 become substantially the same as each other.

The authentication processing unit 623 executes an authentication process when receiving the authentication request from the terminal device 2. Specifically, the authentication processing unit 623 controls the first sub-controller 63 and the second sub-controller 64 so as to execute authentication. The first comparison processing unit 631 of the first sub-controller 63 and the second comparison processing unit 641 of the second sub-controller 64 execute comparison processes and output results of the comparisons to the authentication processing unit 623. The authentication processing unit 623 determines that the authentication has been successfully performed when registration data in which a difference between the registration data and the input data is equal to or smaller than a threshold value is detected, for example, in accordance with the comparison results.

The first comparison processing unit 631 and the second comparison processing unit 641 execute the comparison processes. Content of the comparison processes has been described in detail in one of the first to third embodiments. Note that, in a case where the comparison process of the third embodiment is executed, when the threshold value is updated by one of the first comparison processing unit 631 and the second comparison processing unit 641, the updated threshold value is transmitted to the other of the first comparison processing unit 631 and the second comparison processing unit 641 under control of the main controller 62.

Figure 14:
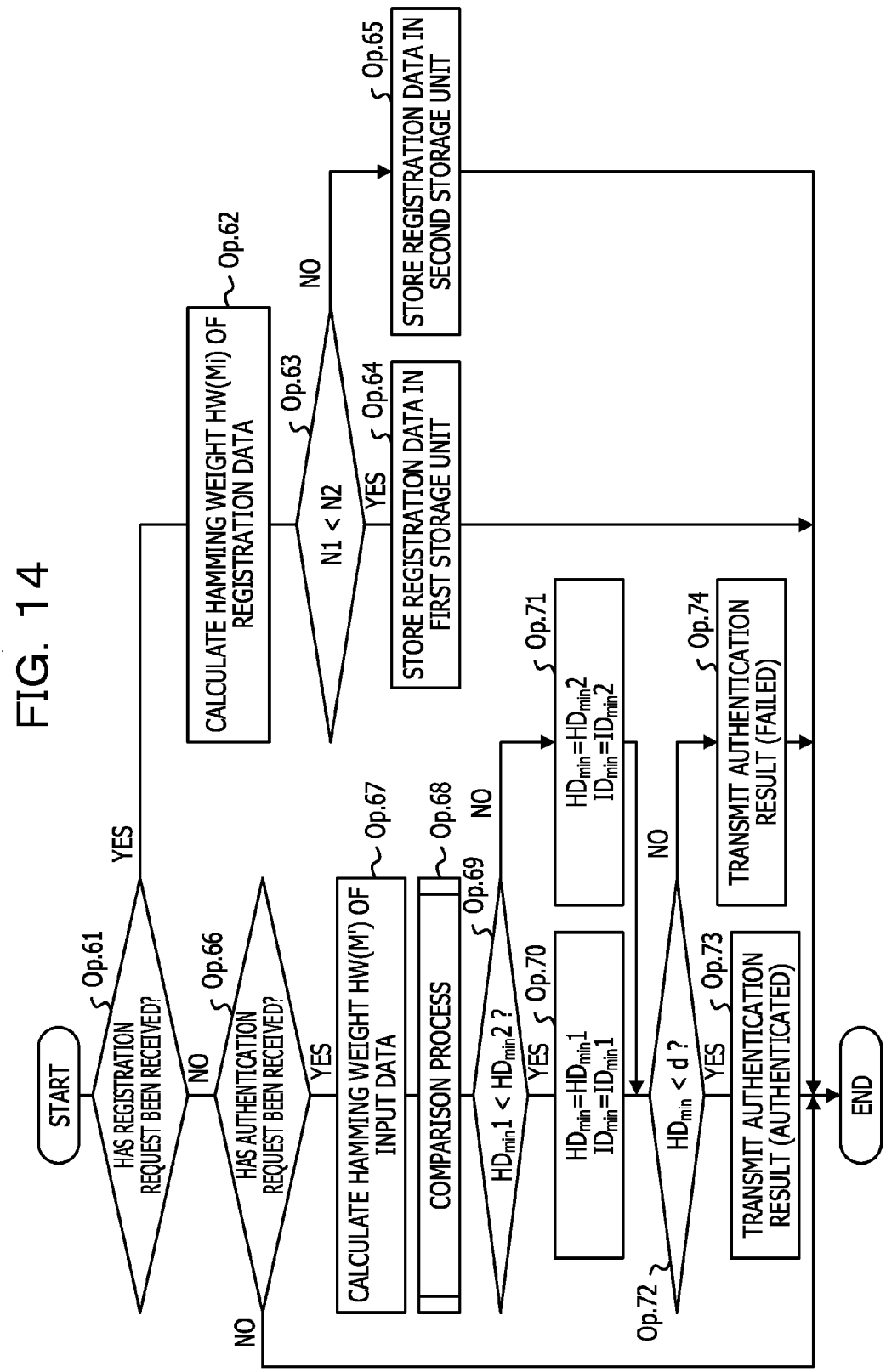
FIG. 14 is a flowchart illustrating a process of the authentication device according to the fourth embodiment.

Next, a flow of operation of the authentication device 6 according to the fourth embodiment will be described. FIG. 14 is a flowchart illustrating a process performed by the authentication device 6 according to the fourth embodiment. First, the main controller 62 determines whether the communication unit 61 has received a registration request (OP. 61).

When the registration request has been received (Op. 61 Yes), the main controller 62 executes a registration process. First, the calculation unit 621 sets binary data included in the registration request as registration data and calculates a Hamming weight HW(Mi) of the registration data (Op. 62). The calculation unit 621 outputs the registration data, the Hamming weight HW(Mi), and a user ID to the registration processing unit 622.

Thereafter, the registration processing unit 622 determines whether the number N1 of registration data stored in the first storage unit 65 is smaller than the number N2 of registration data stored in the second storage unit 66 (Op. 63). When N1 is smaller than N2 (Op. 63 Yes), the registration processing unit 622 stores the registration data, the Hamming weight HW(Mi), and the user ID in a registration data table of the first storage unit 65 (Op. 64). Then the main controller 62 terminates the series of registration processes.

On the other hand, when N1 is equal to or larger than N2 (Op. 63 No), the registration processing unit 622 stores the registration data, the Hamming weight HW(Mi), and the user ID in a registration data table of the second storage unit 66 (Op. 65). Then the main controller 62 terminates a series of registration processes.

On the other hand, when a registration request has not been received (Op. 61 No), the main controller 62 determines whether an authentication request has been received by the communication unit 61 (Op. 66). When an authentication request has not been received (OP. 66 No), the main controller 62 terminates the series of processes.

Furthermore, when an authentication request has been received (Op. 66 Yes), the calculation unit 621 calculates a Hamming weight HW(M') of input data (Op. 67) while binary data included in the authentication request is set as the input data. Subsequently, the authentication processing unit 623 instructs the first comparison processing unit 631 and the second comparison processing unit 641 to execute comparison processes. The first comparison processing unit 631 and the second comparison processing unit 641 execute comparison processes (Op. 68). It is assumed that the comparison process (refer to FIG. 8) according to the first embodiment is executed in this embodiment.

The first comparison processing unit 631 outputs a result of the comparison process to the authentication processing unit 623. The result of the comparison process includes a minimum Hamming distance variable HDmin1 and a minimum ID variable IDmin1 obtained at a time when the first comparison processing unit 631 terminates the comparison process. Furthermore, the second comparison processing unit 641 outputs a result of the comparison process to the authentication processing unit 623. The result of the comparison process includes a minimum Hamming distance variable HDmin2 and a minimum ID variable IDmin2 obtained at a time when the second comparison processing unit 641 terminates the comparison process.

The authentication processing unit 623 determines whether the minimum Hamming distance variable HDmin1 is smaller than the minimum Hamming distance variable HDmin2 (Op. 69). When the minimum Hamming distance variable HDmin1 is smaller than the minimum Hamming distance variable HDmin2 (Op. 69 Yes), the authentication processing unit 623 determines that the minimum Hamming distance variable HDmin1 is assigned to the minimum Hamming distance variable HDmin and determines that the minimum ID variable IDmin1 is assigned to the minimum ID variable IDmin (Op. 70).

On the other hand, when the minimum Hamming distance variable HDmin1 is equal to or larger than the minimum Hamming distance variable HDmin2 (Op. 69 No), the authentication processing unit 623 determines that the minimum Hamming distance variable HDmin2 is assigned to the minimum Hamming distance variable HDmin and determines that the minimum ID variable IDmin2 is assigned to the minimum ID variable IDmin (Op. 71).

Then the authentication processing unit 623 determines whether the minimum Hamming distance variable HDmin is smaller than a threshold value d (Op. 72). Then when the minimum Hamming distance HDmin is smaller than the threshold value d (Op. 72 Yes), the authentication processing unit 623 determines that the authentication has been successfully performed and generates a result of the authentication representing that the authentication has been successfully performed. The result of the authentication also includes a user ID corresponding to the minimum ID variable IDmin. The communication unit 61 transmits the authentication result representing that the authentication has been successfully performed to the terminal device 2 (Op. 73).

On the other hand, when the minimum Hamming distance HDmin is equal to or larger than the threshold value d (Op. 72 No), the authentication processing unit 623 determines that the authentication has failed and generates a result of the authentication representing that the authentication has failed. The communication unit 61 transmits the authentication result representing that the authentication has failed to the terminal device 2 (Op. 74). In this case, the authentication result does not include a user ID set in the minimum ID variable IDmin.

As described above, according to this embodiment, the first comparison processing unit 631 and the second comparison processing unit 641 execute the respective comparison processes in parallel with reference to the first storage unit 65 and the second storage unit 66, respectively. Accordingly, the comparison processes are executed in a shorter period of time. In addition, a period of time used for the authentication process performed by the authentication device 6 is reduced.

Fifth Embodiment

In a fifth embodiment, a plurality of comparison devices perform comparison processes in parallel. According to the fifth embodiment, since comparison processes are executed in parallel, a period of time used for the comparison processes and an authentication process may be reduced when compared with the first to third embodiments.

Figure 15:
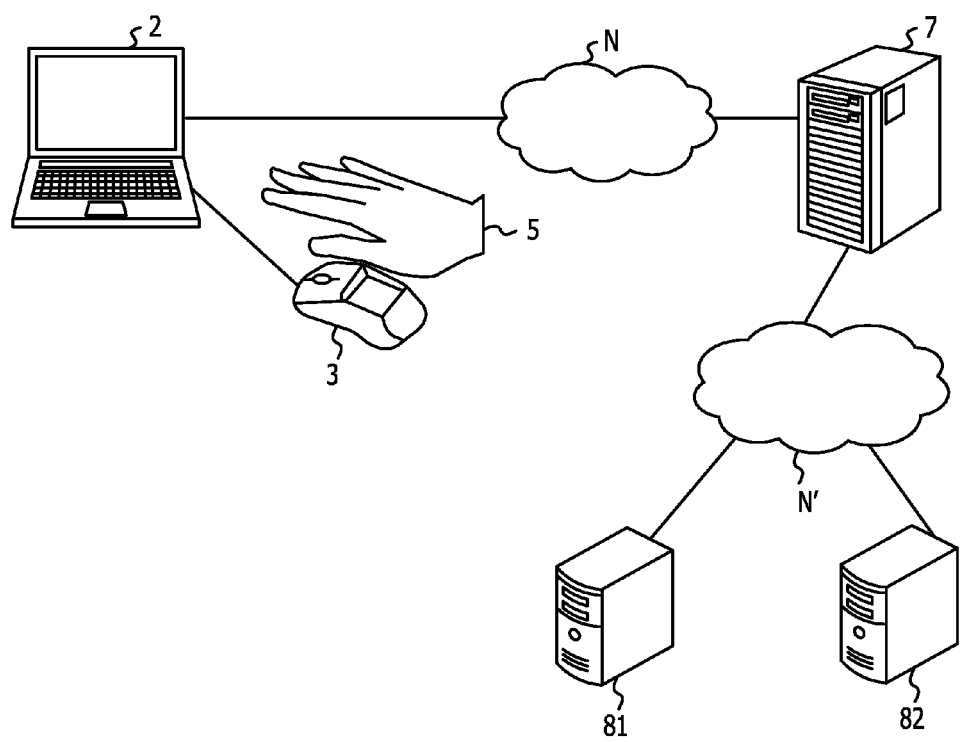
FIG. 15 is a diagram illustrating a system configuration according to a fifth embodiment.

A system configuration of the fifth embodiment will be described. FIG. 15 is a diagram illustrating the system configuration according to the fifth embodiment. The authentication system includes a terminal device 2, an authentication device 7, a first comparison device 81, and a second comparison device 82. Here, although a description is made on the assumption that the two comparison devices perform comparison processes in combination with the authentication device 7, three or more comparison devices may perform comparison processes in combination with the authentication device 7.

The authentication device 7 and the terminal device 2 are connected to each other through a network N. The network N is the Internet, for example. For communication through the network N, an encryption communication technique, such as secure socket layer (SSL) may be used. Furthermore, the authentication device 7 and the first and second comparison devices 81 and 82 are connected to each other through a network N'. For communication through the network N', an encryption communication technique, such as secure socket layer (SSL) may be used. The network N' may be the same as the network N or different from the network N.

The authentication device 7 is a computer which executes authentication in response to a request supplied from the terminal device 2. Furthermore, in this embodiment, the authentication device 7 executes one-to-N authentication. Moreover, the authentication device 7 performs an authentication process and a registration process in combination with the first and second comparison devices 81 and 82.

The terminal device 2 is a computer which requests the authentication device 7 to perform authentication. In this embodiment, the terminal device 2 is connected to a reading device 3 which reads biometric information. It is assumed that the reading device 3 obtains an image of a vein or a fingerprint of a user 5 and generates biometric information from the image. Then the terminal device 2 obtains the biometric information from the reading device 3.

Before biometric information is registered for authentication to be performed, the terminal device 2 transmits a registration request including binary data of the biometric information obtained from the reading device 3 to the authentication device 7. Then the authentication device 7 outputs the received binary data of the biometric information to the first comparison device 81 or the second comparison device 82 as registration data. When receiving the registration data, the first and second comparison devices 81 and 82 store the registration data in storage devices of themselves.

Meanwhile, before authentication is performed, the terminal device 2 transmits an authentication request including the binary data of the biometric information obtained from the reading device 3 to the authentication device 7. Then the authentication device 7 transmits a comparison request to the first and second comparison devices 81 and 82 so that the received binary data of the biometric information is compared with a plurality of registration data. The comparison request includes the binary data of the biometric information received as input data and a feature value of the input data. The first and second comparison devices 81 and 82 may individually calculate respective feature values.

When receiving the comparison request, the first and second comparison devices 81 and 82 limit registration data to be subjected to the comparison process and execute a comparison process. As the comparison process, as with the fourth embodiment, one of the comparison processes according to the first to third embodiments is executed. When receiving a result of the comparison from the first and second comparison devices 81 and 82, the authentication device 7 performs authentication in accordance with the comparison result.

Figure 16:
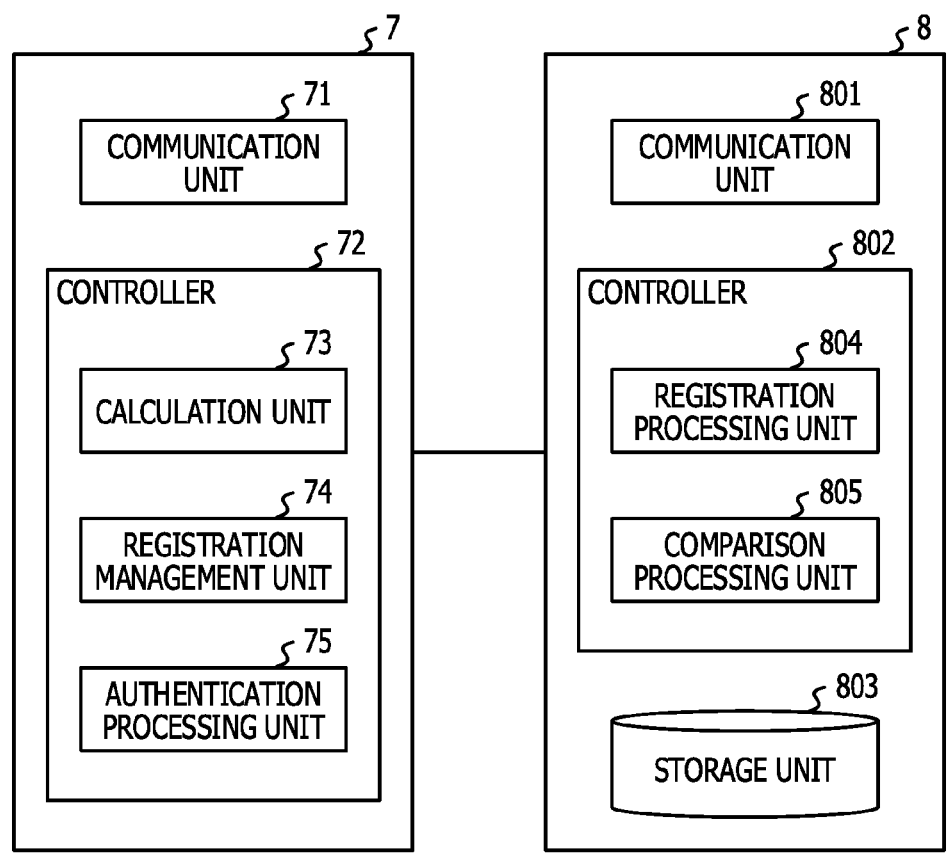
FIG. 16 is a diagram illustrating functional blocks of an authentication device and a comparison device according to the fifth embodiment.

FIG. 16 is a diagram illustrating functional blocks of the authentication device 7 and a comparison device 8 according to the fifth embodiment. In this embodiment, the first and second comparison devices 81 and 82 are collectively referred to as a comparison device 8. Furthermore, the terminal device 2 has a functional configuration the same as that of the first embodiment.

The authentication device 7 includes a communication unit 71 and a controller 72. The authentication device 7 may further include a storage unit which stores information used for various processes. The communication unit 71 performs a process of performing communication with other devices, such as the terminal device 2 and the comparison device 8. The controller 72 is a processing unit which controls various processes performed by the authentication device 7, such as an authentication process.

The controller 72 includes a calculation unit 73, a registration management unit 74, and an authentication processing unit 75. The calculation unit 73 obtains binary data of biometric information from the terminal device 2 and calculates a feature value of the binary data. When the communication unit 71 receives a registration request, for example, the calculation unit 73 calculates a Hamming weight of binary data of biometric information included in the registration request. On the other hand, when the communication unit 71 receives an authentication request, the calculation unit 73 calculates a Hamming weight of binary data of biometric information included in the authentication request. The calculation unit 73 outputs a result of the calculation to the registration management unit 74 or the authentication processing unit 75.

Next, when receiving the registration request from the terminal device 2, the registration management unit 74 executes a registration management process. Specifically, the registration management unit 74 outputs a registration request including the binary data and a feature value calculated by the calculation unit 73 to the first comparison device 81 or the second comparison device 82.

The registration management unit 74 requests one of the comparison devices 8 which has a smallest number of registration data to store the registration data, for example. Furthermore, the registration management unit 74 may determine one of the comparison devices 8 which stores the registration data such that the numbers of registration data having the same Hamming weight between the first comparison device 81 and the second comparison device 82 become substantially the same as each other. In this case, the authentication device 7 may store information associated with registration data stored in the individual comparison devices 8 which perform comparison processes in associated with one another.

The authentication processing unit 75 executes an authentication process when receiving an authentication request from the terminal device 2. Specifically, the authentication processing unit 75 operates in association with the first and second comparison devices 81 and 82 so as to execute authentication. The authentication processing unit 75 determines that the authentication has been successfully performed when registration data in which a difference between the registration data and input data is equal to or smaller than a threshold value is detected, for example, in accordance with comparison results of the first and second comparison devices 81 and 82.

Next, the comparison device 8 will be described. The comparison device 8 includes a communication unit 801, a controller 802, and a storage unit 803. The communication unit 801 performs a process of performing communication with other devices, such as the authentication device 7. The controller 802 is a processing unit which controls various processes performed by the comparison device 8, such as a comparison process.

The storage unit 803 stores information used in the various processes, such as registration data. The storage unit 803 of the first comparison device 81 and the storage unit 803 of the second comparison device 82 exclusively store registration data. The registration data is managed by a registration data table having a data configuration the same as those of the first embodiment.

When receiving a registration request from the authentication device 7, a registration processing unit 804 executes a registration process. Specifically, the registration processing unit 804 associates binary data included in the registration request, a feature value, and a user ID with one another and registers the binary data, the feature value, and the user ID in the storage unit 803.

A comparison processing unit 805 executes a comparison process. Content of the comparison processes has been described in detail in one of the first to third embodiments. Note that, in a case where the comparison process of the third embodiment is executed, when the threshold value is updated by one of the first and second comparison devices 81 and 82, the updated threshold value is transmitted to the other of the first and second comparison devices 81 and 82 through the authentication device 7.

Figure 17:
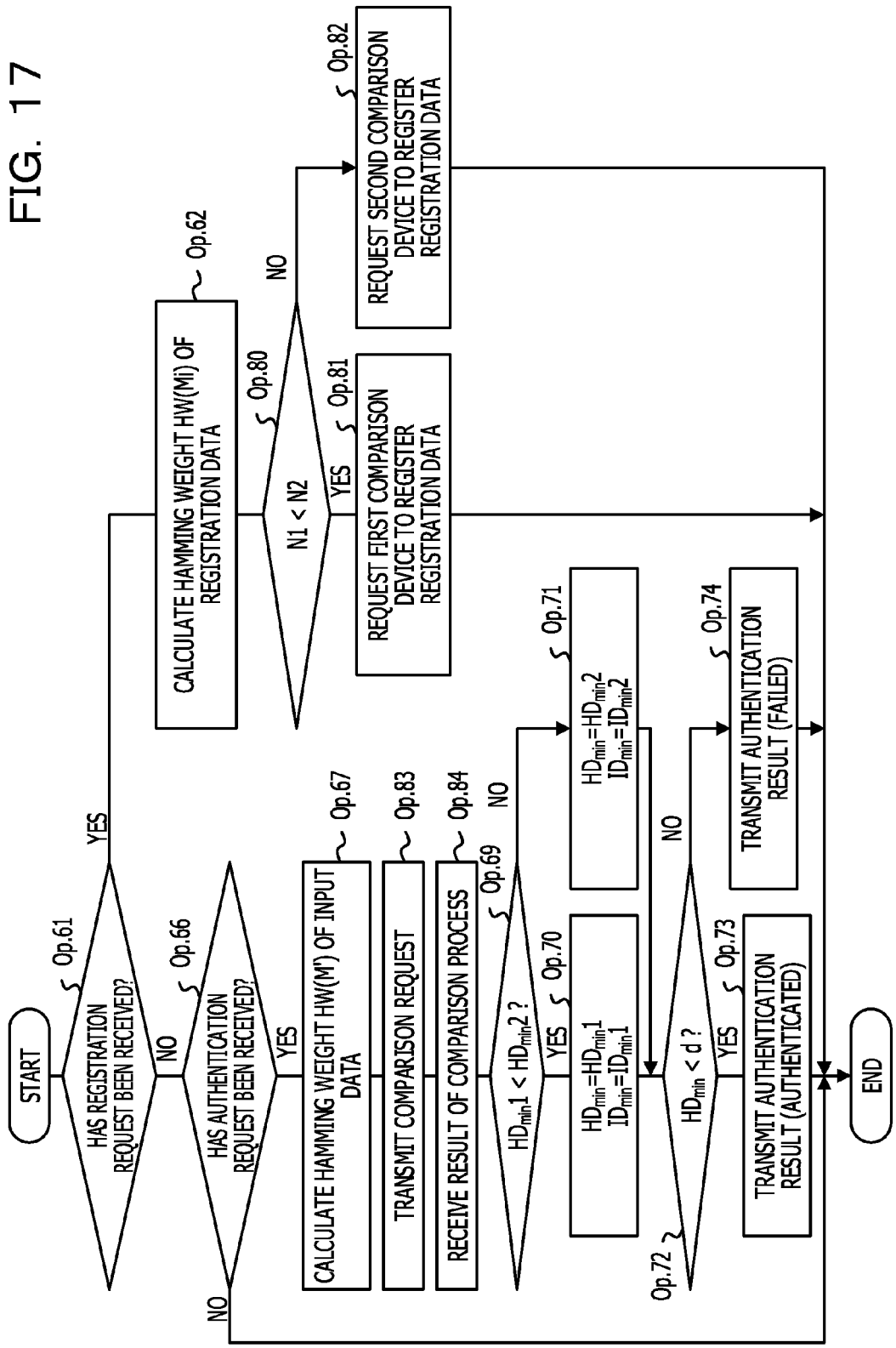
FIG. 17 is a flowchart illustrating a process of the authentication device according to the fifth embodiment.

Next, a processing flow of the authentication device 7 according to the fifth embodiment will be described. FIG. 17 is a flowchart illustrating a process of the authentication device 7 according to the fifth embodiment. Processes the same as those of the fourth embodiment are denoted by reference numerals the same as those of the fourth embodiment, and descriptions thereof are simplified.

The controller 72 determines whether the communication unit 71 has received a registration request (OP. 61). When the registration request has been received (Op. 61 Yes), the calculation unit 73 calculates a Hamming weight HW(Mi) of registration data (Op. 62).

Thereafter, the registration management unit 74 determines whether the number N1 of registration data stored in the first comparison device 81 is smaller than the number N2 of registration data stored in the second comparison device 82 (Op. 80). When N1 is smaller than N2 (Op. 80 Yes), the registration management unit 74 transmits a registration request including the registration data, the Hamming weight HW(Mi), and a user ID to the first comparison device 81 (Op. 81). Then the controller 62 terminates a series of registration processes.

On the other hand, when N1 is equal to or larger than N2 (Op. 80 No), the registration management unit 74 transmits a registration request including the registration data, the Hamming weight HW(Mi), and the user ID to the second comparison device 82 (Op. 82). Then the controller 62 terminates the series of registration processes. Note that the communication unit 71 may receive a response representing that the registration has been completed.

On the other hand, when a registration request has not been received (Op. 61 No), the controller 72 determines whether an authentication request has been received by the communication unit 71 (Op. 66). When an authentication request has not been received (OP. 66 No), the controller 72 terminates the series of processes.

On the other hand, when an authentication request has been received (Op. 66 Yes), the calculation unit 73 calculates a Hamming weight HW(M') of input data (Op. 67) while binary data included in the authentication request is set as the input data M'. Subsequently, the authentication processing unit 75 transmits a comparison request to the first and second comparison devices 81 and 82 through the communication unit 71 (Op. 83). The comparison request includes the input data M' and the Hamming weight HW(M') of the input data.

When receiving the comparison request, the first and second comparison devices 81 and 82 execute respective comparison processes. It is assumed that the comparison process (refer to FIG. 8) according to the first embodiment is executed in this embodiment. Then the first comparison device 81 transmits a result of the comparison process to the authentication device 7 through the communication unit 801. The result of the comparison process includes a minimum Hamming distance variable HDmin1 and a minimum ID variable IDmin1 obtained at a time when the comparison processing unit 805 of the first comparison device 81 terminates the comparison process.

The second comparison device 82 transmits a result of the comparison process to the authentication device 7 through the communication unit 801. The result of the comparison process includes a minimum Hamming distance variable HDmin2 and a minimum ID variable IDmin2 obtained at a time when the comparison processing unit 805 of the second comparison device 82 terminates the comparison process.

The authentication processing unit 75 of the authentication device 7 receives the requests of the comparison processes from the first and second comparison devices 81 and 82 through the communication unit 71 (Op. 84). Note that, in this process, the authentication processing unit 75 does not perform a subsequent process until the authentication processing unit 75 receives the results of the processes from the two comparison devices 8, that is, the first and second comparison devices 81 and 82. When the individual comparison devices 8 execute the respective comparison processes according to the third embodiment, a threshold value d updated by one of the comparison devices 8 is supplied to the other of the comparison devices 8 under control of the authentication processing unit 75.

The authentication processing unit 75 determines whether the minimum Hamming distance variable HDmin1 is smaller than the minimum Hamming distance variable HDmin2 (Op. 69). When the minimum Hamming distance variable HDmin1 is smaller than the minimum Hamming distance variable HDmin2 (Op. 69 Yes), the authentication processing unit 75 determines that the minimum Hamming distance variable HDmin1 is assigned to a minimum Hamming distance variable HDmin and determines that the minimum ID variable IDmin1 is assigned to a minimum ID variable IDmin (Op. 70).

When the minimum Hamming distance variable HDmin1 is equal to or larger than the minimum Hamming distance variable HDmin2 (Op. 69 No), the authentication processing unit 75 determines that the minimum Hamming distance variable HDmin2 is assigned to the minimum Hamming distance variable HDmin and determines that the minimum ID variable IDmin2 is assigned to the minimum ID variable IDmin (Op. 71).

Then the authentication processing unit 75 determines whether the minimum Hamming distance variable HDmin is smaller than the threshold value d (Op. 72). When the minimum Hamming distance variable HDmin is smaller than the threshold value d (Op. 72 Yes), the communication unit 71 transmits a result of authentication representing that the authentication has been successfully performed to the terminal device 2 (Op. 73). On the other hand, when the minimum Hamming distance variable HDmin is equal to or larger than the threshold value d (Op. 72 No), the communication unit 71 transmits a result of the authentication representing that the authentication has failed to the terminal device 2 (Op. 74)

As described above, according to this embodiment, the first and second comparison devices 81 and 82 execute the authentication process in combination. Accordingly, a period of time used for the authentication processes is reduced.

Hardware Configuration

Figure 18:
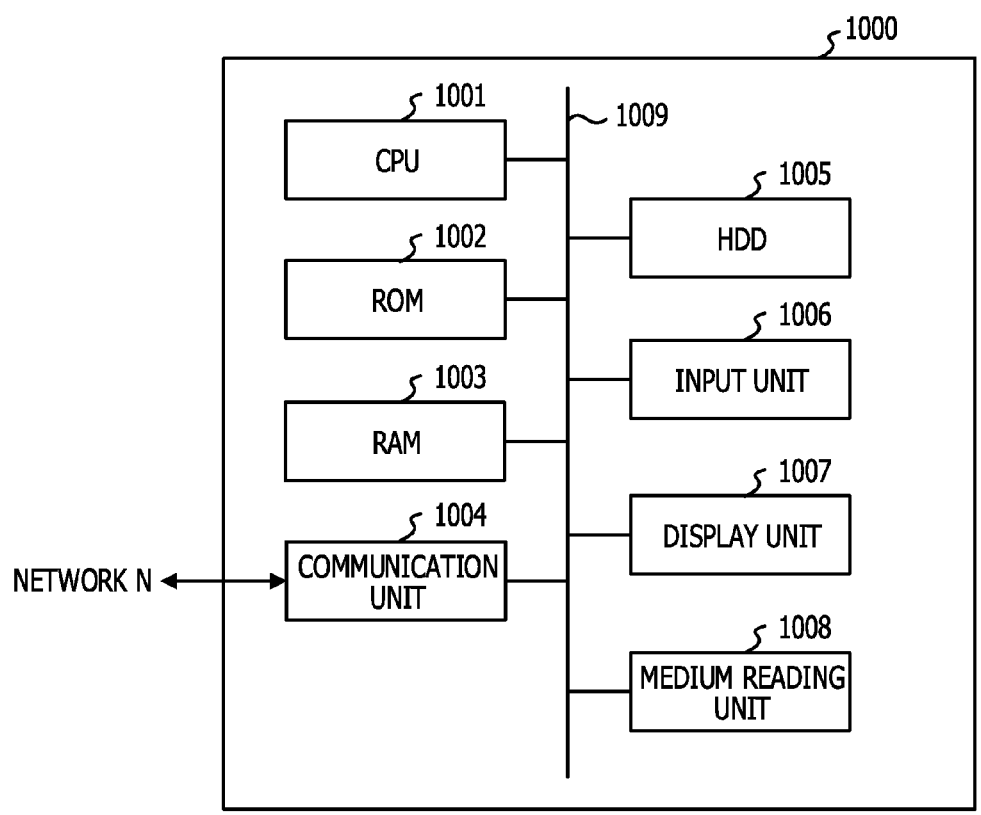
FIG. 18 is hardware configurations of the units according to the first to fifth embodiments.

FIG. 18 is a hardware configuration of the units of the present technique. In FIG. 18, a hardware configuration of a computer 1000 which functions as the authentication device 1, 1', 1", 6, or 7 is illustrated. Note that the terminal device 2 and the comparison device 8 are also realized by a computer having the same hardware configuration.

The computer 1000 executes an authentication process (including a comparison process) and functions as one of the authentication devices 1, 1', 1", 6, and 7 according to the foregoing embodiments. The computer 1000 includes a central processing unit (CPU) 1001, a read only memory (ROM) 1002, a random access memory (RAM) 1003, a communication unit 1004, a hard disk drive (HDD) 1005, an input unit 1006, a display unit 1007, and a medium reading unit 1008 which are connected to one another through a bus 1009. The individual units may perform transmission and reception of data with one another under control of the CPU 1001.

An authentication program including the authentication process illustrated in the flowcharts of the foregoing embodiments described therein is recorded in a recording medium readable by the computer 1000. Also as for the registration process, a registration program is recorded in a recording medium readable by the computer 1000. Examples of the recording medium readable by the computer 1000 include a magnetic recording device, an optical disc, a magneto-optical recording medium, and a semiconductor memory. Examples of the magnetic recording device include an HDD, a flexible disk (FD), and a magnetic tape (MT).

Examples of the optical disc include a digital versatile disc (DVD), a DVD-RAM, a compact disc-read only memory (CD-ROM), and a compact disc-recordable/Rewritable (CD-R/RW). Examples of the magneto-optical recording medium include a magneto-optical disk (MO).

When the authentication program is to be distributed, portable recording media, such as DVDs and CD-ROMs, which record the authentication program may be sold.

The medium reading unit 1008 of the computer 1000 which executes the authentication program including the authentication process of the foregoing embodiments described therein reads the program from the recording medium including the authentication program recorded therein. The CPU 1001 stores the read authentication program in the HDD 1005, the ROM 1002, or the RAM 1003.

The CPU 1001 is a central processing unit which performs control of operation of the entire authentication device according to the foregoing embodiments. Then the CPU 1001 reads the authentication program according to the foregoing embodiments from the HDD 1005 and executes the program. The CPU 1001 functions as a controller of the units. As described above, the program may be stored in the ROM 1002 or the RAM 1003 which is accessible by the CPU 1001. Next, the communication unit 1004 functions as a communication unit of the units under control of the CPU 1001.

The HDD 1005 functions as a storage unit of the units under control of the CPU 1001. Specifically, the HDD 1005 stores information used for a registration process and an authentication process. As with the program, information used for the registration process and the authentication process may be stored in the ROM 1002 or the RAM 1003 which is accessible by the CPU 1001. Furthermore, various information generated in course of the processes is stored in the RAM 1003, for example. Specifically, the RAM 1003 may function as a storage unit.

The input unit 1006 accepts various inputs. The input unit 1006 includes a keyboard and a mouse. The display unit 1007 displays various information. The display unit 1007 is a display, for example.

Sixth Embodiment

In a sixth embodiment, a seventh embodiment, and an eighth embodiment disclosed hereinafter, one-to-many authentication between input information and encrypted authentication information is performed. These embodiments are provided to sufficiently perform a one-to-many authentication process between input information and encrypted authentication information.

Figure 19:
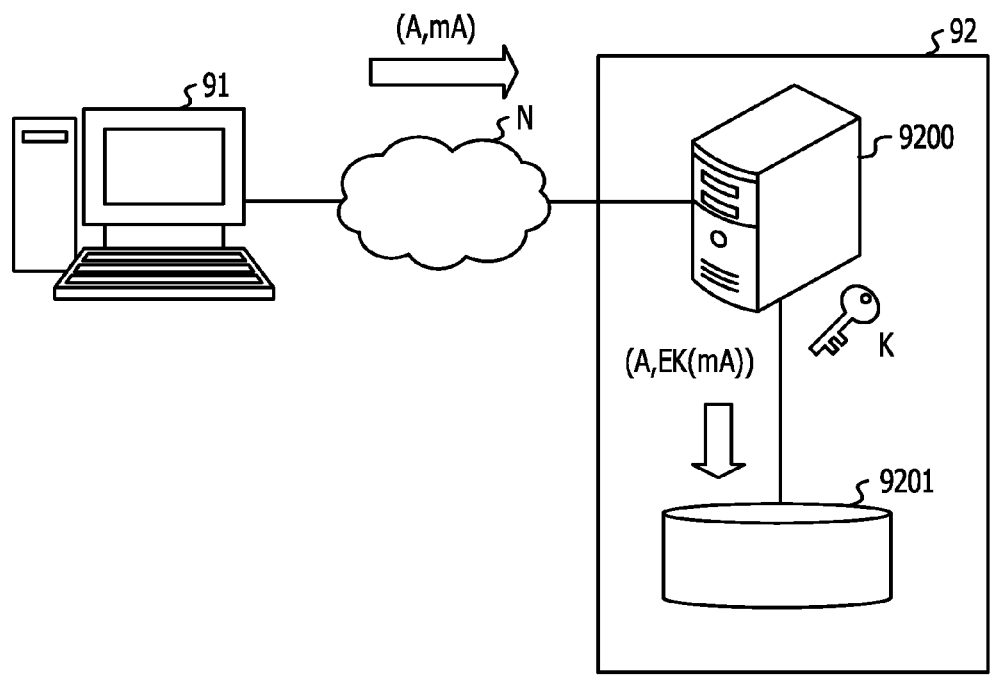
FIG. 19 is a diagram illustrating a registration process in an authentication system according to a sixth embodiment.
Figure 20:
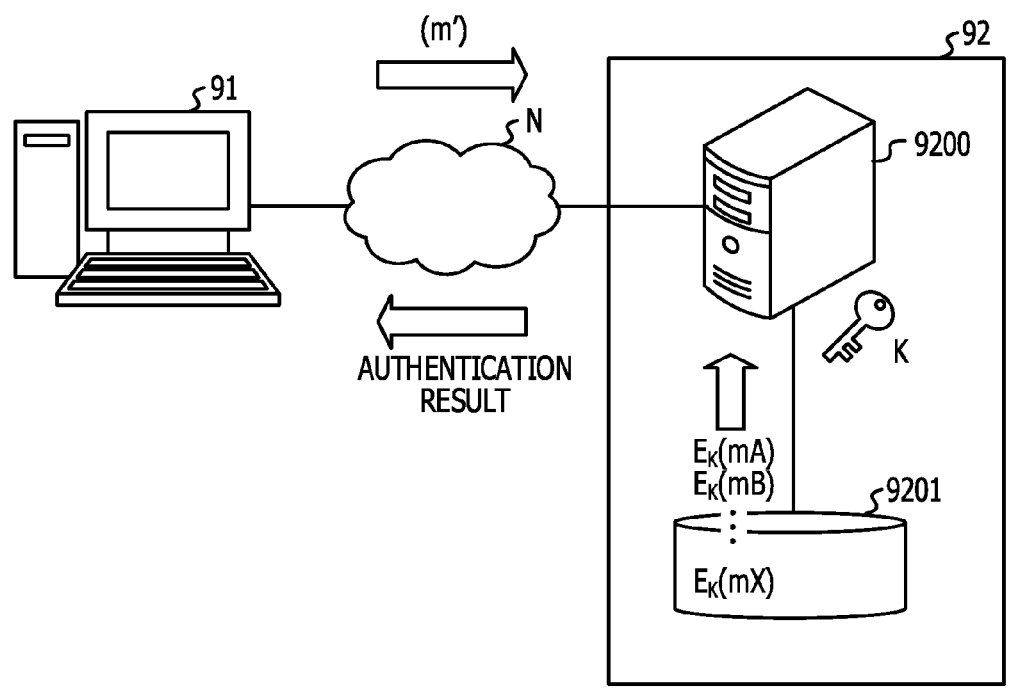
FIG. 20 is a diagram illustrating an authentication process in the authentication system according to the sixth embodiment.

FIGS. 19 and 20 are diagrams illustrating an authentication system according to a sixth embodiment. The authentication system according to the sixth embodiment includes a terminal device 91 and an authentication device 92. The terminal device 91 and the authentication device 92 are connected to each other through a network N. The network N is the Internet, for example.

The terminal device 91 is a computer which requests the authentication device 92 to perform authentication. The authentication device 92 is a computer which executes one-to-many authentication in response to the request supplied from the terminal device 91. Furthermore, the authentication device 92 includes a server 9200 which executes various processes and a database 9201 which stores information used to perform authentication.

FIG. 19 is a diagram illustrating a registration process in the authentication system according to the sixth embodiment. In the registration process, authentication information is registered.

The terminal device 91 receives input of a user ID "A" of a user of a registration target and input of authentication information mA of the registration target. The user ID is information assigned to identify a user in the system. Furthermore, the authentication information is compared with input information at a time of the one-to-many authentication, and is generated by a user's input, such as password information or biometric information. Examples of the biometric information include iris information, fingerprint information, and vein information, and the biometric information is extracted from image data obtained by capturing a living body by a specific algorithm. The terminal device 91 includes a reading device which obtains various authentication information.

Next, the terminal device 91 transmits the user ID "A" and the authentication information mA to the authentication device 92. In this embodiment, for communication through the network N, an encryption communication technique, such as secure socket layer (SSL), may be used.

The authentication device 92 receives the user ID "A" and the authentication information mA. Then the authentication device 92 encrypts the authentication information mA using key information K so as to generate encryption authentication information $E_K(mA)$. Note that the key information K has a bit string equal to or larger than a bit length of the authentication information mA. In a description below, it is assumed that the authentication information mA has 8 bits and the key information also has 8 bits.

Then the database 9201 stores the user ID "A" and the encryption authentication information $E_K(mA)$ which are associated with each other. The authentication information is denoted by "mi" except for a case where authentication information is distinguished according to users hereinafter.

Here, the encryption authentication information $E_K(mi)$ will be described. The encryption authentication information $E_K(mi)$ is obtained by encrypting the authentication information mi supplied from the terminal device 91 in accordance with a specific rule using the key information K included in the authentication device 92. Any encryption method may be employed in this embodiment as long as Condition 3 below is satisfied.

$$F(X,Y)=F(E_K(X),E_K(Y))$$ (Condition 3)

Here, "F" denotes a function of outputting a result of comparison between two input information pieces (plain text X and plain text Y). Furthermore, "$E_K$" denotes a function of encryption using the key information K. Condition 3 represents that any encryption method may be used in this embodiment as long as a result of comparison between plain texts is reproduced when comparison is performed in a state in which the two input information pieces are encrypted using the same key information.

Hereinafter, it is assumed that "F" denotes a function of calculating exclusive OR of two input information pieces. Furthermore, as "$E_K$", a function of calculating exclusive OR between the key information K and input information or a function of a CTR mode of AES encryption is applicable. Instead of the key information K itself, a random number generated by the key information K may be used as key information for encryption. The random number is referred to as a mask value RK.

In this embodiment, Vernam cipher is employed as an encryption method, and "$E_K$" denotes a function of calculating exclusive OR between the key information K and input information. Specifically, the encryption authentication information $E_K(mA)$ is obtained by exclusive OR between the authentication information mA and the key information K. When an encryption method using the exclusive OR is employed, processing calculation amounts of various units in a registration process and an authentication process described below may be reduced. Furthermore, increase of a data amount caused by encryption may be suppressed.

FIG. 20 is a diagram illustrating an authentication process in the authentication system according to the sixth embodiment. The terminal device 91 transmits an authentication request to the authentication device 92. The terminal device 91 generates input information m' to be input to the authentication device 92 as an authentication target, and transmits the input information m' to the authentication device 92. The input information m' is generated by a user's input, and examples of the input information m' include password information and biometric information. The input information m' is generated by an algorithm the same as that of the authentication information.

Note that, in an authentication process, the user may not input a user ID to the terminal device 91. Therefore, the user ID is not transmitted when the input information m' is transmitted from the terminal device 91 to the authentication device 92. As described above, in an authentication process of one-to-one authentication, a user ID is used to uniquely identify information on a comparison target. However, in an authentication process of one-to-N authentication, comparison targets are not limited using a user ID, and accordingly, input of a user ID is not performed.

When receiving the input information m', the authentication device 92 sequentially reads a plurality of encryption authentication information $E_K(mi)$ stored in the database 9201. Then the authentication device 92 compares the encryption authentication information $E_K(mi)$ and the input information m' with each other. For example, the authentication device 92 performs exclusive OR using the encryption authentication information $E_K(mi)$ and the input information m' so as to obtain comparison results $E_K(HVi)$. Here, "HVi" denotes results of calculations of the exclusive OR between the authentication information mi and the input information m', that is, results of comparisons between the authentication information mi and the input information m'.

The encryption authentication information $E_K(mi)$ which is results of calculations of the exclusive OR between the key information K and the authentication information mi and results of calculations of the exclusive OR between the encryption authentication information $E_K(mi)$ and the input information m' are the same as results of calculations of exclusive OR between the results HVi of the calculations of the exclusive OR between the authentication information mi and the key information K. Accordingly, comparison results are represented by "$E_K(HVi)$".

For example, the authentication device 92 reads "$E_K(mA)$" and calculates a comparison result $E_K(HVA)$ by exclusive OR between the input information m' and the encryption authentication information $E_K(mA)$. Here, since the comparison result $E_K(HVA)$ is information obtained by encrypting a comparison result HVA between the authentication information mA and the input information m' by the key information K, the authentication device 92 may obtain the comparison result HVA between the authentication information mA and the input information m' by decrypting the comparison result $E_K(HVA)$ by the key information K.

When the authentication device 92 obtains the comparison result HVA by the decryption, the authentication device 92 determines whether authentication has been successfully performed by a determination as to whether the number of bits corresponding to 1 is equal to or smaller than a threshold value d, for example. The authentication device 92 assigns "1" to the comparison result HVA when the authentication information mA and the input information m' have different values in comparison between the authentication information mA and the input information m' for individual bits. Therefore, when the number of bits representing "1" is equal to or smaller than the threshold value d in the comparison result HVA, similarity between the authentication information mA and the input information m' is high. In this case, it is estimated that it is highly likely that the input information m' is derived from a user of the authentication information mA. Accordingly, the authentication device 92 determines that the user corresponding to the input information m' has been registered in advance, that is, determines that the authentication is successfully performed.

However, according to the foregoing method, comparison results $E_K(HVi)$ of encrypted authentication information $E_K(mi)$ of all registered users are to be calculated and all the comparison results $E_K(HVi)$ are to be decrypted by the key information K. Therefore, processing costs for the decryptions corresponding to the number of the registered users are increased. Accordingly, in this embodiment, decryption is performed using the key information K only on comparison results $E_K(HVi)$ which satisfy a predetermined condition.

Figure 21:
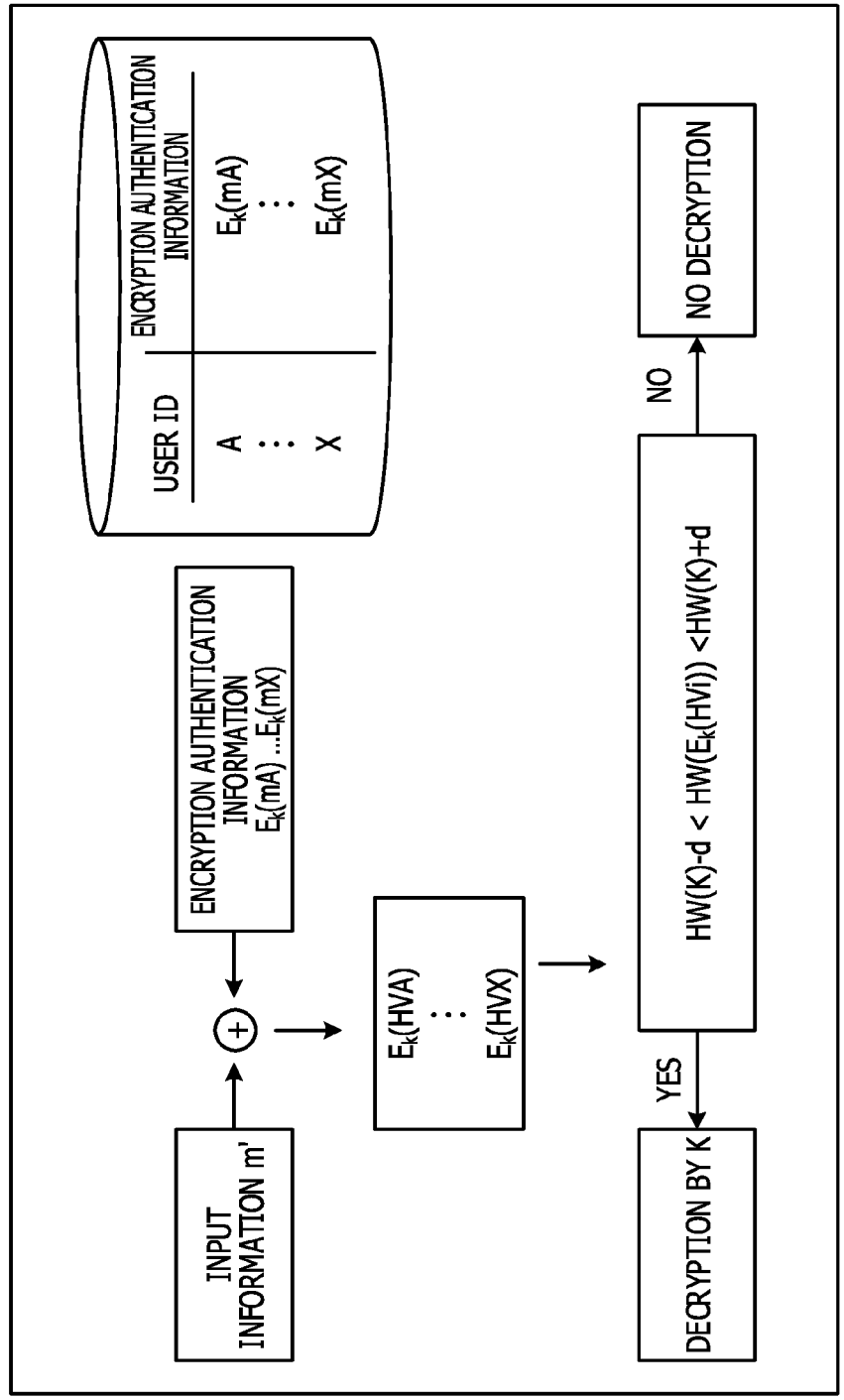
FIG. 21 is a diagram illustrating reduction of a processing cost.

FIG. 21 is a diagram illustrating reduction of a processing cost. A process of the authentication device 92 will be briefly illustrated in FIG. 21. First, the authentication device 92 performs exclusive OR of the encryption authentication information $E_K(mi)$ and the input information m' so that comparison results $E_K(HVi)$ are obtained for individual registered users. Then the authentication device 92 performs a decryption process using the key information K only on a number of the comparison results $E_K(HVi)$ which satisfy Condition 4 below. Note that Condition 4 is determined in accordance with a characteristic of the key information K. Furthermore, when the threshold value d used for the determination as to whether authentication has been successfully performed is not 0, Condition 4 is further determined in accordance with the threshold value d used for the determination as to whether authentication has been successfully performed.

$$HW(K)-d<HW(E_K(HVi))<HW(K)+d \qquad \text{(Condition 4)}$$

Here, "HW(K)" is information representing the characteristic of the key information K and represents the number of bits corresponding to "1" in a bit string of the key information K. For example, when the key information is "11000011", HW(K) is 4. The threshold value d is used for a determination in a process of determining whether authentication has been successfully performed. For example, the threshold value d is set as a value of 5% of a bit length of authentication information, and in this embodiment, the threshold value d is "2". In this case, according to Condition 4, when $HW(E_K(HVi))$ is larger than 2 and smaller than 6, $E_K(HVi)$ is decrypted by the key information K. "$HW(E_K(HVi))$" represents the number of bits corresponding to "1" in a bit string of a comparison result $E_K(HVi)$.

Here, derivation of Condition 4 will be described. First, a condition for a determination that the authentication has been successfully performed is represented by Condition 5 below.

$$HDi<d \qquad \text{(Condition 5)}$$

Here, "HDi" denotes a Hamming distance HDi between the input information m' and the authentication information mi. Specifically, "HDi" is the number of bits representing 1 in the result HVi of the comparison between the input information m' and the authentication information mi. Condition 5 represents that authentication has been successfully performed when the Hamming distance HDi is equal to or smaller than the threshold value d.

Next, the Hamming distance HDi is normally larger than an absolute value of a difference between the number $HW(E_K(HVi))$ of bits representing "1" in the bit string of the comparison result $E_K(HVi)$ and the number $HW(K)$ of bits representing "1" in the bit string of the key information K, and accordingly, Condition 6 below is established.

$$|HW(K)-HW(E_K(HVi))| \leq HDi \quad \text{(Condition 6)}$$

When Condition 5 and Condition 6 are integrated, Condition 7 is established, and accordingly, Condition 4 is obtained by developing a leftmost member and a rightmost member of Condition 7.

$$|HW(K)-HW(E_K(HVi))| \leq HW(HVi) < d \quad \text{(Condition 7)}$$

For example, when the encryption authentication information $E_K(mA)$ is "11000010" and the input information m' is "00000101", the comparison result $E_K(HVA)$ is "11000111". In this case, $HW(E_K(HVA)$ is "5". Accordingly, the comparison result $E_K(HVA)$ is decrypted. For example, when encrypted authentication information $E_K(mB)$ is "10111011" and the input information m' is "00000101", a comparison result $E_K(HVB)$ is "10111110". In this case, $HW(E_K(HVB)$ is "6". Accordingly, the comparison result $E_K(HVB)$ is not decrypted.

As described above, since decryption is performed only on a number of comparison results $E_K(HVi)$ which satisfy Condition 4 using the key information K, the authentication device 92 obtains comparison results HVi. For example, the authentication device 92 obtains a comparison result HVA of "00000100" by decrypting a comparison result $E_K(HVA)$ of "11000111" using key information K of "11000011". In the comparison result HVA, the number of bits representing 1 is "1" which is not larger than the threshold value d of "2". Accordingly, since authentication information mA having similarity of a certain degree or more has been registered, it is determined that the input information m' is successfully authenticated.

As described above, the inventor found that, even when a result HVi of comparison between the authentication information mi and the input information m' is encrypted using the key information K (comparison result $E_K(HVi)$), a determination as to whether authentication has been successfully performed may be made in a state in which the comparison result $E_K(HVi)$ is decrypted taking the key information K and the threshold value d into consideration. Therefore, only comparison results $E_K(HVi)$ which has possibility that authentication is successfully performed are set as decryption targets by performing determination using Condition 4, and by this, the authentication device 92 may reduce a processing cost used for a process of decrypting the comparison results $E_K(HVi)$ when compared with a case where all the comparison results $E_K(HVi)$ are decrypted.

Figure 22:
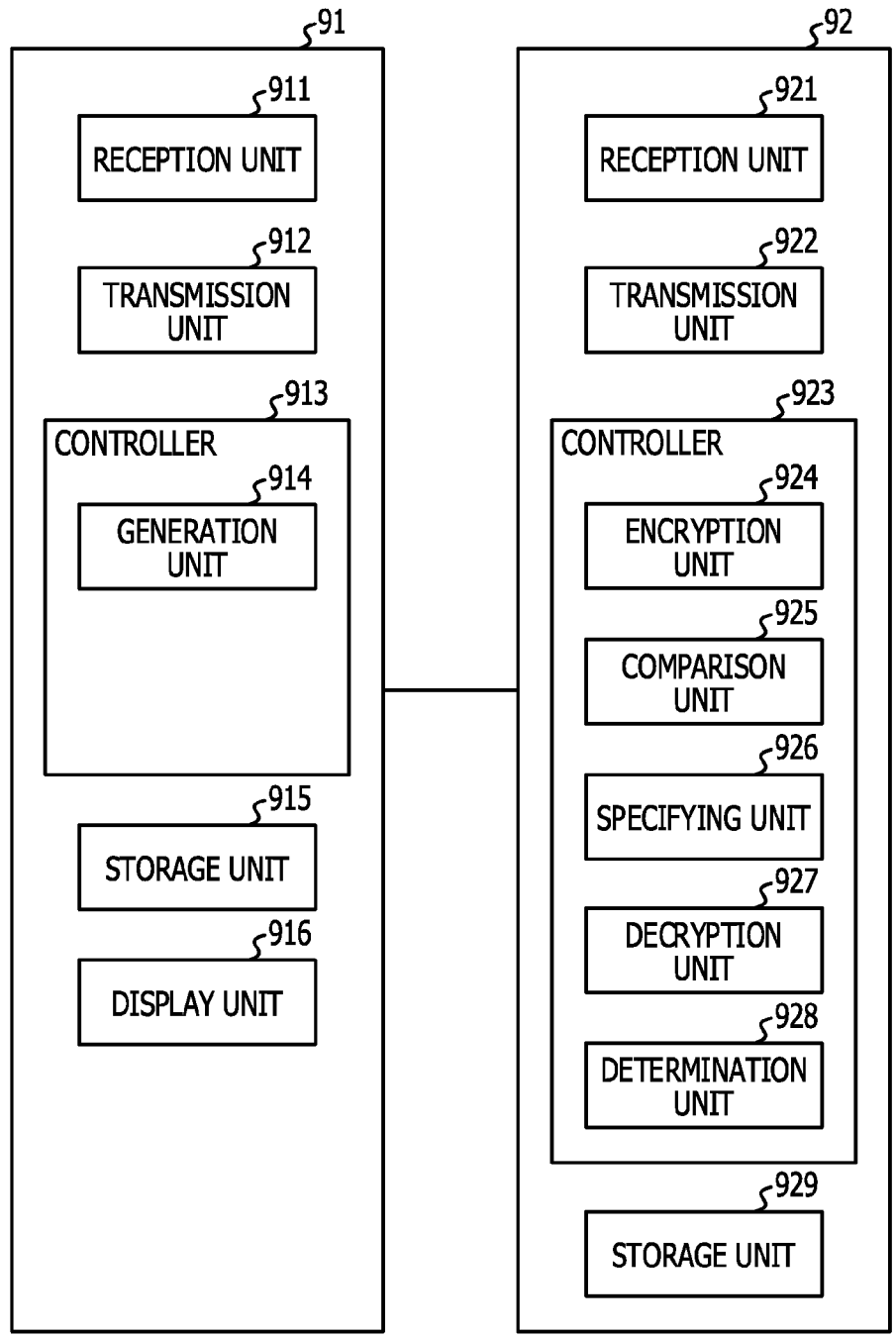
FIG. 22 is a diagram illustrating functional blocks of a terminal device and an authentication device according to the sixth embodiment.

Next, functional configurations of the terminal device 91 and the authentication device 92 according to the sixth embodiment will be described. FIG. 22 is a diagram illustrating functional blocks of the terminal device 91 and the authentication device 92 according to the sixth embodiment.

The terminal device 91 includes a reception unit 911, a transmission unit 912, a controller 913, a storage unit 915, and a display unit 916. The reception unit 911 is a processing unit which receives information from the authentication device 92. In an authentication process, for example, the reception unit 911 receives an authentication result from the authentication device 92.

The transmission unit 912 is a processing unit which transmits information to the authentication device 92. In a registration process, for example, the transmission unit 912 transmits a registration request to the authentication device 92. The registration request is information which includes a user ID "i" and authentication information mi and which requests the authentication device 92 to register authentication information mi. Furthermore, the transmission unit 912 transmits an authentication request to the authentication device 92 in the authentication process. The authentication request is information which includes input information m' and which requests the authentication device 92 to perform authentication.

The controller 913 is a processing unit which controls operation of the terminal device 91. For example, the controller 913 controls the registration process and the authentication process. The controller 913 includes a generation unit 914, for example.

The generation unit 914 is a processing unit which generates the authentication information mi and the input information m' to be subjected to the authentication. For example, the generation unit 914 obtains an image and a password input by an image pickup device which captures an image and an input device which accepts input of a password and the like. When the authentication information mi and the input information m' are biometric information, an image is obtained by capturing a portion of a user using the image pickup device and information on a feature point is extracted from the image so that the generation unit 914 generates the authentication information mi and the input information m'.

The storage unit 915 stores information used for the registration process and the authentication process. The display unit 916 displays various information. After receiving an authentication result, the display unit 916 displays the authentication result, for example.

The authentication device 92 includes a reception unit 921, a transmission unit 922, a controller 923, and a storage unit 929. The reception unit 921 is a processing unit which receives information from the terminal device 91. The reception unit 921 receives a registration request and an authentication request from the terminal device 91, for example. The transmission unit 922 is a processing unit which transmits information to the terminal device 91. The transmission unit 922 transmits an authentication result to the terminal device 91, for example.

The controller 923 is a processing unit which controls operation of the authentication device 92. The controller 923 executes the registration process and the authentication process, for example. The controller 923 includes an encryption unit 924, a comparison unit 925, a specifying unit 926, a decryption unit 927, and a determination unit 928.

The encryption unit 924 is a processing unit which executes an encryption process. The encryption unit 924 generates encryption authentication information $E_K(mi)$ by encrypting the authentication information mi using the key information K in the registration process, for example. Then the encryption unit 924 stores the encryption authentication information $E_K(mi)$ and a user ID "i" which are associated with each other in the storage unit 929.

The comparison unit 925 is a processing unit which compares the input information m' and a plurality of encryption authentication information $E_K(mi)$ in accordance with a specific rule while a state in which the authentication information mi is encrypted is maintained. For example, the comparison unit 925 calculates results $E_K(HVi)$ of comparisons between the encryption authentication information $E_K(mi)$ and the input information m' by exclusive OR.

The specifying unit 926 is a processing unit which specifies the encryption authentication information $E_K(mi)$ which satisfies a condition defined in accordance with a characteristic HW(K) of the key information K in accordance with the comparison results $E_K(HVi)$ calculated by the comparison unit 925. For example, the specifying unit 926 specifies comparison results which satisfy Condition 4 determined in accordance with the characteristic HW(K) of the key information K from among the plurality of comparison results $E_K(HVi)$ so as to specify encryption authentication information $E_K(mi)$ which has possibility that authentication is successfully performed in a determination as to whether authentication is successfully performed. Then the specifying unit 926 inputs the comparison results $E_K(HVi)$ which satisfy the condition to the decryption unit 927 as decryption targets. Comparison results $E_K(HVi)$ which do not satisfy the condition are not supplied to the decryption unit 927.

The decryption unit 927 is a processing unit which decrypts results of comparisons (comparison results $E_K(HVi)$) between the encryption authentication information $E_K(mi)$ specified by the specifying unit 926 and the input information m' using the key information K. For example, the decryption unit 927 calculates exclusive OR of the comparison results $E_K(HVi)$ and the key information K so as to obtain results HVi of comparisons between the authentication information mi and the input information m'.

The determination unit 928 determines whether authentication has been successfully performed in accordance with the encryption authentication information $E_K(mi)$ specified by the specifying unit 926, the input information m', and the key information K. For example, in a comparison result HVi obtained by decrypting a comparison result $E_K(HVi)$ of the encryption authentication information $E_K(mi)$ specified by the specifying unit 926, the number of bits representing "1" is compared with a threshold value d. In the comparison result HVi, the number of bits representing "1" corresponds to a Hamming distance HDi between the input information m' and the authentication information mi and represents a difference between the input information m' and the authentication information mi.

The determination unit 928 determines that authentication has been successfully performed when the Hamming distance HDi is smaller than the threshold value d. Then the determination unit 928 generates an authentication result. For example, when a comparison result which represents that the Hamming distance HDi is smaller than the threshold value d is obtained, an authentication result representing that the authentication has been successfully performed is generated. On the other hand, the determination unit 928 generates an authentication result representing that the authentication has failed, when a comparison result which represents that the Hamming distance HDi is smaller than the threshold value d is not obtained.

The determination unit 928 may terminate the process of determining whether authentication has been successfully performed when detecting a comparison result HVi representing that the Hamming distance HDi is smaller than the threshold value d. Furthermore, the determination unit 928 performs comparisons between all comparison results and the threshold value d so as to specify a comparison result representing that the Hamming distance HDi is smaller than the threshold value d and the Hamming distance HDi is the smallest Hamming distance HDi.

The storage unit 929 stores information used for the registration process and the authentication process. The storage unit 929 stores a user ID "A" and the encryption authentication information $E_K(mA)$ which are associated with each other, for example. Furthermore, the storage unit 929 stores the key information K, the characteristic HW(K) of the key information K, the threshold value d, and the like.

FIG. 23 is a diagram illustrating a data configuration of an encryption authentication information management table. The encryption authentication information management table is stored in the storage unit 929. The encryption authentication information management table stores a record number (i), a user ID, and encryption authentication information which are associated with each other. The record number (i) is information for identifying a record in the table.

Figure 24:
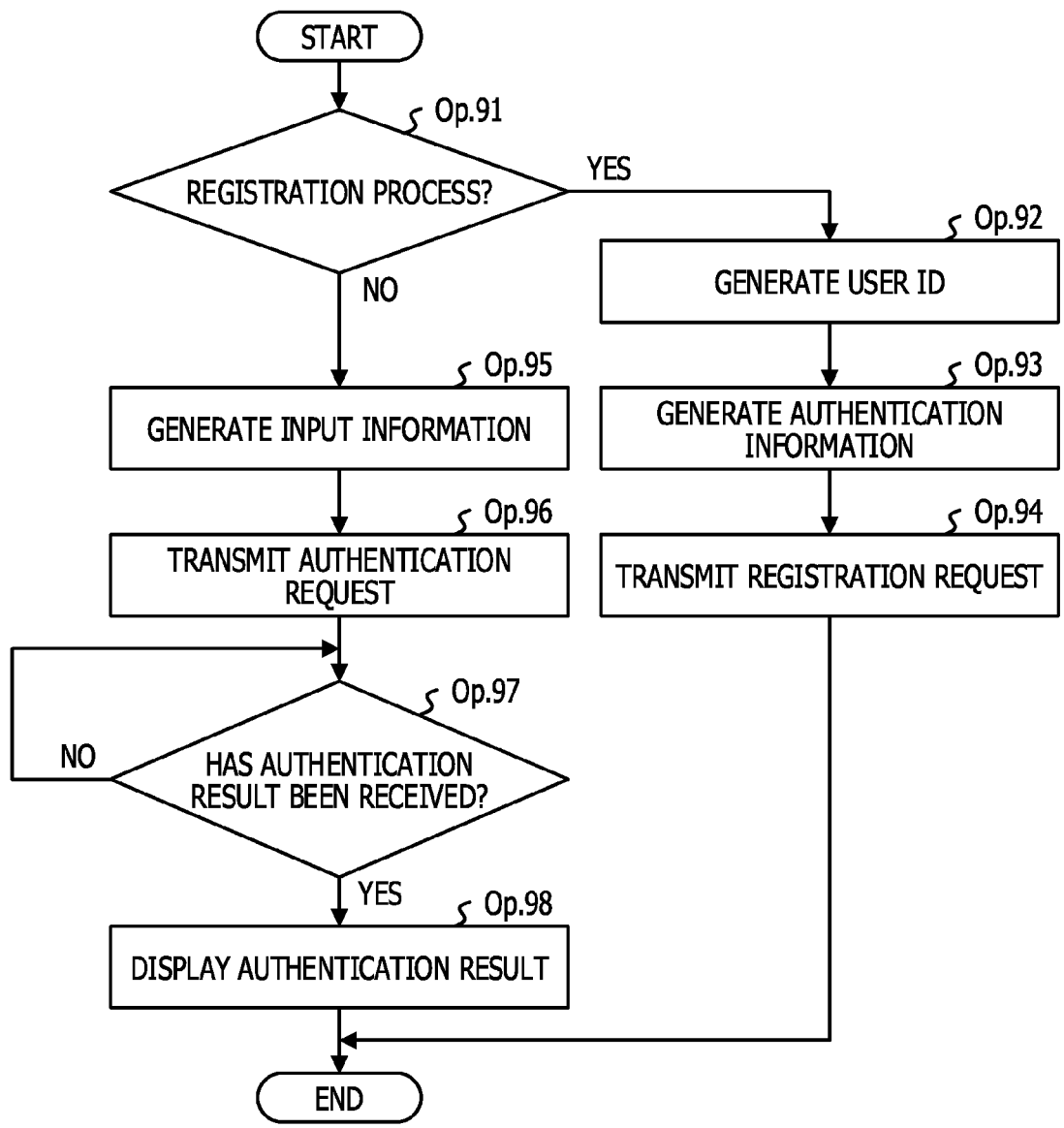
FIG. 24 is a flowchart illustrating a process of the terminal device according to the sixth embodiment.

Next, a process of the terminal device 91 according to the sixth embodiment will be described. FIG. 24 is a flowchart illustrating the process of the terminal device 91 according to the sixth embodiment. The controller 913 determines whether a registration process is to be executed (Op. 91). For example, when a user performs an input representing start of the registration process, a positive determination is performed.

When the registration process is to be executed (Op. 91 Yes), the controller 913 generates a user ID (Op. 92). Although the terminal device 91 generates a user ID in this embodiment, the controller 913 may request the authentication device 92 to generate a user ID.

Furthermore, the generation unit 914 generates authentication information by a predetermined algorithm in accordance with information obtained from a reading device (Op. 93). The controller 913 generates a registration request including the authentication information and the user ID. Thereafter, the controller 913 controls the transmission unit 912 so as to transmit the registration request to the authentication device 92 (Op. 94).

On the other hand, when the registration process is not to be executed (Op. 91 No), the generation unit 914 generates input information to be input to the authentication device 92 as an authentication target in accordance with information obtained from the reading device (Op. 95). Thereafter, the controller 913 generates an authentication request and controls the transmission unit 912 to transmit the authentication request to the authentication device 92 (Op. 96). Note that, since the one-to-many authentication is executed in this embodiment, the user does not input a user ID in the authentication process. Therefore, the authentication request does not include a user ID.

Next, the controller 913 determines whether an authentication result relative to the authentication request has been received (Op. 97). The controller 23 waits until an authentication result is received (Op. 97 No), and when the reception unit 911 has received an authentication result (Op. 97 Yes), the display unit 916 displays the authentication result under control of the controller 913 (Op. 98). For example, the display unit 916 displays a screen for displaying a notification representing that the authentication has been successfully performed or has failed for the user.

Figure 25:
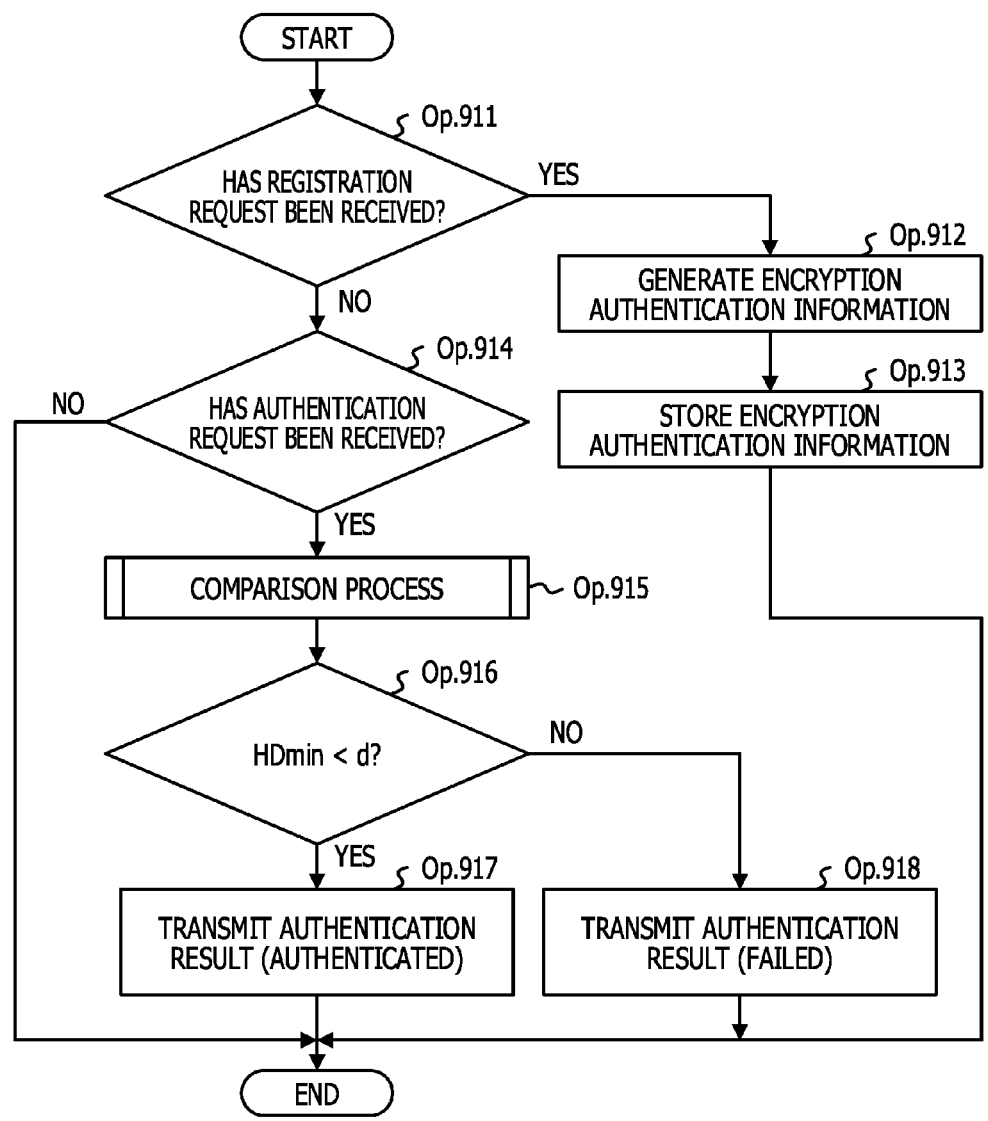
FIG. 25 is a flowchart illustrating a process of the authentication device according to the sixth embodiment.

Next, a process of the authentication device 92 according to the sixth embodiment will be described. FIG. 25 is a flowchart illustrating a process of the authentication device 92 according to the sixth embodiment. The controller 923 determines whether the reception unit 921 has received a registration request (Op. 911).

When the registration request has been received (Op. 911 Yes), the controller 923 executes a registration process. First, the encryption unit 924 encrypts authentication information mi by a predetermined rule using the key information K so as to generate encryption authentication information $E_K(mi)$ (Op. 912). The authentication information mi is included in the registration request. The encryption unit 924 calculates exclusive OR of the key information K and the authentication information mi so as to generate encryption authentication information $E_K(mi)$, for example.

The encryption unit 924 stores the user ID and the encryption authentication information $E_K(mi)$ in the encryption authentication information management table of the storage unit 929 (Op. 913). The controller 923 terminates the series of registration processes.

On the other hand, when a registration request has not been received (Op. 91 No), the controller 923 determines whether an authentication request has been received by the reception unit 921 (Op. 914). When an authentication request has not been received (OP. 914 No), the controller 923 terminates the series of processes. On the other hand, when the authentication request has been received (Op. 914 Yes), the controller 923 executes a comparison process (Op. 915).

Figure 26:
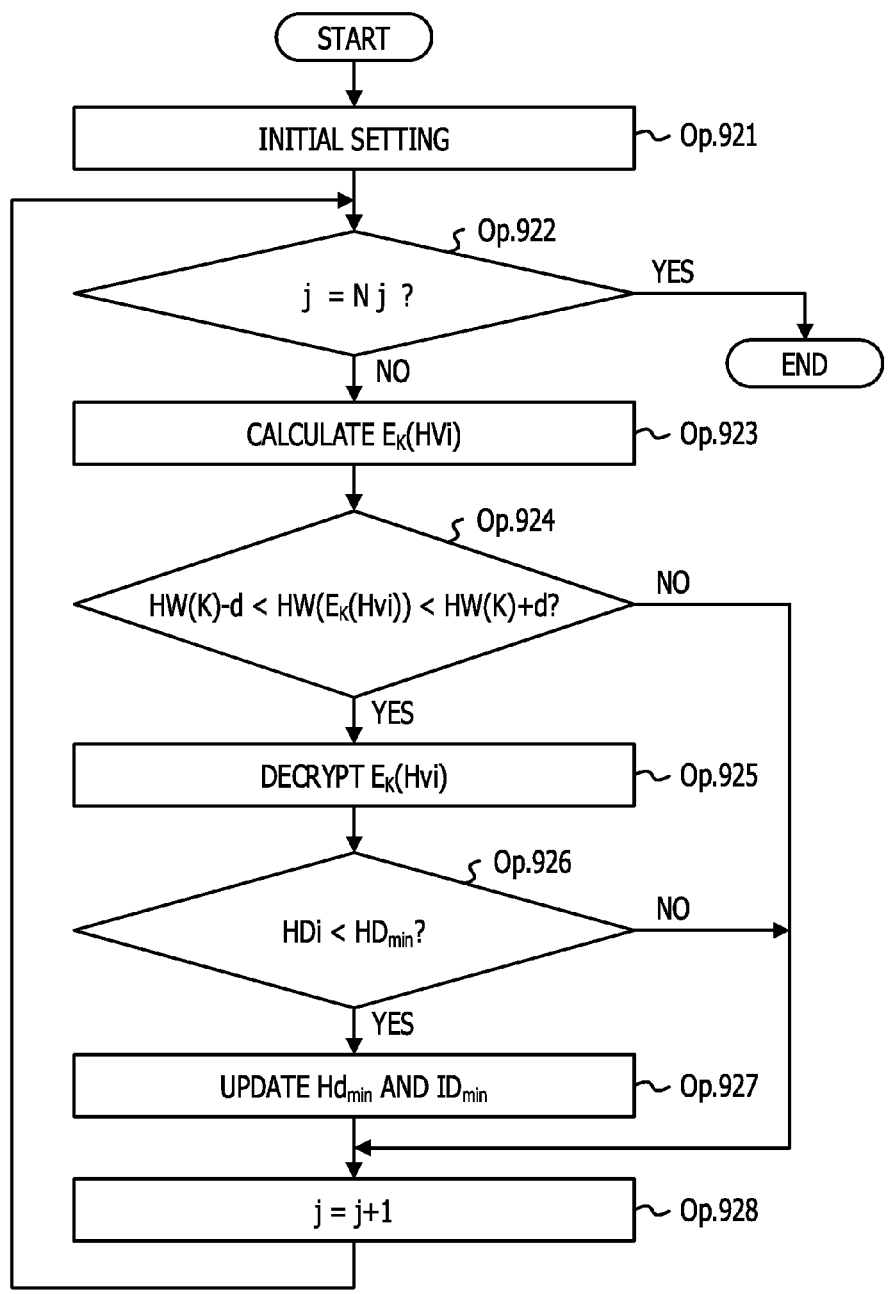
FIG. 26 is a flowchart illustrating a comparison process according to the sixth embodiment.

FIG. 26 is a flowchart illustrating the comparison process according to the sixth embodiment. First, the controller 923 performs an initial setting (Op. 921). The controller 923 assigns the number of bits of the authentication information (8, for example) to a minimum Hamming distance variable HDmin. The minimum Hamming distance variable represents the smallest one of Hamming distances between the input information m' and the authentication information mi, and is updated by executing the comparison process described hereinafter.

Furthermore, the controller 923 assigns "1" to a counter variable j in the initial setting. The counter variable corresponds to a record number of the encryption authentication information management table. Furthermore, the controller 923 assigns the number of records included in the encryption authentication information management table to a maximum counter value Nj. Then a value representing that a corresponding user ID does not exist (−1, for example) is assigns to the minimum ID variable IDmin which is used to manage user IDs of users in which authentication is successfully performed. Note that the minimum ID variable IDmin is updated by executing the comparison process hereinafter.

After the initial setting is terminated, the controller 923 determines whether the counter variable j matches the maximum counter value Nj (Op. 922). When mismatch is detected (Op. 922 No), the comparison unit 925 refers to a record corresponding to the counter variable j so as to obtain encryption authentication information $E_K(mi)$ stored in the record and calculate a result $E_K(HVi)$ of comparison with the input information m' (Op. 923). For example, the comparison unit 925 performs exclusive OR using the encryption authentication information $E_K(mi)$ and the input information m' so as to obtain a comparison result $E_K(HVi)$.

The specifying unit 926 determines whether the comparison result $E_K(HVi)$ output from the comparison unit 925 satisfies a condition defined by Condition 4 (Op. 924). When Condition 4 is satisfied (Op. 924 Yes), the decryption unit 927 decrypts the comparison result $E_K(HVi)$ using the key information K (Op. 925). Then the determination unit 928 calculates a Hamming distance HDi between the authentication information mi and the input information m' in accordance with a comparison result HVi obtained by the decryption. Then the determination unit 928 determines whether the Hamming distance HDi is smaller than the minimum Hamming distance value HDmin (Op. 926).

When the Hamming distance variable HDi is smaller than the minimum Hamming distance variable HDmin (Op. 926 Yes), the determination unit 928 updates the minimum Hamming distance variable HDmin to the minimum Hamming distance variable HDi and updates the minimum ID variable IDmin to the counter variable j (Op. 927).

When the process of Op. 927 is terminated, when Condition 4 is not satisfied (Op. 924 No), or the Hamming distance HDi is equal to or larger than the minimum Hamming distance variable HDmin (Op. 926 No), the controller 923 increments the counter variable j (Op. 928). Then the process returns to Op. 922 and the process Op. 922 onward is performed again. Specifically, when a smaller Hamming distance HDi is detected, the minimum Hamming distance HDmin is updated to the smaller Hamming distance HDi. Furthermore, the minimum ID variable IDmin is also updated.

When the counter variable j matches the maximum counter value Nj (Op. 922 Yes), the process has been performed on all encryption authentication information $E_K(mi)$. Accordingly, the controller 923 terminates the comparison process.

Next, referring back to FIG. 25, after the comparison process (Op. 915) is terminated, the determination unit 928 determines whether the minimum Hamming distance HDmin is smaller than the threshold value d (Op. 916). When the minimum Hamming distance variable HDmin is smaller than the threshold value d (Op. 916 Yes), the determination unit 928 generates an authentication result representing that the authentication has been successfully performed. Furthermore, the determination unit 928 obtains a user ID "i" stored in a record "j" represented by the minimum ID variable IDmin from the encryption authentication information management table. The transmission unit 922 transmits the authentication result representing that the authentication has been successfully performed and the user ID to the terminal device 91 (Op. 917).

Note that, when the authentication device 92 manages user IDs and user names which are associated with each other, a user name corresponding to the user ID may be transmitted to the terminal device 91. In this case, in the process of Op. 98 of FIG. 24, the display unit 916 of the terminal device 91 displays a message representing that the authentication has been successfully performed and a message prompting the user to make a determination as to whether an authenticated user is correct. For example, a message "Authentication has been successfully performed. Are you A?" is displayed. In the one-to-many authentication, a user ID is not input, and accordingly, determinations as to whether authentication has been successfully performed are made in accordance with results of comparisons between the input information m' of the user and a plurality of authentication information mi. As a result, it may be determined that the input information m' of the user and authentication information mi which does not belong to the user are similar to each other, and the authentication may be successfully performed. Accordingly, the user is prompted to check the user name so that the user recognizes whether the user has been successfully authenticated.

When the minimum Hamming distance variable HDmin is equal to or larger than the threshold value d (Op. 916 No), the determination unit 928 generates an authentication result representing that the authentication has failed. Then the transmission unit 922 transmits the authentication result representing that the authentication has failed to the terminal device 91 (Op. 918)

As described above, the authentication device 92 does not perform a decryption process on comparison results $E_K(HVi)$ of encryption authentication information $E_K(mi)$ which does not satisfy Condition 4. On the other hand, the authentication device 92 performs a decryption process on comparison results $E_K(HVi)$ of encryption authentication information $E_K(mi)$ which has possibility that authentication is successfully performed. Accordingly, the authentication device 92 suppresses exception of the encryption authentication information $E_K(mi)$ which has possibility that authentication is successfully performed from targets of limiting.

Seventh Embodiment

Figure 27:
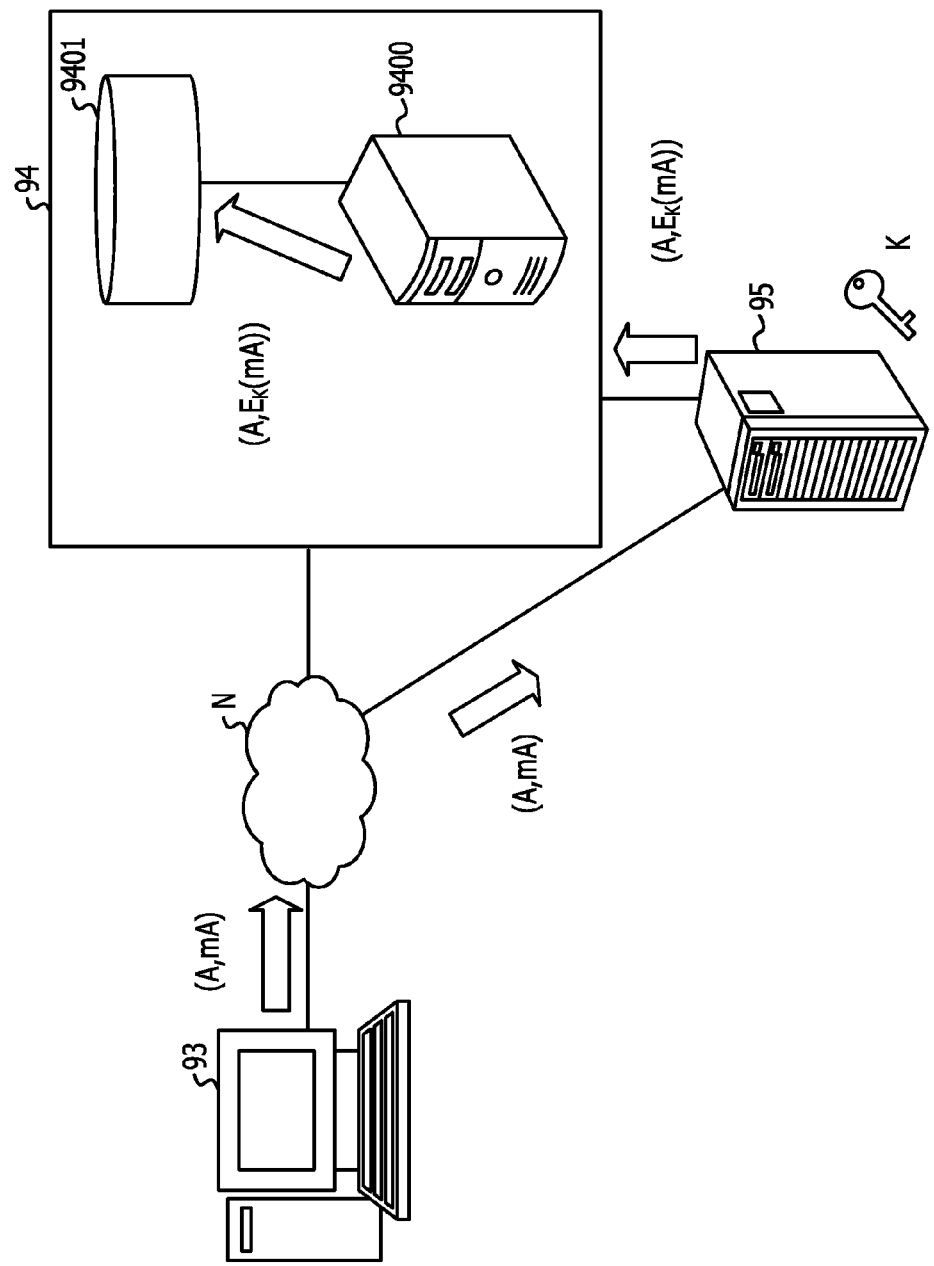
FIG. 27 is a diagram illustrating a registration process in an authentication system according to a seventh embodiment.
Figure 28:
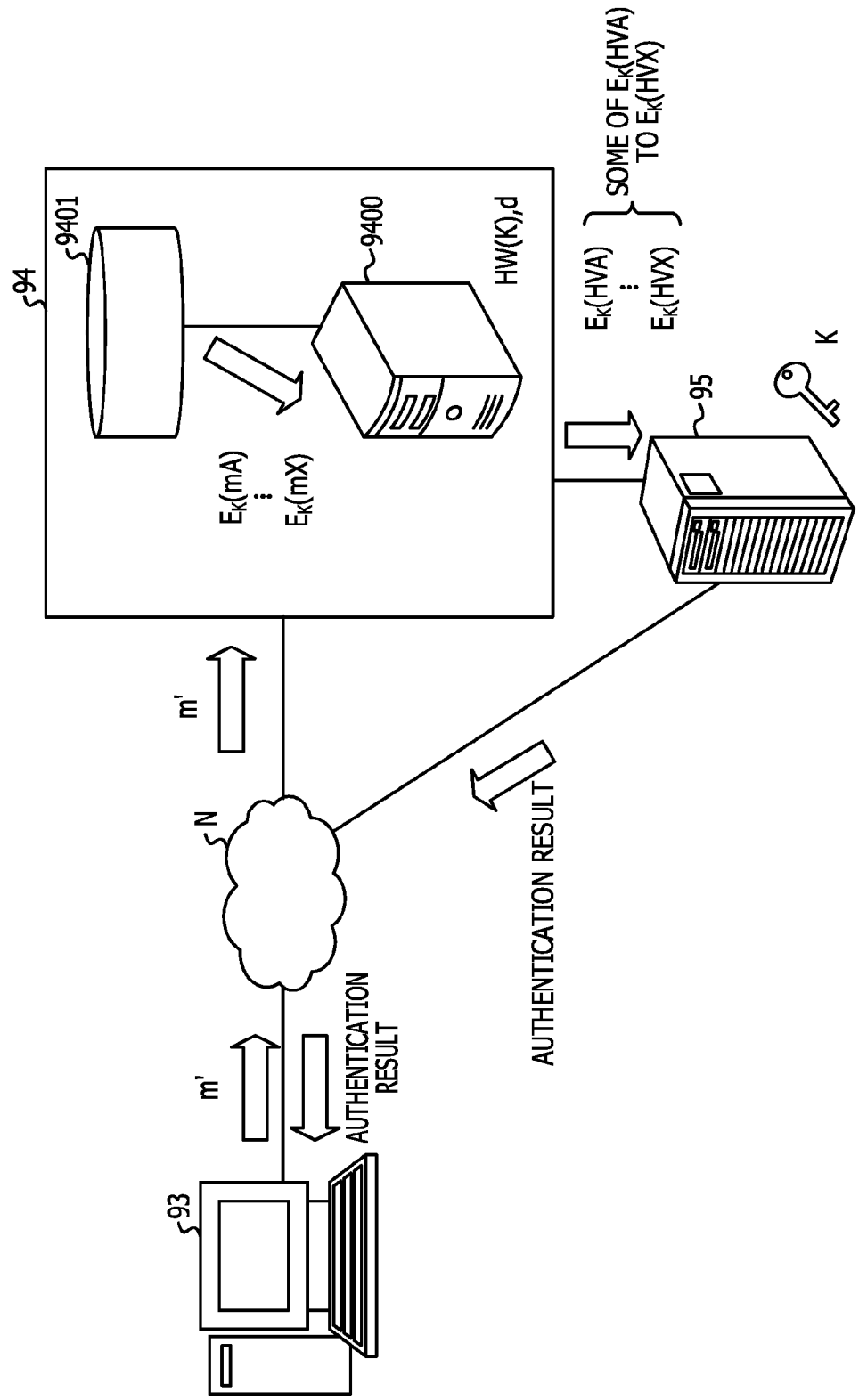
FIG. 28 is a diagram illustrating an authentication process in the authentication system according to the seventh embodiment.

FIGS. 27 and 28 are diagrams illustrating an authentication system according to a seventh embodiment. The authentication system according to the seventh embodiment includes a terminal device 93, a management device 94, and a determination device 95. The terminal device 93, the management device 94, and the determination device 95 are connected to one another through a network N. The management device 94 and the determination device 95 may be connected to each other through a dedicated network. A plurality of determination devices 95 may be connected to a single management device 94.

The terminal device 93 is a computer which requests the management device 94 to perform an authentication process. The management device 94 is a computer which manages encryption authentication information. The management device 94 includes a server 9400 which executes processes and a database 9401 which stores the encryption authentication information. The determination device 95 is a computer which determines whether authentication has been successfully performed or failed using a comparison result $E_K(HVi)$ supplied from the management device 94.

FIG. 27 is a diagram illustrating a registration process in the authentication system according to the seventh embodiment. In the registration process, the terminal device 93 first transmits a user ID "A" and authentication information mA to the determination device 95. The determination device 95 receives the user ID "A" and the authentication information mA. Then the determination device 95 encrypts the authentication information mA using key information K so as to generate encryption authentication information $E_K(mA)$. In this embodiment, the determination device 95 calculates exclusive OR of the key information K and the authentication information mA so as to generate encryption authentication information $E_K(mA)$.

Then the determination device 95 transmits the user ID "A" and the encryption authentication information $E_K(mA)$ to the management device 94. The management device 94 stores the user ID "A" and the encryption authentication information $E_K(mA)$ which are supplied from the determination device 95 and which are associated with each other in the database 9401.

FIG. 28 is a diagram illustrating an authentication process in the authentication system according to the seventh embodiment. The terminal device 93 generates input information m' to be transmitted to the management device 94. When receiving the input information m', the management device 94 calculates results $E_K(HVi)$ of comparisons between encryption authentication information $E_K(mi)$ registered in the database 9401 and the input information m'. In this embodiment, the comparison results $E_K(HVi)$ are obtained by exclusive OR of the input information m' and the encryption authentication information $E_K(mi)$. Note that "HVi" represents results of comparisons between the authentication information mi and the input information m'. The comparison results $E_K(HVi)$ correspond to information obtained by encrypting results of comparisons between the authentication information mi and the input information m' using the key information K.

Next, as with the sixth embodiment, the management device 94 specifies comparison results $E_K(HVi)$ which satisfy Condition 4 and transmits the comparison results $E_K(HVi)$ to the determination device 95 along with corresponding user IDs. The determination device 95 decrypts the received comparison results $E_K(HVi)$ using the key information K so as to obtain the results HVi of comparisons between the authentication information mi and the input information m'. Then the determination device 95 determines whether authentication has been successfully performed by comparing the numbers of bits representing "1" in the comparison results HVi with the threshold value d. The numbers of bits representing "1" in the comparison results HVi represent Hamming distances HDi between the authentication information mi and the input information m'. The determination device 95 transmits authentication results to the terminal device 93.

Here, the management device 94 may not manage the key information K itself. The management device 94 maintains only a characteristic of the key information K which is used for the determination using Condition 4. The determination device 95 generates a characteristic HW(K) of the key information K managed by the determination device 95 and transmits the characteristic HW(K) to the management device 94 before the authentication process is performed. Furthermore, the determination device 95 transmits the threshold value d used to determine whether the authentication has been successfully performed to the management device 94. The management device 94 uses the characteristic HW(K) of the key information K and the threshold value d for a determination as to whether the comparison result $E_K(HV)$ is set as a decryption target.

By this, according to the seventh embodiment, a subject (the determination device 95) which manages the key information K and performs encryption and decryption and a subject (the management device 94) which manages the encryption authentication information $E_K(mi)$ are independently provided. Therefore, an administrator of the management device 94 may not decrypt the encryption authentication information $E_K(mi)$. That is, the administrator may not obtain the authentication information mi. Since the determination device 95 does not manage the key information K and the encryption authentication information $E_K(mi)$ with together, a situation in which both of the key information K and the encryption authentication information $E_K(mi)$ are stolen and the authentication information mi is obtained by a malicious third person may be avoided.

Figure 29:
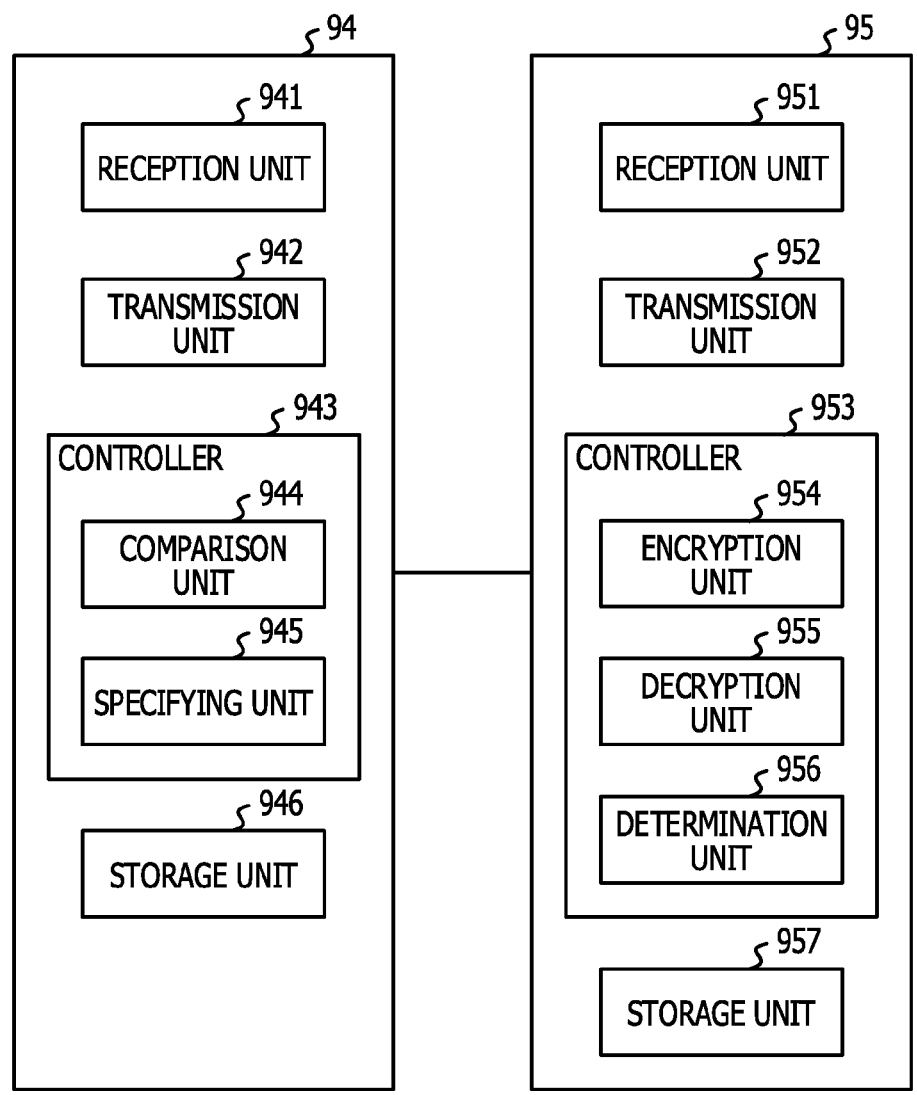
FIG. 29 is a diagram illustrating functional blocks of a management device and a determination device according to the seventh embodiment.

Next, functional configurations of the management device 94 and the determination device 95 according to the seventh embodiment will be described. FIG. 29 is a diagram illustrating functional blocks of the management device 94 and the determination device 95 according to the seventh embodiment. The terminal device 93 has a functional configuration the same as that of the terminal device 91 of FIG. 22. Note that the controller 913 controls the transmission unit 912 so that the transmission unit 912 transmits a registration request to the determination device 95 in a registration process. Furthermore, the controller 913 controls the transmission unit 912 so that the transmission unit 912 transmits an authentication request to the determination device 95 in an authentication process.

The management device 94 includes a reception unit 941, a transmission unit 942, a controller 943, and a storage unit 946. The reception unit 941 receives information from the terminal device 93 or the determination device 95. The reception unit 941 receives encryption authentication information $E_K(mi)$ and a user ID from the determination device 95. The encryption authentication information $E_K(mi)$ is generated by the determination device 95. The reception unit 941 receives an authentication request including input information m' serving as an authentication target from the terminal device 93.

The transmission unit 942 transmits information to the determination device 95. The transmission unit 942 transmits a result $E_K(HVi)$ of comparison between the input information m' and the encryption authentication information $E_K(mi)$ to the determination device 95 under control of the controller 943, for example. In addition, the transmission unit 942 may also transmit information on a user ID corresponding to the comparison result $E_K(HVi)$.

The controller 943 is a processing unit which controls operation of the management device 94. The controller 943 executes the registration process and the authentication process, for example. The controller 943 includes a comparison unit 944 and a specifying unit 945.

The comparison unit 944 is a processing unit which calculates a result $E_K(HVi)$ of comparison between the encryption authentication information $E_K(mi)$ and the input information m' when receiving an authentication request. The comparison unit 944 successively obtains encryption authentication information $E_K(mi)$ from the storage unit 946 and calculates exclusive OR of the input information m' and the encryption authentication information $E_K(mi)$ which are included in the authentication request so as to obtain a comparison result $E_K(HVi)$. Note that all comparison results $E_K(HVi)$ are output to the specifying unit 945.

The specifying unit 945 specifies encryption authentication information which has possibility that authentication is successfully performed in a determination as to whether authentication has been successfully performed which is made by the determination device 95. The specifying unit 945 compares Condition 4 of the sixth embodiment with the comparison result $E_K(HVi)$, for example. The specifying unit 945 determines that the comparison result $E_K(HVi)$ which satisfies Condition 4 is associated with the encryption authentication information $E_K(mi)$ which has possibility that authentication is successfully performed. The specifying unit 945 outputs the specified comparison result $E_K(HVi)$ to the transmission unit 942.

The storage unit 946 stores information used for the registration process and the authentication process. The storage unit 946 stores a user ID "A" and encryption authentication information $E_K(mA)$ which are associated with each other. The storage unit 946 stores an encryption authentication information management table illustrated in FIG. 23, for example. Furthermore, the storage unit 946 stores the characteristic HW(K) of the key information K and the threshold value d used for a determination as to whether authentication has been successfully performed.

The determination device 95 includes a reception unit 951, a transmission unit 952, a controller 953, and a storage unit 957. The reception unit 951 receives information from the terminal device 93 or the management device 94. The reception unit 951 receives a registration request including the authentication information mi and the user ID from the terminal device 93 in the registration process. Furthermore, the reception unit 951 receives the results $E_K(HVi)$ of comparison between the encryption authentication information $E_K(mi)$ and the input information m' from the management device 94 in the authentication process.

The transmission unit 952 transmits information to the terminal device 93 or the management device 94. The transmission unit 952 transmits the user ID and the encryption authentication information $E_K(mi)$ to the management device 94 in the registration process, for example. Furthermore, the transmission unit 952 transmits an authentication result to the terminal device 93 in the authentication process.

The controller 953 is a processing unit which controls operation of the determination device 95. The controller 953 executes the registration process and the authentication process, for example. The controller 953 includes an encryption unit 954, a decryption unit 955, and a determination unit 956.

The encryption unit 954 is a processing unit which executes an encryption process. The encryption unit 954 encrypts the authentication information mi by a specific rule using the key information K in the registration process so as to generate the encryption authentication information $E_K(mi)$, for example. As with the sixth embodiment, an encryption method which satisfies Condition 3 is used.

The decryption unit 955 is a processing unit which decrypts the comparison result $E_K(HVi)$ supplied from the management device 94 by the key information K. For example, the determination unit 956 decrypts the comparison result $E_K(HVi)$ using the key information K so as to obtain a result HVi of comparison between the authentication information mi and the input information m'.

The determination unit 956 performs a determination as to whether authentication has been successfully performed using the comparison result HVi obtained by the decryption performed by the decryption unit 955. For example, the number of bits representing "1" (a Hamming distance HDi) in the comparison result HVi is compared with the threshold value d. The determination unit 956 determines whether authentication has been successfully performed in accordance with a result of the comparison between the Hamming distance HDi and the threshold value d and generates an authentication result.

The storage unit 957 stores information used for the registration process and the authentication process. The storage unit 957 stores the key information K and the threshold value d, for example.

Next, a flow of a process performed by the units according to the seventh embodiment will be described. A processing flow of the terminal device 93 is the same as that of the sixth embodiment. Note that the terminal device 93 transmits an authentication request in Op. 96 to the management device 94 and a registration request in Op. 93 to the determination device 95.

Figure 30:
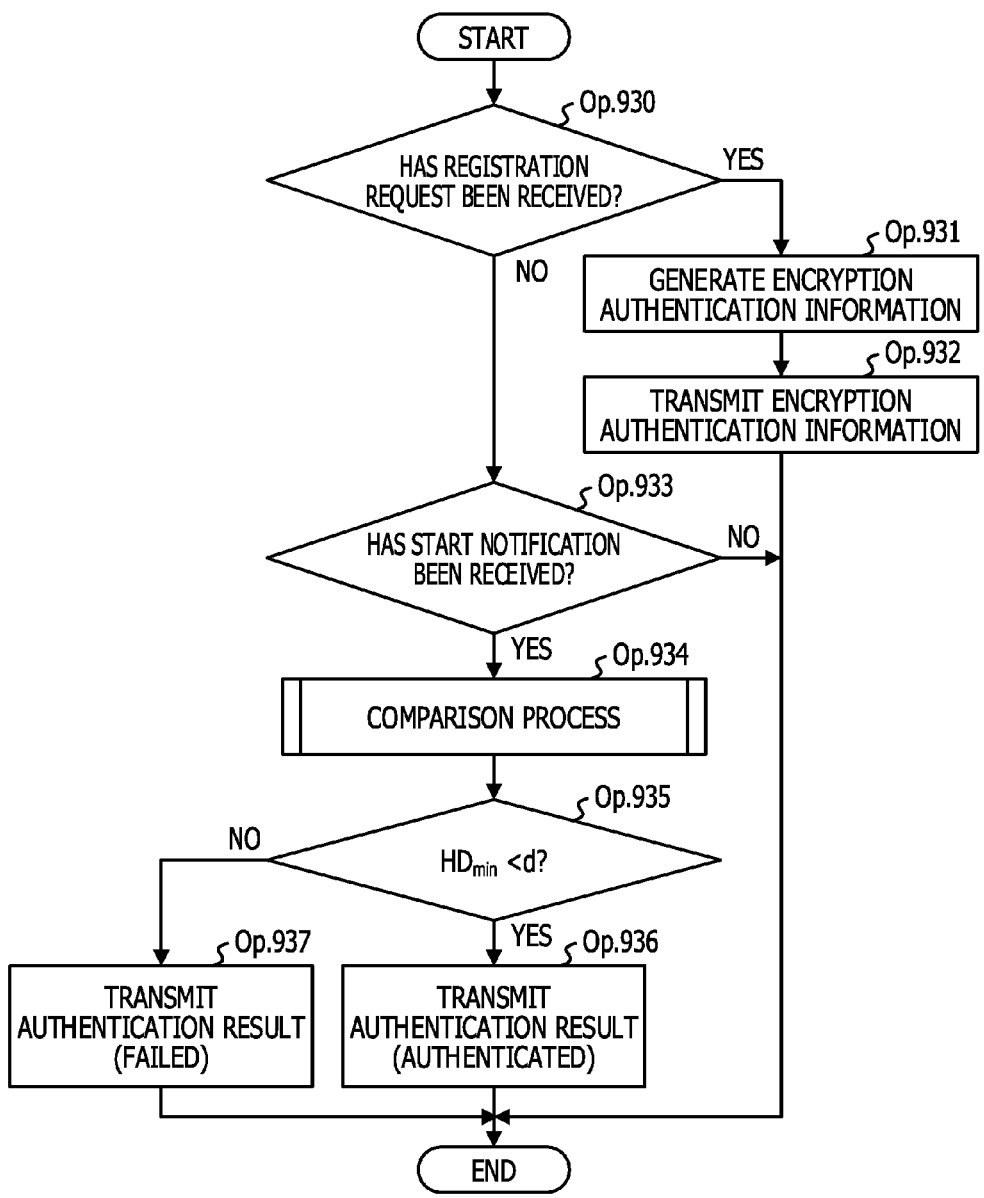
FIG. 30 is a flowchart of a process performed by the determination device according to the seventh embodiment.

FIG. 30 is a flowchart of a process performed by the determination device 95 according to the seventh embodiment. The controller 953 determines whether a registration request has been supplied from the terminal device 93 (Op. 93). The determination is made in accordance with a determination as to whether flag information representing a registration request has been assigned to information received by the reception unit 951, for example.

When receiving the registration request (Op. 930 Yes), the encryption unit 954 generates encryption authentication information $E_K(mi)$ using authentication information mi included in the registration request and the key information K (Op. 931). The transmission unit 952 transmits the encryption authentication information $E_K(mi)$ along with a user ID (Op. 932). Then the determination device 95 terminates the registration process.

On the other hand, when a registration request has not been received (Op. 930 No), the controller 953 determines whether a start notification representing that transmission of a result $E_K(HVi)$ of comparison between the input information m' and the encryption authentication information $E_K(mi)$ is to be started has been supplied from the management device 94 (Op. 933). The determination is made in accordance with a determination as to whether flag information representing the start notification has been assigned to information received by the reception unit 951, for example. In this embodiment, it is determined that the start notification has been received when a comparison result $E_K(HVi)$ and a corresponding user ID is received for the first time. When the start notification has not been received (Op. 933 No), the process is terminated. On the other hand, when the start notification has been received (Op. 933 Yes), the controller 953 executes a comparison process (Op. 934).

Figure 31:
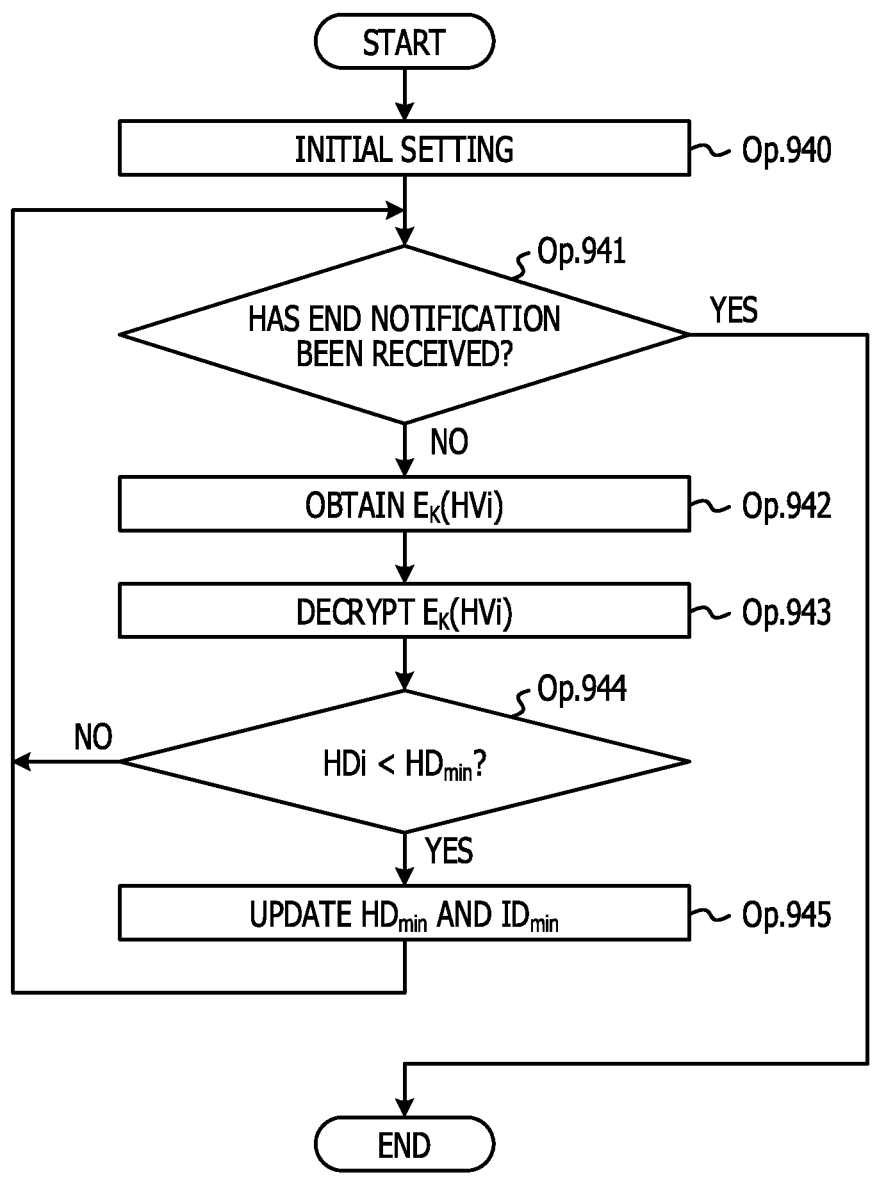
FIG. 31 is a flowchart illustrating a comparison process according to the seventh embodiment.

FIG. 31 is a flowchart illustrating the comparison process according to the seventh embodiment. The controller 953 performs an initial setting (Op. 940). The controller 953 assigns the number of bits of authentication information (8, for example) to a minimum Hamming distance variable HDmin.

The controller 953 determines whether an end notification representing that transmission of a comparison result $E_K(HVi)$ is to be terminated has been supplied from the management device 94 (Op. 941). When the end notification has not been received (Op. 941 No), the decryption unit 955 obtains a comparison result $E_K(HVi)$ and a user ID (Op. 942). Note that the comparison result $E_K(HVi)$ is received every time the management device 94 transmits a comparison result EK(HVi) independently from a comparison process, and therefore, the decryption unit 955 successively processes received comparison results $E_K(HVi)$.

Subsequently, the decryption unit 955 decrypts the comparison result $E_K(HVi)$ using the key information K (OP. 943). Then the determination unit 956 calculates a Hamming distance HDi between the authentication information mi and the input information m' in accordance with the comparison result HVi obtained by the decryption. Then the determination unit 956 determines whether the Hamming distance HDi is smaller than the minimum Hamming distance value HDmin (Op. 944).

When the Hamming distance variable HDi is smaller than the minimum Hamming distance variable HDmin (Op. 944 Yes), the determination unit 956 updates the minimum Hamming distance variable HDmin to the minimum Hamming distance variable HDi and updates the minimum ID variable IDmin to the user ID supplied from the management device 94 (Op. 945).

Thereafter, the process returns to OP. 941, and the process is repeatedly performed until the end notification is received. On the other hand, when the end notification has been received (Op. 941 Yes), the controller 953 terminates the series of comparison processes. Note that, when at least one of the comparison results $E_K(HVi)$ has not been processed at a time of reception of the end notification, the controller 953 processes all the comparison results $E_K(HVi)$ before terminating the comparison process.

Referring back to FIG. 30, after the comparison process (Op. 934) is terminated, the determination unit 956 determines whether the minimum Hamming distance HDmin is smaller than the threshold value d (Op. 935). When the minimum Hamming distance variable HDmin is smaller than the threshold value d (Op. 935 Yes), the determination unit 956 generates an authentication result representing that the authentication has been successfully performed. The transmission unit 952 transmits the authentication result representing that the authentication has been successfully performed and the user ID set to the minimum ID variable IDmin to the terminal device 93 (Op. 936).

On the other hand, when the minimum Hamming distance variable HDmin is equal to or larger than the threshold value d (Op. 935 No), the determination unit 956 generates an authentication result representing that the authentication has failed. Then the transmission unit 952 transmits the authentication result representing that the authentication has failed to the terminal device 93 (Op. 937)

Figure 32:
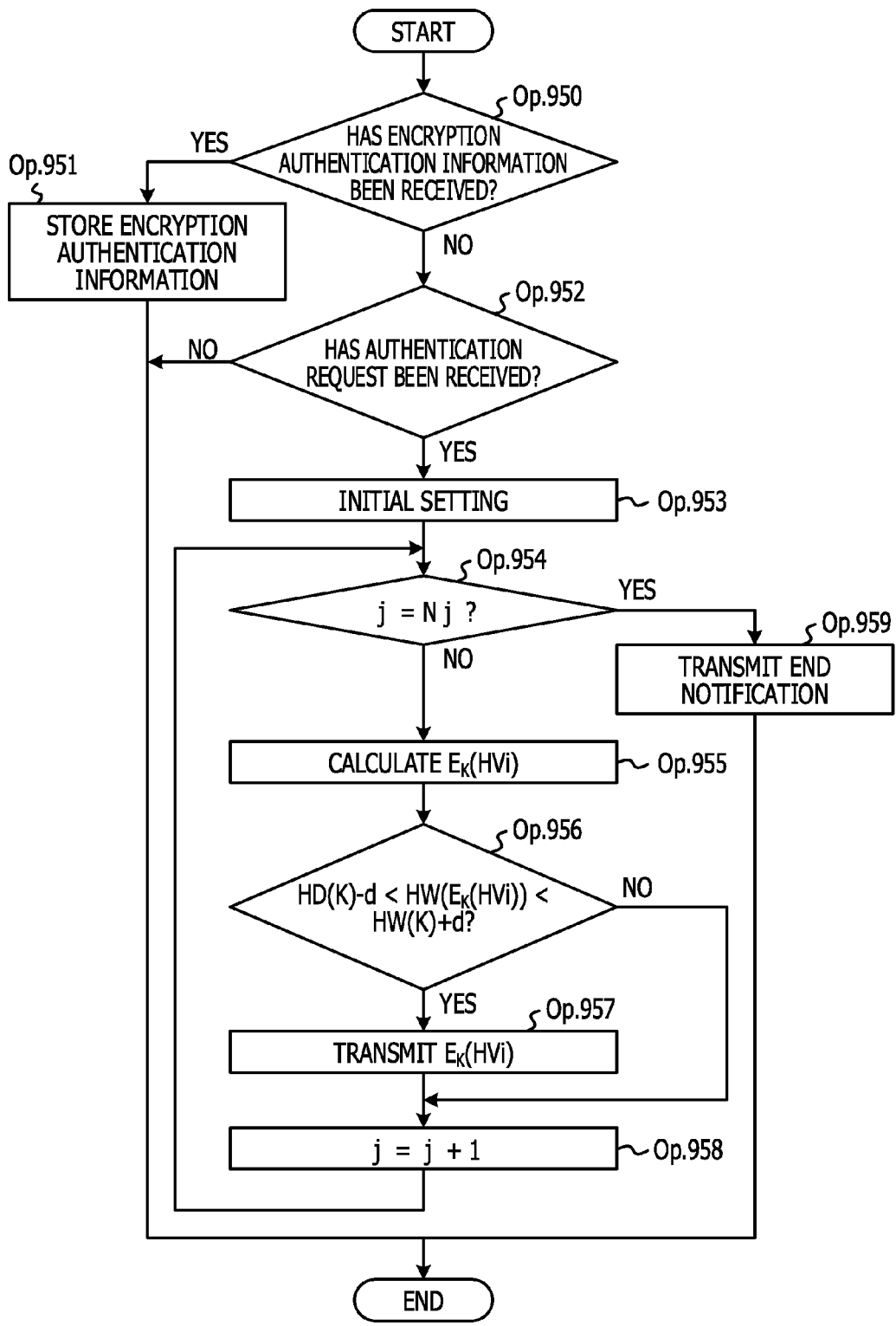
FIG. 32 is a flowchart of a process performed by the determination device according to the seventh embodiment.

FIG. 32 is a flowchart of a process performed by the management device 94 according to the seventh embodiment. The controller 943 determines whether a user ID and encryption authentication information $E_K(mi)$ have been supplied from the determination device 95 (Op. 950). The determination is made in accordance with a determination as to whether flag information representing the encryption authentication information $E_K(mi)$ has been assigned to information received by the reception unit 941, for example.

When the encryption authentication information $E_K(mi)$ has been received (Op. 950 Yes), the controller 943 stores the encryption authentication information $E_K(mi)$ and the user ID which are associated with each other in the storage unit 946 (Op. 951). Then the management device 94 terminates the authentication process.

On the other hand, when the encryption authentication information $E_K(mi)$ has not been received (Op. 950 No), the controller 943 determines whether an authentication request has been received from the terminal device 93 (Op. 952). The determination is made in accordance with a determination as to whether flag information representing the authentication request has been assigned to information received by the reception unit 941, for example.

When an authentication request has not been received (OP. 952 No), the controller 943 terminates the process. On the other hand, when an authentication request has been received (Op. 952 Yes), the controller 943 performs an initial setting (Op. 953). The controller 943 assigns "1" to a counter variable j in the initial setting. Furthermore, the controller 943 assigns the number of records included in the encryption authentication information management table to a maximum counter value Nj.

Subsequently, the controller 943 determines whether the counter variable j matches the maximum counter value Nj (Op. 954). When mismatch is detected (Op. 954 No), the comparison unit 944 refers to a record corresponding to the counter variable j so as to obtain an encryption authentication information $E_K(mi)$ stored in the record and calculate a result $E_K(HVi)$ of comparison with the input information m' (Op. 955). For example, the comparison unit 944 performs exclusive OR using the encryption authentication information $E_K(mi)$ and the input information m' so as to obtain a comparison result $E_K(HVi)$.

The specifying unit 945 determines whether the comparison result $E_K(HVi)$ output from the comparison unit 944 satisfies a condition defined by Condition 4 (Op. 956). When Condition 4 is satisfied (Op. 956 Yes), the transmission unit 942 transmits the comparison result $E_K(HVi)$ and a user ID of a record corresponding to the counter variable j to the determination device 95 (Op. 957).

When the process in Op. 957 is terminated or when the comparison result $E_K(HVi)$ does not satisfy the condition defined by Condition 4 (Op. 956 No), the controller 943 increments the counter variable j (Op. 958). Then the process returns to Op. 954 and the process is performed again.

On the other hand, when the counter variable j matches the maximum counter value Nj (Op. 954 Yes), all records have been processed, and accordingly, the transmission unit 942 transmits an end notification to the determination device 95 under control of the controller 943 (Op. 959). Then the management device 94 terminates the series of processes.

As described above, according to the seventh embodiment, the key information K and the encryption authentication information $E_K(mi)$ are separately managed so that security is improved. Furthermore, a decryption process is executed by the determination device 95 only on the comparison results $E_K(HVi)$ associated with the encryption authentication information $E_K(mi)$ which is determined to be decrypted by the management device 94. Accordingly, a processing cost of the determination device 95 may be reduced, and in addition, a communication amount between the management device 94 and the determination device 95 may be reduced when compared with a case where all the comparison results $E_K(HVi)$ are transmitted from the management device 94 to the determination device 95.

Eighth Embodiment

In an eighth embodiment, a condition for specifying comparison results $E_K(HVi)$ serving as targets of a decryption process is updated. Specifically, in the eighth embodiment, a lower limit value and an upper limit value set by Condition 4 are updated.

When authentication information mi having a Hamming distance HDi equal to or smaller than a threshold value d is detected, it is determined whether authentication information mi' having a Hamming distance HDi' smaller than the Hamming distance HDi exists. Therefore, the lower limit value and the upper limit value set by Condition 4 are updated to stricter conditions in accordance with the Hamming distance HDi.

Since the conditions defined by the lower and upper limit values are updated to stricter conditions, comparison results to be subjected to the decryption process are further limited. In the eighth embodiment, a processing cost for decryption is further reduced by further limiting targets of a decryption process when compared with the sixth and seventh embodiments.

Figure 33:
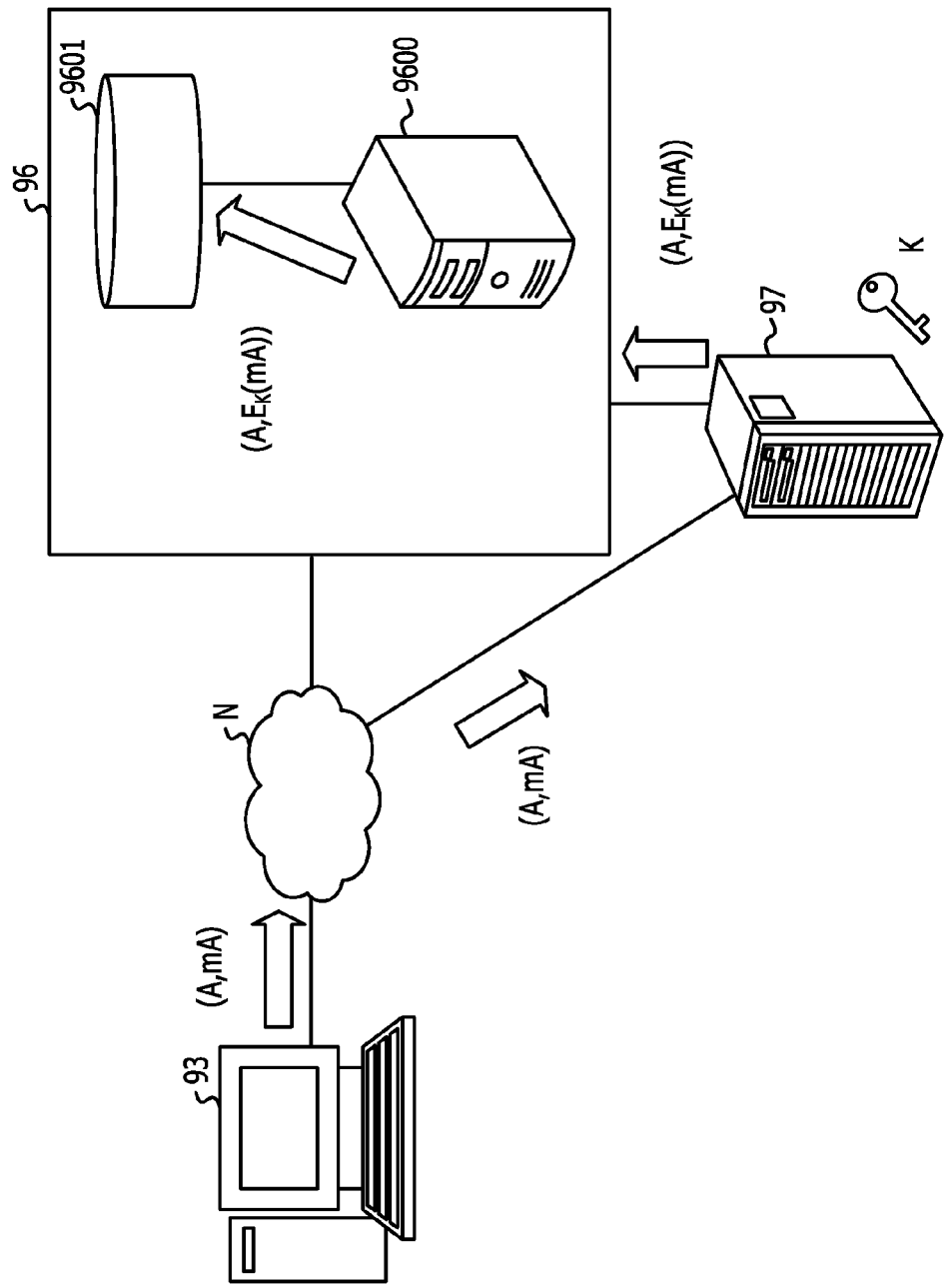
FIG. 33 is a diagram illustrating a registration process in an authentication system according to an eighth embodiment.
Figure 34:
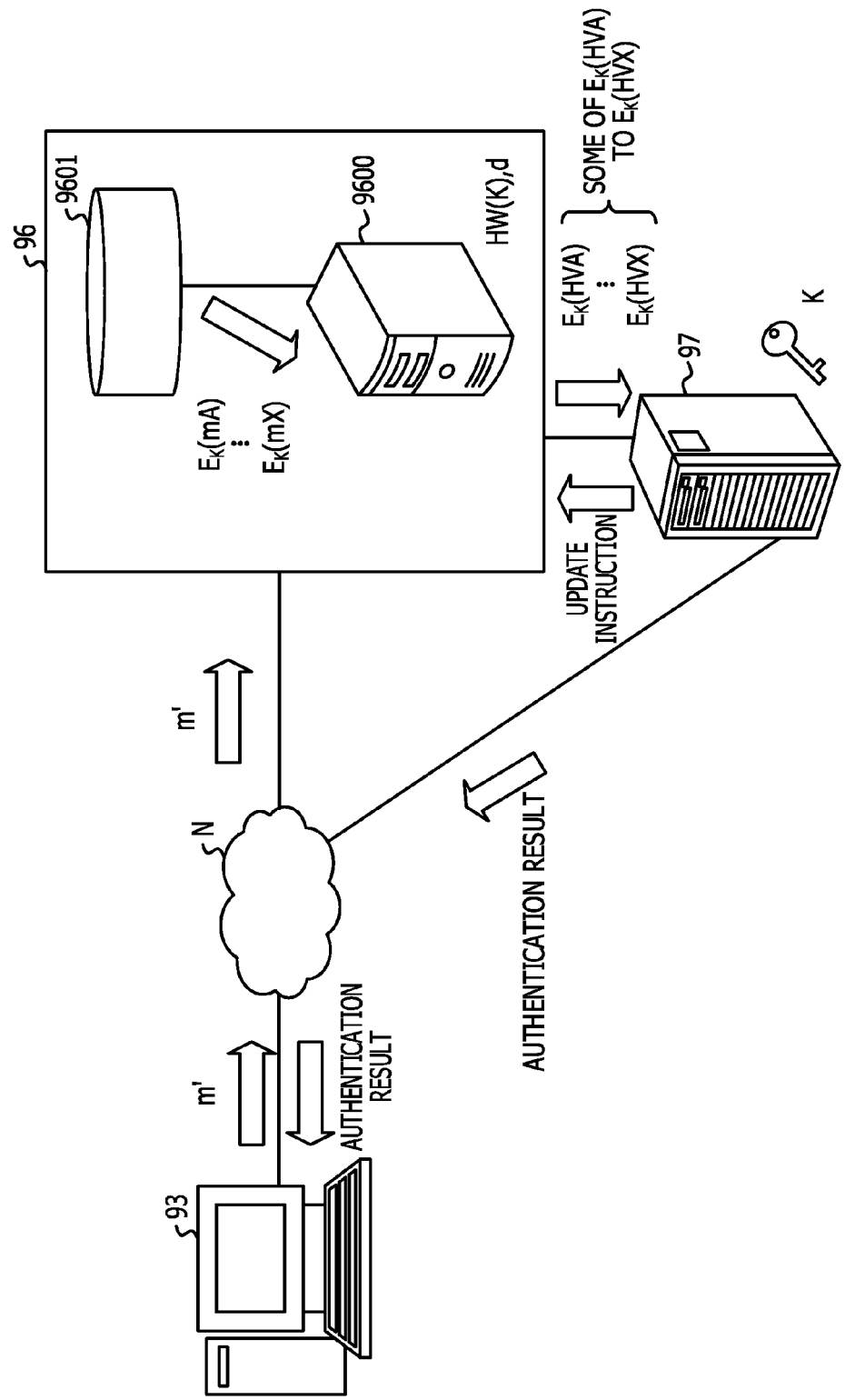
FIG. 34 is a diagram illustrating an authentication process in the authentication system according to the eighth embodiment.

FIGS. 33 and 34 are diagrams illustrating an authentication system according to the eighth embodiment. In examples of FIGS. 33 and 34, the authentication system of the eighth embodiment includes a terminal device 93, a management device 96, and a determination device 97. Note that, as with the sixth embodiment, the eighth embodiment is applicable to a system including a terminal device and an authentication device.

The terminal device 93, the management device 96, and the determination device 97 are connected to one another through a network N. The management device 96 and the determination device 97 may be connected to each other through a dedicated network. The terminal device 93 performs a process the same as that of the terminal device 93 according to the seventh embodiment, and therefore, description thereof is omitted. The management device 96 performs a process the same as that of the management device 94 of the seventh embodiment and updates lower and upper limit values of Condition 4 in accordance with an output of the determination device 97. The determination device 97 performs a process the same as that of the determination device 95 of the seventh embodiment and instructs the management device 96 to update the lower and upper limit values of Condition 4.

FIG. 33 is a diagram illustrating a registration process in the authentication system according to the eighth embodiment. In the registration process of the eighth embodiment, the management device 96 performs a process the same as that of the management device 94 of the seventh embodiment. The determination device 97 performs a process the same as that of the determination device 95 of the seventh embodiment.

FIG. 34 is a diagram illustrating an authentication process in the authentication system according to the eighth embodiment. As with the seventh embodiment, the terminal device 93 generates input information m' to be transmitted to the management device 96. As with the seventh embodiment, the management device 96 successively calculates results $E_K(HVi)$ of comparisons between the input information m' and encryption authentication information $E_K(mi)$. When the comparison results $E_K(HVi)$ satisfy Condition 4, the management device 96 successively transmits the comparison results $E_K(HVi)$ along with corresponding user IDs to the determination device 97.

On the other hand, as with the seventh embodiment, the determination device 97 successively decrypts the received comparison results $E_K(HVi)$ using key information K. Then the determination device 97 determines whether authentication has been successfully performed using the results HVi of comparison between the authentication information mi and the input information m'. Specifically, the determination device 97 determines whether the Hamming distance HDi between the authentication information mi and the input information m' is equal to or smaller than a threshold value d.

When the Hamming distance HDi between the authentication information mi and the input information m' is equal to or smaller than the threshold value d, the determination device 97 transmits an instruction for updating the upper and lower limit values of Condition 4 to the management device 96. As the instruction for update, the determination device 97 notifies the management device 96 of the Hamming distance HDi as a new threshold value d'. When receiving the notification, the management device 96 determines whether the comparison results $E_K(HVi)$ are to be subjected to decryption using the upper and lower limits corresponding to the new threshold value d'.

As described above, the threshold value d' is smaller than the threshold value d. Therefore, a lower limit value "HW (K)−d" is replaced by a larger value "HW(K)−d'" and an upper limit value "HW(K)+d" is replaced by a smaller value "HW(K)+d'. Specifically, the conditions defined by Condition 4 are updated to stricter conditions in response to the update instruction.

Figure 35:
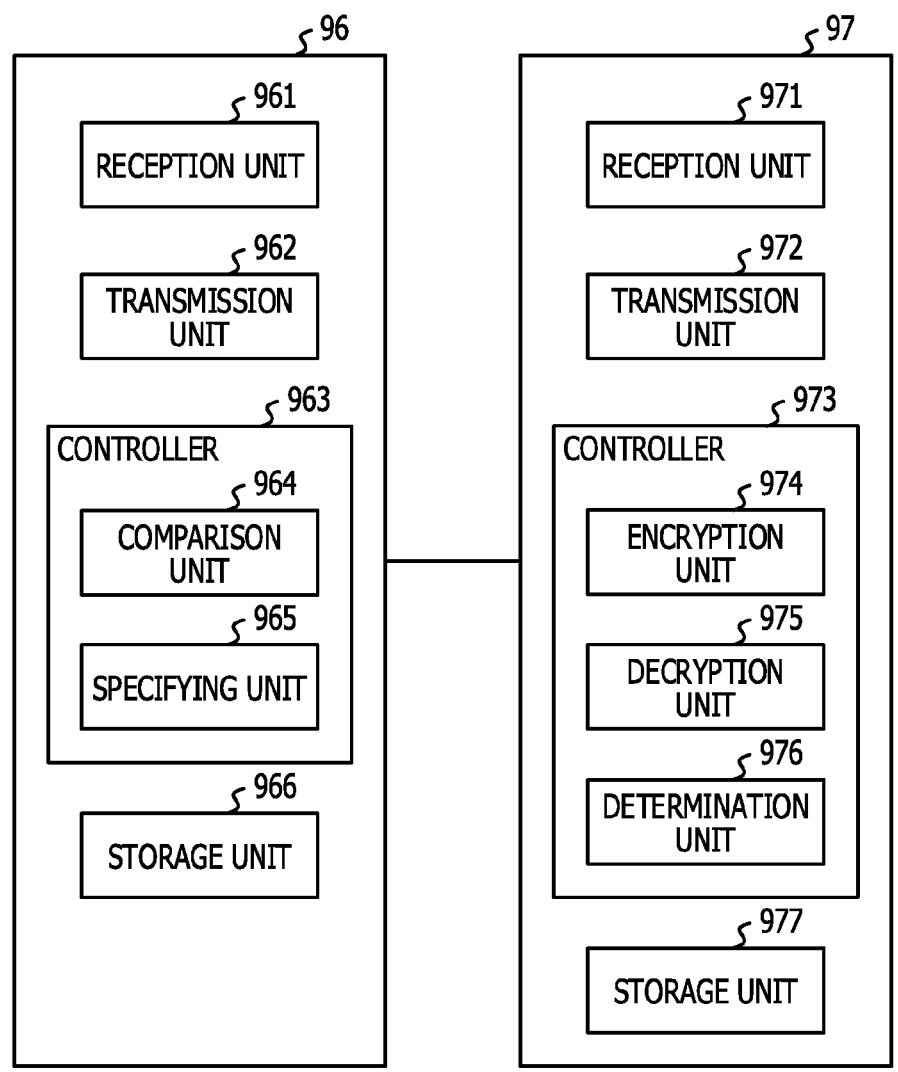
FIG. 35 is a diagram illustrating functional blocks of a management device and a determination device according to the eighth embodiment.

Next, functional configurations of the management device 96 and the determination device 97 according to the eighth embodiment will be described. FIG. 35 is a diagram illustrating functional blocks of the management device 96 and the determination device 97 according to the eighth embodiment.

The management device 96 includes a reception unit 961, a transmission unit 962, a controller 963, and a storage unit 966. The reception unit 961 performs a process the same as that of the reception unit 941. The transmission unit 962 performs a process the same as that of the transmission unit 942. The storage unit 966 stores information the same as that of the storage unit 946.

The controller 963 is a processing unit which controls operation of the management device 96. The controller 963 executes a registration process and an authentication process, for example. The controller 963 includes a comparison unit 964 and a specifying unit 965.

The comparison unit 964 performs a process the same as that of the comparison unit 944. The specifying unit 965 performs a process the same as that of the specifying unit 945, and updates conditions associated with Condition 4 when receiving an update instruction from the determination device 97. Specifically, the specifying unit 965 updates the upper and lower limit values using the new threshold value d'.

The determination device 97 includes a reception unit 971, a transmission unit 972, a controller 973, and a storage unit 977. The reception unit 971 performs a process the same as that of the reception unit 951. The transmission unit 972 performs a process the same as that of the transmission unit 952. The storage unit 977 stores information the same as that of the storage unit 957.

The controller 973 is a processing unit which controls operation of the determination device 97. The controller 973 executes the registration process and the authentication process, for example. The controller 973 includes an encryption unit 974, a decryption unit 975, and a determination unit 976.

The encryption unit 974 performs a process the same as that of the encryption unit 954. The decryption unit 975 performs a process the same as that of the decryption unit 955. The determination unit 976 performs a process the same as that of the determination unit 956, and when detecting a comparison result HVi representing that a Hamming distance HDi is smaller than the threshold value d, the determination unit 976 generates an update instruction including the new threshold value d'. The determination unit 976 controls the transmission unit 972 so that the transmission unit 972 transmits the update instruction to the management device 96. The new threshold value d' corresponds to the Hamming distance HDi determined to be smaller than the threshold value d.

Next, a flow of a process performed by the units according to the eighth embodiment will be described. A flow of a process performed by the terminal device 93 is the same as that of the seventh embodiment.

Figure 36:
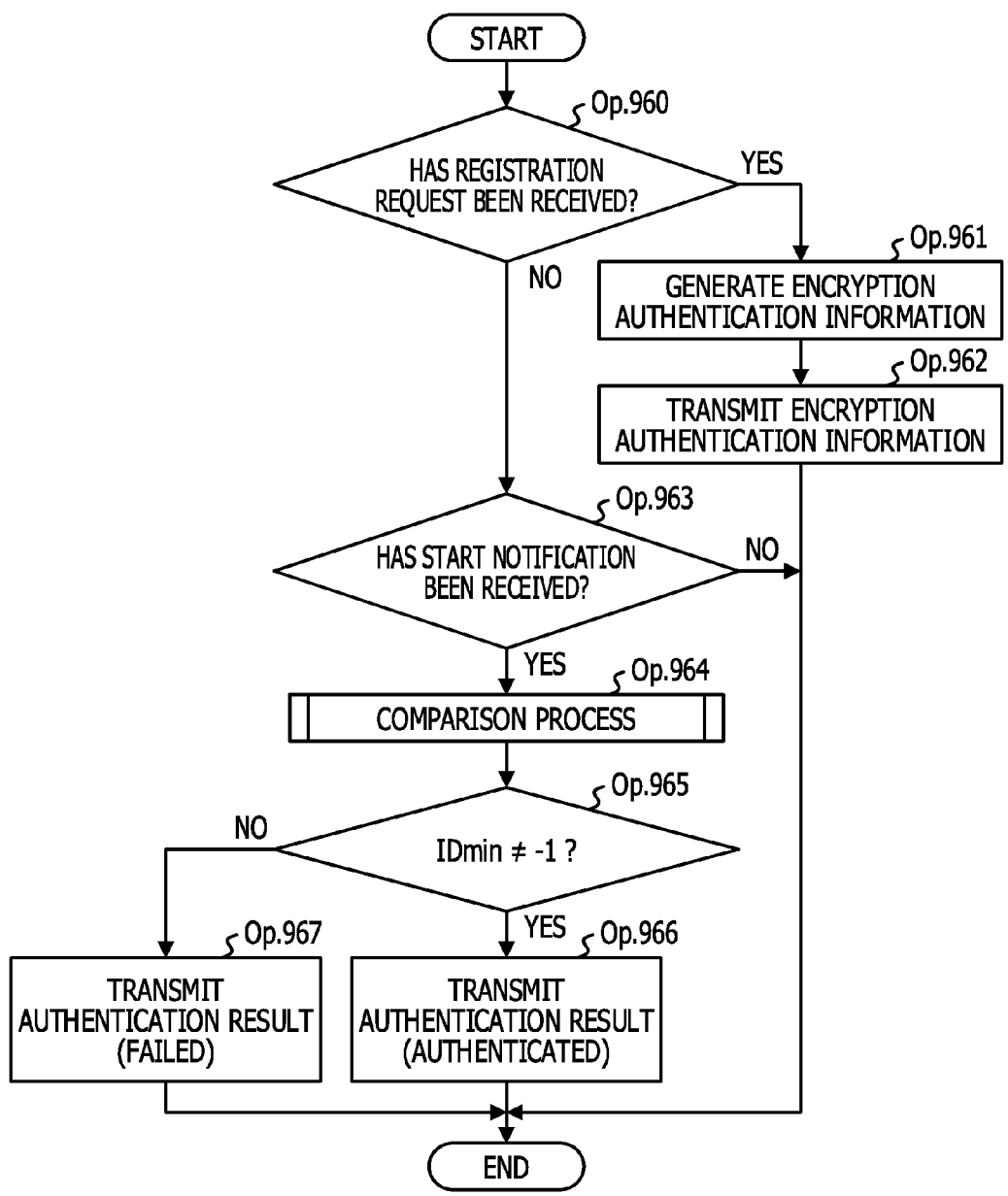
FIG. 36 is a flowchart of a process performed by the determination device according to the eighth embodiment.

FIG. 36 is a flowchart of a process performed by the determination device 97 according to the eighth embodiment. Processes in Op. 960, Op. 961, Op. 962, Op. 963, Op. 966, and Op. 967 are the same as the processes in Op. 930, Op. 931, Op. 932, Op. 933, Op. 936, and Op. 937 according to the seventh embodiment, respectively. Hereinafter, a process in Op. 964 (FIG. 37) and a process in Op. 965 will be described.

Figure 37:
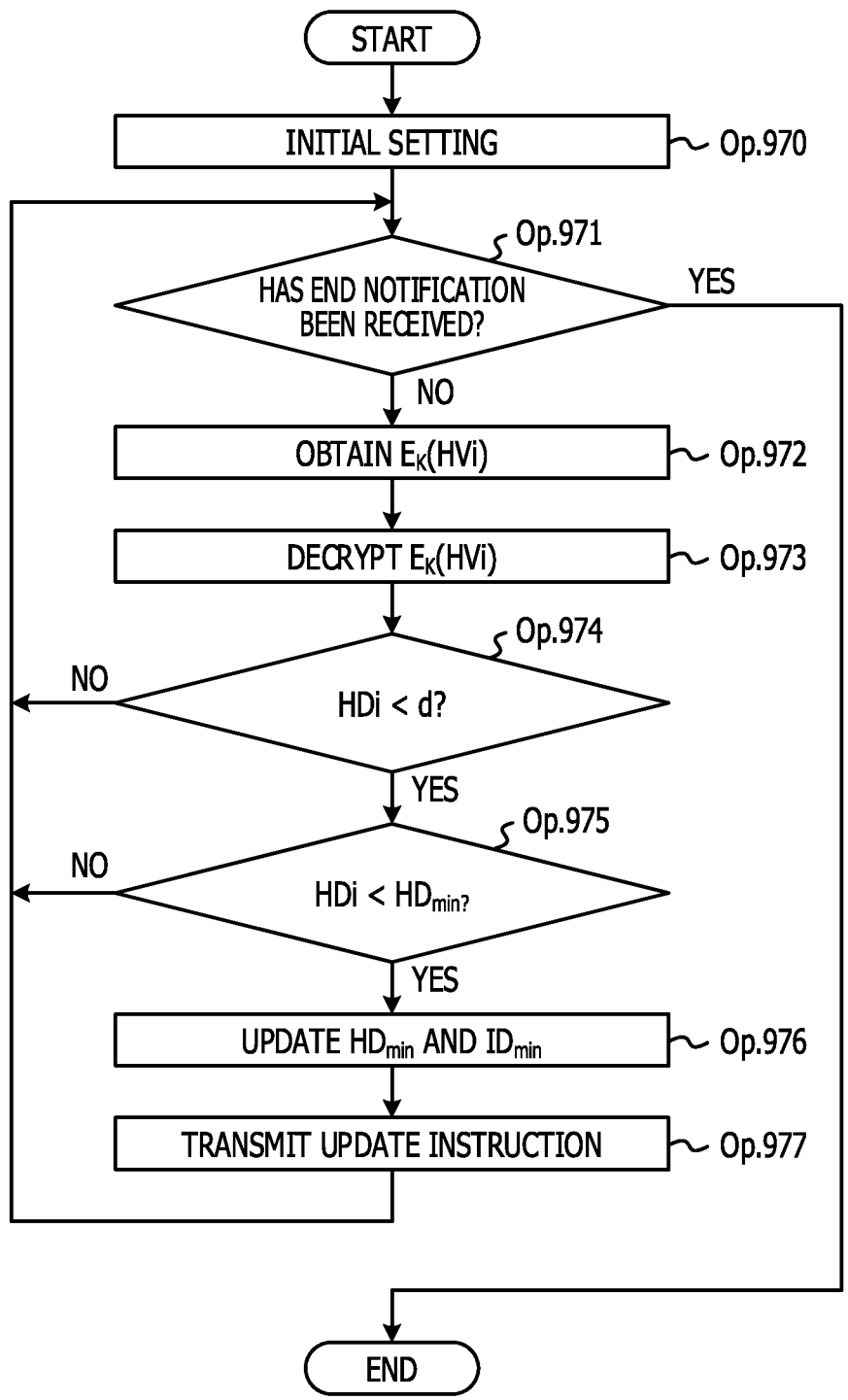
FIG. 37 is a flowchart illustrating a comparison process according to the eighth embodiment.

FIG. 37 is a flowchart illustrating a comparison process according to the eighth embodiment. First, the controller 973 performs an initial setting (Op. 970). The controller 973 assigns the number of bits of authentication information (8, for example) to the minimum Hamming distance variable HDmin. Then a value representing that a corresponding user ID does not exist (−1, for example) is assigned to the minimum ID variable IDmin.

The controller 973 determines whether an end notification representing that the transmission of comparison results is to be terminated has been received from the management device 96 (Op. 971). When the end notification has not been received (Op. 971 No), the decryption unit 975 obtains the comparison result $E_K(HVi)$ and a user ID (Op. 972).

Subsequently, the decryption unit 975 decrypts the comparison results $E_K(HVi)$ using the key information K (OP. 973). Then the determination unit 976 calculates a Hamming distance HDi between the authentication information mi and the input information m' in accordance with the comparison result HVi obtained by the decryption. The determination unit 976 determines whether the Hamming distance HDi is smaller than the threshold value d (Op. 974).

When the Hamming distance HDi is smaller than the threshold value d (Op. 974 Yes), the determination unit 976 determines whether the Hamming distance HDi is smaller than a minimum Hamming distance variable HDmin (Op. 975). On the other hand, when the Hamming distance HDi is equal to or larger than the threshold value d (Op. 974 No), the controller 973 returns to the process in Op. 971.

When the Hamming distance variable HDi is smaller than the minimum Hamming distance variable HDmin (Op. 975 Yes), the determination unit 976 updates the minimum Hamming distance variable HDmin to the minimum Hamming distance variable HDi and updates a minimum ID variable IDmin to a corresponding user ID (Op. 976). The authentication processing unit 75 updates the threshold value d to the minimum Hamming distance variable HDmin and generates an update instruction including a new threshold value d' (HDmin). The transmission unit 972 transmits the update instruction to the management device 96 (Op. 977).

When the Hamming distance HDi is equal to or larger than the minimum Hamming distance variable HDmin (Op. 975 No), the controller 973 returns to Op. 971 and repeatedly performs the process until an end notification is received. On the other hand, when the end notification has been received (Op. 971 Yes), the controller 973 terminates the series of comparison processes.

Referring back to FIG. 36, after the comparison process (Op. 964) is terminated, determination unit 976 determines whether the minimum Hamming distance HDmin has been updated from the initial setting value (Op. 965). For example, the determination unit 976 determines whether the minimum ID variable IDmin is "−1". When the minimum ID variable IDmin is updated from the initial setting value (Op. 965. Yes), the determination unit 976 generates an authentication result representing that authentication has been successfully performed. On the other hand, when the minimum ID variable IDmin is not updated from the initial setting value (Op. 965. No), the determination unit 976 generates an authentication result representing that authentication has failed.

Figure 38:
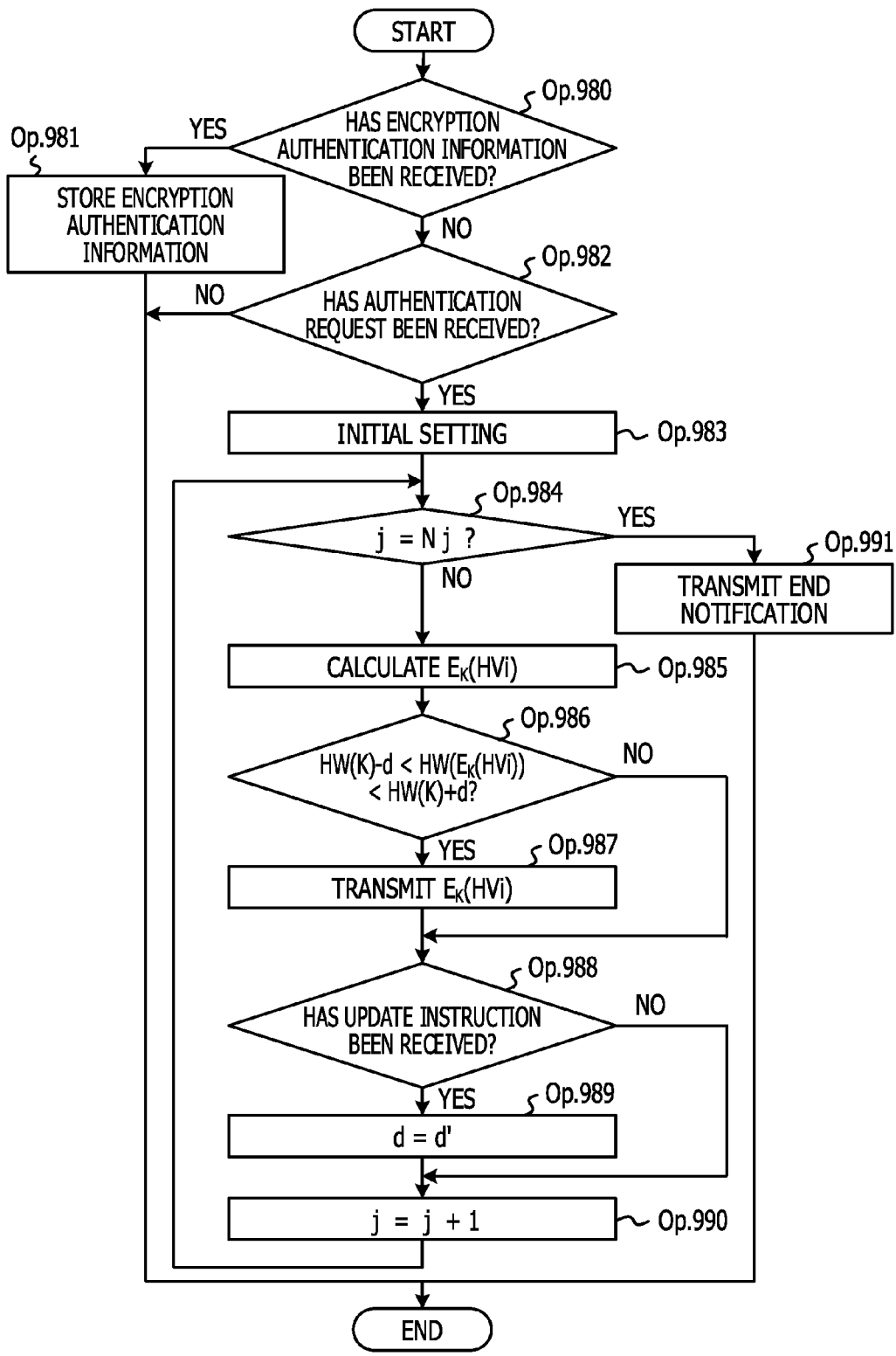
FIG. 38 is a flowchart of a process performed by the management device according to the eighth embodiment.

FIG. 38 is a flowchart of a process performed by the management device 96 according to the eighth embodiment. Processes in Op. 980, Op. 981, Op. 982, Op. 983, Op. 984, Op. 985, Op. 986, Op. 987, Op. 990, and Op. 991 are the same as the processes in Op. 950, Op. 951, Op. 952, Op. 953, Op. 954, Op. 955, Op. 956, Op. 957, Op. 958, and Op. 959 according to the seventh embodiment, respectively. In the eighth embodiment, the management device 96 executes the processes in Op. 988 and Op. 989 after the process of Op. 986 or Op. 987.

The specifying unit 965 determines whether an update instruction has been supplied from the determination device 97 (Op. 988). When an update instruction has not been received (OP. 988 No), the controller 963 executes the process in Op. 990. On the other hand, when the update instruction has been received (Op. 988 Yes), the specifying unit 965 updates the threshold value d to the new threshold value d' (Op. 989). Specifically, since the threshold value d referred to in Op. 986 is updated, the lower and upper limit values of Condition 4 are changed after Op. 989.

As described above, since the management device 96 and the determination device 97 operate in combination in real time, the management device 96 may update the conditions for a determining decryption targets. Accordingly, the decryption targets may be further limited, and a processing cost of the decryption process performed by the determination device 97 is further reduced.

Modifications

Modifications of the sixth, seventh, and eighth embodiments will be described. In the sixth, seventh, and eighth embodiments, all users are encrypted by the same key information K (or a mask value RK). In the modifications, different key information Ki (or different mask values RKi) is used for different users. In the modifications, authentication information mi is encrypted using key information Ki (or a mask value RKi) so that encryption authentication information $E_K i(mi)$ is generated. In the modifications, different key information Ki (or different mask values RKi) is used for different users in decryption. Hereinafter, two modifications will be described.

First Modification

First, a case where different key information (or different mask values) having the same characteristic are utilized will be described. Specifically, the numbers of bits representing "1" are the same between bit strings of the different key information Ki (or the different mask values RKi). In a first modification, the key information Ki (or the mask values RKi) suitable for authentication information mi is managed for individual user IDs. In this case, since the characteristics of the key information Ki are the same as each other, one-to-many authentication is performed using conditions defined by Condition 4 by the processes the same as those of the sixth to eighth embodiments.

Second Modification

In a second modification, a case where characteristics of key information (or mask values) applied to individual users are different from one another will be described. Note that, in a description below, a plurality of mask values RKi are generated from a single key information K so that authentication information mi of the users are encrypted. However, the same process is applicable to a case where different key information Ki is used for different users.

Condition 4 used in the sixth to eighth embodiments is obtained provided that the same key information K (or the same mask value RK) is used in encryptions of authentication information and the key information K has a unique characteristic HW(K). Therefore, in the second modification, Condition 8 below is used.

$$HW(RK_i)min-d < HW(E_K(HVi)) < HW(RK_i)max+d \quad \text{(Condition 8)}$$

"HW(RK)min" is the smallest value in the numbers of bits representing "1" in bit strings of mask values. "HW(RK)max" is the largest value in the numbers of bits representing "1" in bit strings of the mask values. Condition 8 is obtained by employing "HW(RKi)min−d" which assigns the smallest value as a lower limit value and employing "HW(RKi) max+d" which assigns the largest value as an upper limit value when Condition 4 is employed for individual mask values RKi.

FIG. 39 is a diagram illustrating a data configuration of a mask value management table. When this modification is applied to the sixth embodiment, the authentication device 92 stores the mask value management table. When this modification is applied to the seventh embodiment, the determination device 95 stores the mask value management table. When this modification is applied to the eighth embodiment, the determination device 97 stores the mask value management table. Hereinafter, a case where this modification is applied to the seventh embodiment will be described.

The mask value management table stores a record number, a user ID, a mask value, and a characteristic of the mask value which are associated with each other. When receiving a registration request from the terminal device 93, the determination device 95 generates a mask value from key information K. The determination device 95 encrypts authentication information (mA, for example) included in the registration request by the mask value (RK1 "11001100", for example) so as to generate encryption authentication information $E_K 1$ (mA). In this case, the determination device 95 registers the mask value RK1 "11001100" associated with a user ID "A" included in the registration request in the mask value management table.

Furthermore, the determination device 95 further registers a characteristic HW(RKi) of the mask value in the mask value management table. The characteristic HW(RKi) of the mask value corresponds to the number of bits representing "1" in a bit string of the mask value RKi. The determination device 95 transmits a maximum value HW(RKi)max and a minimum value HW(RKi)min in the characteristics HW(RKi) of the mask values to the management device 94 which performs determination in accordance with Condition 8.

Next, various processing flows performed when the modification is employed will be described. When the modification is applied to the sixth embodiment, a determination is performed in accordance with Condition 8 in Op. 924 of FIG. 26, and a comparison result is decrypted using a mask value corresponding to a user ID in Op. 925.

When the modification is applied to the seventh embodiment, the determination device 95 decrypts a comparison result using a mask value corresponding to a user ID in Op. 943. Furthermore, the management device 94 performs a determination in accordance with Condition 8 in Op. 956.

When the modification is applied to the eighth embodiment, the determination device 97 decrypts a comparison result by a mask value corresponding to a user ID in Op. 973. Furthermore, the management device 96 performs a determination in accordance with Condition 8 in Op. 986.

As described above, according to the second modification, different key information Ki (or different mask values RKi) may be used for different users. Accordingly, security of the encryption authentication information $E_K(mi)$ may be further enhanced. Furthermore, since Condition 8 is used, even when different key information Ki is used for different users, only comparison results $E_K(HVi)$ which have possibility that authentication is successfully performed in a determination as to whether authentication is successfully performed are set as decryption targets, and accordingly, a processing cost may be reduced.

Hardware Configuration

Figure 40:
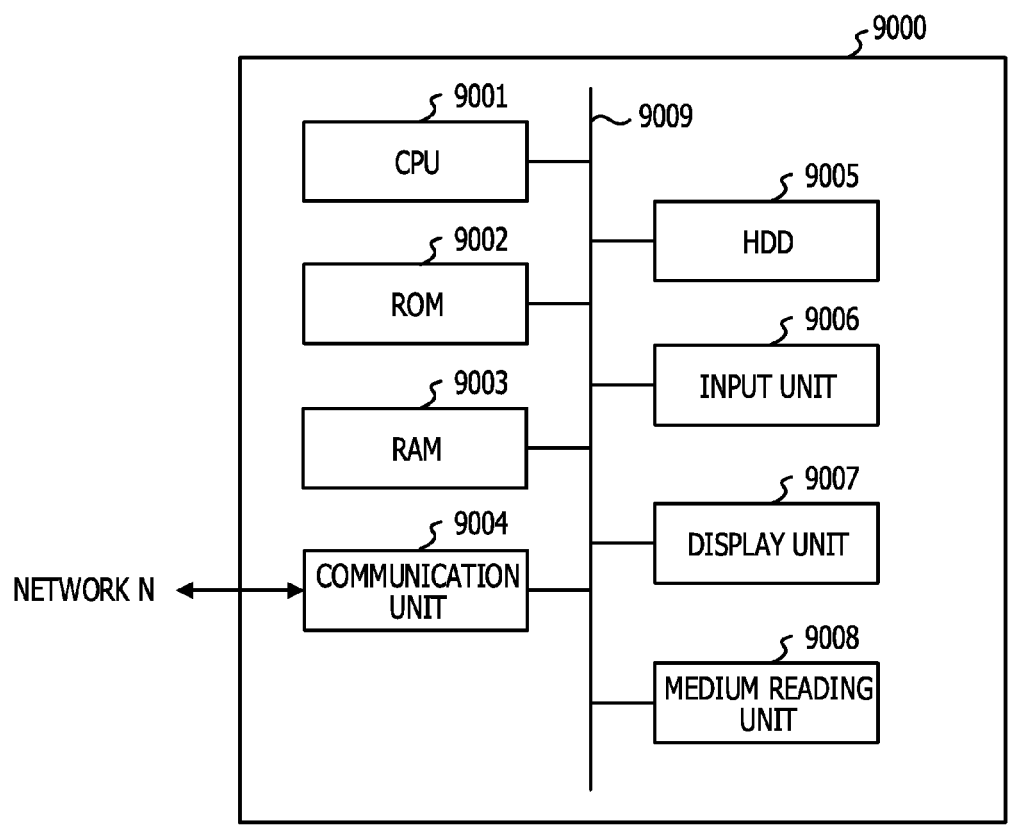
FIG. 40 is hardware configurations of the units according to the sixth to eighth embodiments.

The terminal devices, the authentication devices, the management devices, and the determination devices according to the sixth, seventh, and eighth embodiments are realized by computers. FIG. 40 is a diagram illustrating a hardware configuration of the terminal devices, the authentication devices, the management devices, and the determination devices according to the sixth, seventh, and eighth embodiments. A computer 9000 having a configuration illustrated in FIG. 40 functions as the terminal devices, the authentication devices, the management devices, and the determination devices.

The computer 9000 executes the registration process and the authentication process according to the embodiments, and functions as the terminal devices, the authentication devices, the management devices, and the determination devices of the embodiments. The computer 9000 includes a central processing unit (CPU) 1001, a read only memory (ROM) 1002, a random access memory (RAM) 1003, a communication unit 9004, a hard disk drive (HDD) 1005, an input unit 9006, a display unit 9007, and a medium reading unit 9008 which are connected to one another through a bus 9009. The individual units may perform transmission and reception of data with one another under control of the CPU 9001.

An authentication program including the registration process or the authentication process illustrated in the flowcharts of the foregoing embodiments described therein is recorded in a recording medium readable by the computer 9000. Examples of the recording medium readable by the computer 9000 include a magnetic recording device, an optical disc, a magneto-optical recording medium, and a semiconductor memory. Examples of the magnetic recording device include an HDD, a flexible disk (FD), and a magnetic tape (MT).

Examples of an optical disc include a digital versatile disc (DVD), a DVD-RAM, a compact disc-read only memory (CD-RIM), and a compact disc-recordable/rewritable (CD-R/RW). Examples of the magneto-optical recording medium include a magneto-optical disk (MO). When the authentication program is to be distributed, portable recording media, such as DVDs and CD-ROMs, which record the authentication program therein may be sold.

The medium reading unit 9008 of the computer 9000 which executes the authentication program including the registration process and the authentication process of the foregoing embodiments described therein reads the program from the recording medium including the authentication program recorded therein. The CPU 9001 stores the read authentication program in the HDD 9005, the ROM 9002, or the RAM 9003.

The CPU 9001 is a central processing unit which performs control of operation of the entire devices according to the foregoing embodiments. Then the CPU 9001 reads the authentication program according to the foregoing embodiments from the HDD 9005 and executes the program. The CPU 9001 functions as a controller of the units. As described above, the program may be stored in the ROM 9002 or the RAM 9003 which is accessible by the CPU 9001.

Next, the communication unit 9004 functions as a reception unit or a transmission unit of the units under control of the CPU 9001.

The HDD 9005 functions as a storage unit of the units under control of the CPU 9001. Specifically, the HDD 9005 stores information used for the registration process and the authentication process. As with the program, information used for the registration process and the authentication process may be stored in the ROM 9002 or the RAM 9003 which is accessible by the CPU 9001. Furthermore, various information generated in course of the processes is stored in the RAM 9003, for example. Specifically, the RAM 9003 may function as a storage unit.

The input unit 9006 accepts various inputs. The input unit 9006 includes a keyboard and a mouse. The display unit 9007 displays various information. The display unit 9007 is a display device, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An authentication method executed by a computer, the authentication method comprising:
   receiving input data which is a target of authentication;
   specifying registration data, from among a plurality of registration data stored in a storage device, having a second feature value within a threshold value relative to a first feature value of the input data, the first feature value representing a distance between the input data and a reference, the second feature value representing another distance between the registration data and the reference, and the threshold value being used when a determination as to whether the authentication has been successfully performed; and
   executing a process of comparing the specified registration data with the input data,
   wherein the input data and the specified registration data have a binary format, and
   the first feature value and the second feature value represent the number of 1 or 0 included in the input data of the binary format and the reference of the binary format, respectively.

2. The authentication method according to claim 1, further comprising:
   determining that the authentication on the input data has been successfully performed when a difference represented by a result of the process of comparing is equal to or smaller than the threshold value.

3. The authentication method according to claim 1, further comprising:
   storing, prior to the receiving, the registration data and the second feature value of the registration data which are associated with each other when a request for registering the registration data is received.

4. The authentication method according to claim 2, further comprising:
   changing the threshold value to a new threshold value corresponding to the difference when the difference is smaller than the threshold value in the authentication; and
   executing another process of comparing the input data with another registration data having a third feature value within the new threshold value relative to the first feature value of the input data.

5. The authentication method according to claim 1, wherein the second feature value is in a range from a first value obtained by subtracting the threshold value from the first feature value to a second value obtained by adding the threshold value to the first feature value.

6. The authentication method according to claim 1, further comprising:
   controlling the computer not to execute another process of comparing on another registration data having a fourth feature value which is larger than the threshold value relative to the first feature value.

7. The authentication method according to claim 1, wherein
   when the reference is all 0, the first feature value and the second feature value represent the number of 1 included in the input data of the binary format, and
   when the reference is all 1, the first feature value and the second feature value represent the number of 0 included in the input data of the binary format.

8. A system comprising:
   a comparison device including a first processor; and an authentication device including a second processor,
wherein the first processor is configured to:
  receive input data which is a target of authentication,
  specify registration data, from among a plurality of registration data, having a second feature value within a threshold value relative to a first feature value of the input data, the first feature value representing a distance between the input data and a reference, the second feature value representing another distance between the registration data and the reference, and the threshold value being used when a determination as to whether the authentication has been successfully performed, and
  execute a process of comparing the specified registration data with the input data, wherein
the input data and the specified registration data have a binary format, and
the first feature value and the second feature value represent the number of 1 or 0 included in the input data of the binary format and the reference of the binary format, respectively, and
wherein the second processor is configured to:
  receive a result of the process of comparing performed by the comparison device, and
  determine whether the authentication of the input data has been successfully performed in accordance with the result of the process of comparing and the threshold.

9. An authentication device comprising:
a memory; and
a processor coupled to the memory and configured to:
  receive input data which is a target of authentication,
  specify registration data, from among a plurality of registration data stored in the memory, having a second feature value within a threshold value relative to a first feature value of the input data, the first feature value representing a distance between the input data and a reference, the second feature value representing another distance between the registration data and the reference, and the threshold value being used when a determination as to whether the authentication has been successfully performed, and
  execute a process of comparing the specified registration data with the input data,
wherein the input data and the specified registration data have a binary format, and
the first feature value and the second feature value represent the number of 1 or 0 included in the input data of the binary format and the reference of the binary format, respectively.

10. The authentication device according to claim 9, wherein the processor is further configured to determine that the authentication on the input data has been successfully performed when a difference represented by a result of the process of comparing is equal to or smaller than the threshold value.

11. The authentication device according to claim 9, wherein the processor is further configured to store the registration data and the second feature value of the registration data which are associated with each other when a request for registering the registration data is received.

12. The authentication device according to claim 10, wherein the processor is further configured to:
  change the threshold value to a new threshold value corresponding to the difference when the difference is smaller than the threshold value in the authentication, and
  execute another process of comparing the input data with another registration data having a third feature value within the new threshold value relative to the first feature value of the input data.

13. The authentication device according to claim 9, wherein the second feature value is in a range from a first value obtained by subtracting the threshold value from the first feature value to a second value obtained by adding the threshold value to the first feature value.

14. The authentication device according to claim 9, wherein the processor is further configured to control the computer not to execute another process of comparing on another registration data having a fourth feature value which is larger than the threshold value relative to the first feature value.

15. An authentication method executed by a computer, the authentication method comprising:
  receiving input data to be an authentication target;
  calculating a first feature value of the input data;
  determining a distance between the first feature value and second feature values of a plurality of registration data being stored in a storage device, respectively;
  limiting the plurality of registration data to be compared with the input data by selecting registration data having the distance equal to or below a first threshold value; and
  comparing the selected registration data with the input data,
wherein the input data and the selected registration data have a binary format, and
the first feature value and the second feature value represent the number of 1 or 0 included in the input data of the binary format and the reference of the binary format, respectively.

* * * * *